(12) United States Patent
Robichaud et al.

(10) Patent No.: US 11,068,452 B2
(45) Date of Patent: Jul. 20, 2021

(54) COLUMN-BASED TABLE MANIPULATION OF EVENT DATA TO ADD COMMANDS TO A SEARCH QUERY

(71) Applicant: SPLUNK INC., San Francisco, CA (US)

(72) Inventors: Marc Vincent Robichaud, San Francisco, CA (US); Cory Eugene Burke, San Bruno, CA (US); Jeffrey Thomas Lloyd, South San Francisco, CA (US)

(73) Assignee: SPLUNK Inc., San Francisco, CA (US)

( * ) Notice: Subject to any disclaimer, the term of this patent is extended or adjusted under 35 U.S.C. 154(b) by 219 days.

(21) Appl. No.: 15/956,131

(22) Filed: Apr. 18, 2018

(65) Prior Publication Data

US 2018/0232409 A1    Aug. 16, 2018

Related U.S. Application Data

(63) Continuation of application No. 14/611,018, filed on Jan. 30, 2015, now Pat. No. 9,977,803.

(51) Int. Cl.
*G06F 16/22* (2019.01)
*G06F 16/24* (2019.01)
*G06F 16/2455* (2019.01)

(52) U.S. Cl.
CPC ........... *G06F 16/221* (2019.01); *G06F 16/24* (2019.01); *G06F 16/2455* (2019.01)

(58) Field of Classification Search
CPC ..... G06F 16/221; G06F 16/2455; G06F 16/24
USPC ....................................................... 707/713
See application file for complete search history.

(56) References Cited

U.S. PATENT DOCUMENTS

| | | |
|---|---|---|
| 5,251,152 A | 10/1993 | Noless |
| 5,261,044 A | 11/1993 | Dev et al. |
| 5,619,688 A | 4/1997 | Bosworth et al. |
| 5,625,812 A | 4/1997 | David |

(Continued)

FOREIGN PATENT DOCUMENTS

JP        2006-99477 A      4/2006

OTHER PUBLICATIONS

Bitincka, Ledion, et al., "Optimizing Data Analysis with a Semi-Structured Time Series Database", splunk Inc., 2010 pp. 1-9.

(Continued)

*Primary Examiner* — Joshua Bullock
(74) *Attorney, Agent, or Firm* — Shook, Hardy & Bacon L.L.P.

(57) ABSTRACT

A search interface is displayed in a table format that includes a plurality of columns, each column including data items of an event attribute, the data items being of a set of events, each column being selectable by a user, and a plurality of rows forming cells with the one or more columns, each cell comprising one or more of the data items of the event attribute of a corresponding column. Based on the user selecting one or more of the columns, a list of options is displayed corresponding to the selected one or more columns, and one or more commands are added to a search query that corresponds to the set of events. The one or more commands are based on at least an option that is selected from the list of options and the event attribute of each of the selected one or more columns.

27 Claims, 27 Drawing Sheets

(56) References Cited

U.S. PATENT DOCUMENTS

| | | | |
|---|---|---|---|
| 5,760,770 A | 6/1998 | Bliss et al. | |
| 5,787,411 A | 7/1998 | Groff et al. | |
| 5,966,712 A | 10/1999 | Sabatini et al. | |
| 5,982,370 A | 11/1999 | Kamper | |
| 6,072,493 A | 6/2000 | Driskell et al. | |
| 6,301,584 B1 | 10/2001 | Ranger | |
| 6,430,584 B1 | 8/2002 | Comer et al. | |
| 6,438,565 B1 | 8/2002 | Ammirato et al. | |
| 6,493,703 B1 | 12/2002 | Knight et al. | |
| 6,513,033 B1 | 1/2003 | Trauring | |
| 6,553,317 B1 | 4/2003 | Lincoln et al. | |
| 6,691,254 B2 | 2/2004 | Kaler et al. | |
| 6,768,997 B2 | 7/2004 | Schirmer et al. | |
| 6,775,682 B1 | 8/2004 | Ballamkonda et al. | |
| 6,851,088 B1 | 2/2005 | Conner et al. | |
| 6,985,901 B1 | 1/2006 | Sachse et al. | |
| 7,034,710 B2 | 4/2006 | Falada et al. | |
| 7,131,037 B1 | 10/2006 | LeFaive et al. | |
| 7,173,651 B1 | 2/2007 | Knowles | |
| 7,190,382 B1 | 3/2007 | Retlich et al. | |
| 7,324,108 B2 | 1/2008 | Hild et al. | |
| 7,480,647 B1 | 1/2009 | Murstein et al. | |
| 7,583,187 B1 | 9/2009 | Cheng et al. | |
| 7,603,349 B1 | 10/2009 | Kraft et al. | |
| 7,669,119 B1 | 2/2010 | Astito et al. | |
| 7,703,026 B2 | 4/2010 | Bechtold et al. | |
| 7,750,910 B2 | 7/2010 | Hild et al. | |
| 7,797,635 B1 | 9/2010 | Denise | |
| 7,822,707 B1* | 10/2010 | Yehuda | G06F 16/2453 |
| | | | 707/609 |
| 7,925,660 B2 | 4/2011 | Dieberger et al. | |
| 7,937,344 B2 | 5/2011 | Baum et al. | |
| 8,112,425 B2 | 2/2012 | Baum et al. | |
| 8,140,563 B2 | 3/2012 | Midgley | |
| 8,150,815 B2 | 4/2012 | Vian et al. | |
| 8,150,960 B2 | 4/2012 | Kumbalimutt | |
| 8,166,071 B1* | 4/2012 | Korablev | G06F 21/6218 |
| | | | 707/783 |
| 8,296,412 B2 | 10/2012 | Secor et al. | |
| 8,364,709 B1 | 1/2013 | Das et al. | |
| 8,515,963 B1 | 8/2013 | Blank, Jr. et al. | |
| 8,516,008 B1 | 8/2013 | Marquardt et al. | |
| 8,577,911 B1 | 11/2013 | Stepinski et al. | |
| 8,583,631 B1 | 11/2013 | Ganapathi et al. | |
| 8,707,194 B1 | 4/2014 | Jenkins et al. | |
| 8,712,993 B1 | 4/2014 | Ordonez | |
| 8,751,529 B2 | 6/2014 | Zhang et al. | |
| 8,752,014 B2 | 6/2014 | Harmon | |
| 8,788,525 B2 | 7/2014 | Neels et al. | |
| 9,002,873 B1 | 4/2015 | King | |
| 9,152,929 B2 | 10/2015 | Carasso et al. | |
| 9,218,615 B2 | 12/2015 | Wan et al. | |
| 9,286,413 B1 | 3/2016 | Coates et al. | |
| 9,437,022 B2 | 9/2016 | Vander Broek | |
| 9,507,848 B1 | 11/2016 | Li et al. | |
| 9,641,334 B2* | 5/2017 | Faitelson | G06F 9/468 |
| 9,836,501 B2 | 12/2017 | Robichaud et al. | |
| 9,842,160 B2 | 12/2017 | Robichaud | |
| 9,916,346 B2 | 3/2018 | Robichaud et al. | |
| 9,922,082 B2 | 3/2018 | Robichaud | |
| 9,922,084 B2 | 3/2018 | Robichaud | |
| 9,977,803 B2 | 5/2018 | Robichaud et al. | |
| 10,013,454 B2 | 7/2018 | Robichaud et al. | |
| 10,061,824 B2 | 8/2018 | Robichaud et al. | |
| 10,127,258 B2 | 11/2018 | Lamas et al. | |
| 10,185,708 B2 | 1/2019 | Miller et al. | |
| 10,203,842 B2 | 2/2019 | Miller et al. | |
| 10,204,093 B2 | 2/2019 | Miller et al. | |
| 10,204,132 B2 | 2/2019 | Miller et al. | |
| 10,235,418 B2 | 3/2019 | James et al. | |
| 2002/0049713 A1 | 4/2002 | Khemlani et al. | |
| 2002/0194166 A1 | 12/2002 | Fowler | |
| 2003/0100999 A1 | 5/2003 | Markowitz | |
| 2003/0217043 A1 | 11/2003 | Weiss et al. | |
| 2003/0220940 A1 | 11/2003 | Futoransky et al. | |
| 2004/0010564 A1 | 1/2004 | Imaida et al. | |
| 2004/0030741 A1 | 2/2004 | Wolton et al. | |
| 2004/0186826 A1 | 9/2004 | Choi et al. | |
| 2004/0186835 A1 | 9/2004 | Sakurai | |
| 2004/0196308 A1 | 10/2004 | Blomquist | |
| 2004/0221296 A1 | 11/2004 | Ogielski et al. | |
| 2004/0236757 A1 | 11/2004 | Caccavale et al. | |
| 2004/0254919 A1 | 12/2004 | Giuseppini | |
| 2005/0015624 A1 | 1/2005 | Ginter et al. | |
| 2005/0027845 A1 | 2/2005 | Secor et al. | |
| 2005/0044065 A1 | 2/2005 | McArdle | |
| 2005/0066027 A1 | 3/2005 | Hakiel et al. | |
| 2005/0086187 A1 | 4/2005 | Grosser et al. | |
| 2005/0091198 A1 | 4/2005 | Dettinger et al. | |
| 2005/0172261 A1 | 8/2005 | Yuknewicz et al. | |
| 2005/0198247 A1 | 9/2005 | Perry et al. | |
| 2006/0028470 A1 | 2/2006 | Bennett et al. | |
| 2006/0069635 A1 | 3/2006 | Ram et al. | |
| 2006/0100974 A1 | 5/2006 | Dieberger et al. | |
| 2006/0129554 A1 | 6/2006 | Suyama et al. | |
| 2006/0129914 A1 | 6/2006 | Ellis et al. | |
| 2006/0184529 A1 | 8/2006 | Berg et al. | |
| 2006/0221184 A1 | 10/2006 | Vallon et al. | |
| 2007/0022125 A1* | 1/2007 | Salam | G06F 16/951 |
| 2007/0078872 A1 | 4/2007 | Cohen | |
| 2007/0088723 A1* | 4/2007 | Fish | G06Q 30/00 |
| 2007/0100878 A1 | 5/2007 | Fielding et al. | |
| 2007/0118642 A1 | 5/2007 | Kumbalimutt | |
| 2007/0130585 A1 | 6/2007 | Perret et al. | |
| 2007/0174188 A1* | 7/2007 | Fish | G06Q 20/10 |
| | | | 705/39 |
| 2007/0214164 A1 | 9/2007 | MacLennan et al. | |
| 2007/0280123 A1 | 12/2007 | Atkins et al. | |
| 2008/0071580 A1 | 3/2008 | Marcus et al. | |
| 2008/0086363 A1 | 4/2008 | Kass et al. | |
| 2008/0091466 A1 | 4/2008 | Butler et al. | |
| 2008/0104542 A1 | 5/2008 | Cohen et al. | |
| 2008/0147578 A1 | 6/2008 | Leffingwell et al. | |
| 2008/0228442 A1 | 9/2008 | Lippincott et al. | |
| 2008/0270369 A1 | 10/2008 | Myerson et al. | |
| 2009/0063472 A1 | 3/2009 | Pell et al. | |
| 2009/0063473 A1 | 3/2009 | Van Den Berg et al. | |
| 2009/0192985 A1 | 7/2009 | Bolls et al. | |
| 2009/0299998 A1 | 12/2009 | Kim | |
| 2009/0319498 A1 | 12/2009 | Zabokritski et al. | |
| 2009/0327240 A1* | 12/2009 | Meehan | G06F 16/248 |
| 2010/0030888 A1 | 2/2010 | Nawabzada et al. | |
| 2010/0049692 A1* | 2/2010 | Astito | G06F 16/2452 |
| | | | 707/769 |
| 2010/0062796 A1 | 3/2010 | Hayton et al. | |
| 2010/0114885 A1 | 5/2010 | Bowers et al. | |
| 2010/0122194 A1 | 5/2010 | Rogers | |
| 2010/0162140 A1 | 6/2010 | Fereira et al. | |
| 2010/0205521 A1 | 8/2010 | Folting | |
| 2010/0228752 A1 | 9/2010 | Folting et al. | |
| 2010/0313127 A1 | 12/2010 | Gosper et al. | |
| 2010/0325118 A1 | 12/2010 | Takemoto | |
| 2011/0032260 A1 | 2/2011 | Duggan et al. | |
| 2011/0066585 A1 | 3/2011 | Subrahmanyam et al. | |
| 2011/0099500 A1 | 4/2011 | Smith et al. | |
| 2011/0145786 A1 | 6/2011 | Fayed et al. | |
| 2011/0167058 A1 | 7/2011 | Van Os | |
| 2011/0251992 A1 | 10/2011 | Bethlehem et al. | |
| 2011/0314148 A1 | 12/2011 | Petersen et al. | |
| 2012/0011474 A1 | 1/2012 | Kashik et al. | |
| 2012/0047025 A1 | 2/2012 | Strohman | |
| 2012/0102396 A1 | 4/2012 | Arksey et al. | |
| 2012/0124072 A1 | 5/2012 | Vaidyanathan et al. | |
| 2012/0173985 A1 | 7/2012 | Peppel | |
| 2012/0197934 A1 | 8/2012 | Zhang et al. | |
| 2012/0246303 A1 | 9/2012 | Petersen et al. | |
| 2012/0265727 A1 | 10/2012 | Naryzhnyy et al. | |
| 2012/0265805 A1 | 10/2012 | Samdadiya et al. | |
| 2013/0073573 A1 | 3/2013 | Huang et al. | |
| 2013/0086587 A1 | 4/2013 | Naik et al. | |
| 2013/0151491 A1 | 6/2013 | Gislason et al. | |
| 2013/0151563 A1 | 6/2013 | Addepalli et al. | |
| 2013/0173398 A1 | 7/2013 | Wang et al. | |
| 2013/0179460 A1 | 7/2013 | Acuna et al. | |

(56) References Cited

U.S. PATENT DOCUMENTS

| | | |
|---|---|---|
| 2013/0179793 A1 | 7/2013 | Duggan et al. |
| 2013/0191371 A1 | 7/2013 | Poznanski et al. |
| 2013/0212125 A1 | 8/2013 | Wierenga et al. |
| 2013/0283168 A1 | 10/2013 | Brown et al. |
| 2013/0305183 A1 | 11/2013 | Kumagai et al. |
| 2013/0326620 A1 | 12/2013 | Merza et al. |
| 2014/0006871 A1 | 1/2014 | Lakshmanan et al. |
| 2014/0032694 A1 | 1/2014 | Cohn et al. |
| 2014/0053070 A1 | 2/2014 | Powers et al. |
| 2014/0108437 A1 | 4/2014 | Brown et al. |
| 2014/0149393 A1 | 5/2014 | Bhatt et al. |
| 2014/0149592 A1 | 5/2014 | Krishna |
| 2014/0160238 A1 | 6/2014 | Yim et al. |
| 2014/0222641 A1 | 8/2014 | Kober et al. |
| 2014/0222750 A1 | 8/2014 | Uchiumi et al. |
| 2014/0297666 A1 | 10/2014 | Morris |
| 2014/0310649 A1 | 10/2014 | Bernstein et al. |
| 2014/0324862 A1 | 10/2014 | Bingham et al. |
| 2014/0344622 A1 | 11/2014 | Huang et al. |
| 2015/0058318 A1 | 2/2015 | Blackwell et al. |
| 2015/0109305 A1 | 4/2015 | Black |
| 2015/0213631 A1 | 7/2015 | Vander Broek |
| 2015/0254138 A1 | 9/2015 | Anderson et al. |
| 2015/0294256 A1 | 10/2015 | Mahesh et al. |
| 2015/0339405 A1 | 11/2015 | Vora et al. |
| 2016/0004736 A1 | 1/2016 | Tsuchida et al. |
| 2016/0004741 A1* | 1/2016 | Johnson ............... G06Q 50/16 707/609 |
| 2016/0125120 A1 | 5/2016 | Yu et al. |
| 2016/0188744 A1 | 6/2016 | Ito et al. |
| 2016/0224531 A1 | 8/2016 | Robichaud et al. |
| 2016/0224625 A1 | 8/2016 | Robichaud |
| 2016/0224643 A1 | 8/2016 | Robichaud |
| 2017/0032550 A1 | 2/2017 | Vander Broek |
| 2018/0060418 A1 | 3/2018 | Robichaud |
| 2018/0121497 A1 | 5/2018 | Robichaud et al. |
| 2018/0150507 A1 | 5/2018 | Robichaud et al. |
| 2018/0157704 A1 | 6/2018 | Robicaud |
| 2018/0157705 A1 | 6/2018 | Robicaud |
| 2018/0276272 A1 | 9/2018 | Robichaud et al. |
| 2019/0012304 A1 | 1/2019 | Robichaud et al. |
| 2019/0098106 A1 | 3/2019 | Mungel et al. |
| 2019/0155802 A1 | 5/2019 | Miller et al. |
| 2019/0155803 A1 | 5/2019 | Miller et al. |
| 2019/0155804 A1 | 5/2019 | Miller et al. |
| 2019/0179810 A1 | 6/2019 | Miller et al. |
| 2019/0188203 A1 | 6/2019 | James et al. |
| 2020/0159782 A1 | 5/2020 | Robichaud et al. |

OTHER PUBLICATIONS

Bing search q=display%020query%020system%020event%2 Apr. 4, 2016 (Submitted as received from the Patent Office).
Bing search q=display+query+system+event&src=IE-4-44-2016 (Submitted as received from the Patent Office).
Splunk Enterprise Security User Manual 2.0 (https://web.archive.org/web/20120712034303/http://docs.splunk.com/Documentaiton/ES/latest/User/Incident Reviewdashboard; dated Jul. 12, 2012; last accessed Nov. 21, 2016 to show the date of 2.0 user manual; and the complete PDF version of the Splunk Enterprise Security User Manual 2.0 downloaded Nov. 21, 2016—Uploaded in Two Parts.
Field Extractor App—Splunk (see https://www.youtube.com/watch?v=Gfl9Cm9v64Y video; dated Jul. 12, 2013; last accessed Jan. 21, 2016.
Bumgarner, Vincent, "Implementing Splunk: Big Data Reporting and Development for Operational Intelligence", Jan. 2013, 448 pages. Available at:http://2.droppdf.com/files/ug81f/implementing-splunk.pdf.
Carasso, David, "Exploring Splunk", Search Processing Language (SPL) Primer and Cookbook, First Edition Published Apr. 2012, CITO Research, New York, New York, 156 pages.
Citation of Link to Application Available Online: Data Wrangler Application, Available at: http://vis.stanford.edu/wrangler/app. Copyright 2011-2013 Stanford Visualization Group. Last accessed Dec. 15, 2015.
Citation of Link to Video Available Online: Wrangling Big Data from the CPG Industry with Cloudera & Trifacta, Published Oct. 20, 2014. Available at: https://www.youtube.com/watch?v=WuBjZzq8bWw. Last Accessed Dec. 15, 2015.
Non-Final Office Action dated Jul. 19, 2017 in U.S. Appl. No. 14/611,007, 13 pages.
Final Office Action dated Jul. 28, 2017 in U.S. Appl. No. 14/610,717, 18 pages.
Final Office Action dated Aug. 3, 2017 in U.S. Appl. No. 14/611,023, 22 pages.
Non-Final Rejection dated Mar. 22, 2018 in U.S. Appl. No. 14/815,928, 16 pages.
Non-Final Rejection dated Mar. 22, 2018 in U.S. Appl. No. 14/815,929, 12 pages.
Non-Final Office Action dated Mar. 28, 2018 in U.S. Appl. No. 14/815,927, 15 pages.
Non-Final Rejection dated Apr. 3, 2018 in U.S. Appl. No. 14/815,924, 12 pages.
Non-Final Office Action dated Jun. 27, 2019 in U.S. Appl. No. 15/799,949, 9 pages.
Notice of Allowance dated Oct. 19, 2017 in U.S. Appl. No. 14/610,676, 9 pages.
Final Office Action dated Oct. 30, 2017 in U.S. Appl. No. 14/610,702, 11 pages.
Notice of Allowance dated Nov. 8, 2017 in U.S. Appl. No. 14/611,023, 12 pages.
Notice of Allowance dated Dec. 21, 2017 U.S. Appl. No. 14/610,710, 8 pages.
Notice of Allowance dated Jan. 25, 2018 U.S. Appl. No. 14/611,007, 8 pages.
Notice of Allowance dated Feb. 20, 2018 in U.S. Appl. No. 14/611,002, 8 pages.
Non-Final Office Action dated Feb. 23, 2018 in U.S. Appl. No. 14/610,717, 25 pages.
Notice of Allowance dated Mar. 1, 2018 in U.S. Appl. No. 14/611,026, pp. 8.
Non-Final Office Action dated Mar. 29, 2018 in U.S. Appl. No. 14/815,932, 16 pages.
Notice of Allowance dated Apr. 24, 2018 in U.S. Appl. No. 14/611,002, 5 pages.
Non-Final Office Action dated Aug. 31, 2018 in U.S. Appl. No. 14/610,702, 6 pages.
Notice of Allowance dated Sep. 10, 2018 in U.S. Appl. No. 14/815,928, 8 pages.
Final Office Action dated Sep. 21, 2018 in U.S. Appl. No. 14/610,717, 27 pages.
Notice of Allowance dated Oct. 1, 2018 U.S. Appl. No. 14/815,924, 8 pages.
Notice of Allowance dated Oct. 1, 2018 U.S. Appl. No. 14/815,927, 8 pages.
Notice of Allowance dated Oct. 1, 2018 in U.S. Appl. No. 14/815,932, 8 pages.
Notice of Allowance dated Oct. 17, 2018 in U.S. Appl. No. 14/815,929, 8 pages.
Notice of Allowance dated Jul. 15, 2019 U.S. Appl. No. 14/610,702, 8 pages.
Notice of Allowance dated Aug. 15, 2019 in U.S. Appl. No. 14/610,717, 7 pages.
Notice of Allowance dated Nov. 29, 2019 in U.S. Appl. No. 14/610,717, 7 pages.
Final Office Action dated Jan. 31, 2020 in U.S. Appl. No. 15/799,949, 10 pages.
Non-Final Office Action dated Feb. 28, 2020 in U.S. Appl. No. 15/799,917, 13 pages.
Non-Final Office Action dated Mar. 4, 2020 in U.S. Appl. No. 15/878,299, 20 pages.
Notice of Allowance dated Mar. 5, 2020 in U.S. Appl. No. 14/610,702, 8 pages.
Splunk Cloud 8.0.2004 User Manual, available online, retrieved May 20, 2020 from docs.splunk.com, pp. 66.

(56) References Cited

OTHER PUBLICATIONS

Splunk Enterprise 8.0.0 Overview, available online, retrieved May 20, 2020 from docs.splunk.com, pp. 17.
Splunk Quick Reference Guide, updated 2019, available online at https://www.splunk.com/pdfs/solution-guides/splunk-quick-reference-guide.pdf, retrieved May 20, 2020, pp. 6.
U.S. Appl. No. 14/610,717, filed Jan. 30, 2015, Which is: Pending.
U.S. Appl. No. 14/611,026, filed Jan. 30, 2015, Which is: Granted.
U.S. Appl. No. 14/610,702, filed Jan. 30, 2015, Which is: Granted.
U.S. Appl. No. 14/610,676, filed Jan. 30, 2015, Which is: Granted.
U.S. Appl. No. 14/611,007, filed Jan. 30, 2015, Which is: Granted.
U.S. Appl. No. 14/611,002, filed Jan. 30, 2015, Which is: Granted.
U.S. Appl. No. 14/611,023, filed Jan. 30, 2015, Which is: Granted.
U.S. Appl. No. 14/610,710, filed Jan. 30, 2015, Which is: Granted.
U.S. Appl. No. 14/611,018, filed Jan. 30, 2015, Which is: Granted.
U.S. Appl. No. 14/815,923, filed Jul. 31, 2015, Which is: Granted.
U.S. Appl. No. 14/815,924, filed Jul. 31, 2015, Which is: Granted.
U.S. Appl. No. 14/815,927, filed Jul. 31, 2015, Which is: Granted.
U.S. Appl. No. 14/815,928, filed Jul. 31, 2015, Which is: Granted.
U.S. Appl. No. 14/815,929, filed Jul. 31, 2015, Which is Granted.
U.S. Appl. No. 14/815,932, filed Jul. 31, 2015, Which is: Granted.
U.S. Appl. No. 15/799,949, filed Oct. 31, 2017, Which is: Pending.
U.S. Appl. No. 15/799,917, filed Oct. 31, 2017, Which is: Pending.
U.S. Appl. No. 15/878,299, filed Jan. 23, 2018, Which is: Pending.
U.S. Appl. No. 15/885,546, filed Jan. 31, 2018, Which is: Pending.
U.S. Appl. No. 15/885,538, filed Jan. 31, 2018, Which is: Pending.
U.S. Appl. No. 15/996,226, filed Jun. 1, 2018, Which is: Pending.
U.S. Appl. No. 16/042,989, filed Jul. 23, 2018, Which is: Pending.
U.S. Appl. No. 16/216,021, filed Dec. 11, 2018, Which is: Pending.
U.S. Appl. No. 16/250,949, filed Jan. 17, 2019, Which is: Pending.
U.S. Appl. No. 16/260,971, filed Jan. 29, 2019, Which is: Pending.
U.S. Appl. No. 16/260,985, filed Jan. 29, 2019, Which is: Pending.
U.S. Appl. No. 16/260,962, filed Jan. 29, 2019, Which is: Pending.
U.S. Appl. No. 16/750,256, filed Jan. 23, 2020, Which is: Pending.
U.S. Appl. No. 16/919,400, filed Jul. 2, 2020, Which is: Pending.
Non-Final Office Action dated Mar. 26, 2020, in U.S. Appl. No. 15/885,546, 10 pages.
Non-Final Office Action dated Mar. 26, 2020, in U.S. Appl. No. 15/885,538, 11 pages.
Non-Final Office Action dated Apr. 17, 2020, in U.S. Appl. No. 15/996,226, 10 pages.
Final Office Action dated May 15, 2020, in U.S. Appl. No. 15/878,299, 20 pages.

\* cited by examiner

Original Search: 501
search "error | stats count BY host

Sent to peers: 502
search "error | prestats count BY host (map)

Executed by search head: 503
Merge prestats results received from peers (reduce)

| | App: Search & Reporting ∨ | | | | | Administrator ∨ Messages ∨ Settings ∨ Activity ∨ Help ∨ Find |
|---|---|---|---|---|---|---|
| Search Pivot Reports Alerts Dashboards Datasets Pipeline | | | | | | Search & Reporting |

New Pipeline — 800

Web Logs: Last 7 Days ∨

Input | 804a | 804b
Add new pipe... | Previewing first 100 results | Continue Job   Send to Background

| | _time | _raw |
|---|---|---|
| * | | |
| 1 | 2013-11-10T18:22:16.000-0800 | 91.205.189.15 - - [10/Nov/2013:18:22:16] "GET /oldlink?itemid=34&JSESSIONID=SD6SL7FF7ADFF53113 HTTP 1.1" 200 1665 "http://www.buttercupgames.com/oldlink?/itemid=EST-14" "Mozilla/5.0 (Windows NT 6.1; WOW64) AppleWebKit/536.5 (KHTML, like Gecko) Chrome/19.0.1084.46 Safari/536.5" 159 |
| 2 | 2013-11-10T18:22:15.000-0800 | 91.205.189.15 - - [10/Nov/2013:18:22:15] "GET /category.screen?categoryid=SHOOTER&JSESSIONID=SD6SL7FF7ADFF53113 HTTP 1.1" 200 1369 "http://www.google.com" "Mozilla/5.0 (Windows NT 6.1; WOW 64) AppleWebKit/536.5 (KHTML, like Gecko) Chrome/19.0.1084.46 Safari/536.5" 779 |
| 3 | 2013-11-10T18:20:56.000-0800 | 182.236.164.11 - - [10/Nov/2013:18:20:56] "GET /cart.do?action=addtocart&itemid=298&productid=BS-AG-G90&JSESSIONID=SD6SL8FF10ADFF53101 HTTP 1.1" 200 2252 "http://www.buttercupgames.com/oldlink?itemid=EST-15" "Mozilla/5.0 (Macintosh; Intel Mac OS X 10_7_4) AppleWebKit/536.5 (KHTML, like Gecko) Chrome/19.0.1084.46 Safari/536.5" 506 |
| 4 | 2013-11-10T18:20:55.000-0800 | 182.236.164.11 - - [10/Nov/2013:18:20:55] "POST /oldlink?itemid=EST-18&JSESSIONID=SD6SL8FF10ADFF53101 HTTP 1.1" 200 408 893 "http://www.buttercupgames.com/product.screen?productid=5F-BV5-G01" "Mozilla/5.0 (Macintosh; Intel Mac OS X 10_7_4) AppleWebKit/536.5 (KHTML, like Gecko) Chrome/19.0.1084.46 Safari/536.5" 506 |
| 5 | 2013-11-10T18:20:54.000-0800 | 182.236.164.11 - - [10/Nov/2013:18:20:54] "GET /category.screen?categoryid=ACCESSORIES&JSESSIONID=SD6SL8FF10ADFF53101 HTTP 1.1" 200 3920 "http://www.buttercupgames.com/oldlink? |

| | 804c | 804d | 804e | 804f | 804g | 804h |
|---|---|---|---|---|---|---|
| | source | host | bytes | clientip | method | referer |
| | tutorialdata.zip: ./www2/access.log | mrobichaud-mbp.sv.splunk.com | 1665 | 91.205.189.15 | GET | http://www.buttercupgames.com/oldlink?/itemid=EST-14 |
| | tutorialdata.zip: ./www2/access.log | mrobichaud-mbp.sv.splunk.com | 1369 | 91.205.189.15 | GET | http://www.google.com |
| | tutorialdata.zip: ./www2/access.log | mrobichaud-mbp.sv.splunk.com | 2252 | 182.236.164.11 | GET | http://www.buttercupgames.com/oldlink?/itemid=EST-15 |
| | tutorialdata.zip: ./www2/access.log | mrobichaud-mbp.sv.splunk.com | 893 | 182.236.164.11 | GET | http://www.buttercupgames.com/product.screen?productid=5F-BV5-G01 |
| | tutorialdata.zip: ./www2/access.log | mrobichaud-mbp.sv.splunk.com | 3920 | 182.236.164.11 | GET | http://www.buttercupgames.com/oldlink?itemid=EST-17 |

| * | _time | raw | source | host | bytes | clientip | method | referer | itemid | referer_itemid |
|---|---|---|---|---|---|---|---|---|---|---|
| 1 | 2013-11-10T18:22:16.000-0800 | 91.205.189.15 -- [10/Nov/2013:18:22:16] "GET /oldlink?itemid=EST-14&JSESSIONID=SD6SL7FF7ADFF53113 HTTP 1.1" 200 1665 "http://www.buttercupgames.com/oldlink?itemid=EST-14" "Mozilla/5.0 (Windows NT 6.1; WOW64) AppleWebKit/536.5 (KHTML, like Gecko) Chrome/19.0.1084.46 Safari/536.5" 159 | tutorialdata.zip:./www2/access.log | mrobichaud-mbp.sv.splunk.com | 1665 | 91.205.189.15 | GET | http://www.buttercupgames.com/oldlink?itemid=EST-14 | 34 | EST-14 |
| 2 | 2013-11-10T18:22:15.000-0800 | 91.205.189.15 -- [10/Nov/2013:18:22:15] "GET /category.screen?categoryid=SHOOTER&JSESSIONID=SD6SL7FF7ADFF53113 HTTP 1.1" 200 1369 "http://www.google.com" "Mozilla/5.0 (Windows NT 6.1; WOW 64) AppleWebKit/536.5 (KHTML, like Gecko) Chrome/19.0.1084.46 Safari/536.5" 779 | tutorialdata.zip:./www2/access.log | mrobichaud-mbp.sv.splunk.com | 1369 | 91.205.189.15 | GET | http://www.google.com | | |
| 3 | 2013-11-10T18:20:56.000-0800 | 182.236.164.11 -- [10/Nov/2013:18:20:56] "GET /cart.do?action=addtocart&itemid=EST-15&productid=BS-AG-G09&JSESSIONID=SD6SL8FF10ADFF53101 HTTP 1.1" 200 2252 "http://www.buttercupgames.com/oldlink?itemid=EST-15" "Mozilla/5.0 (Macintosh; Intel Mac OS X 10_7_4) AppleWebKit/536.5 (KHTML, like Gecko) Chrome/19.0.1084.46 Safari/536.5" 506 | tutorialdata.zip:./www2/access.log | mrobichaud-mbp.sv.splunk.com | 2252 | 182.236.164.11 | GET | http://www.buttercupgames.com/oldlink?itemid=EST-15 | 29 | EST-15 |
| 4 | 2013-11-10T18:20:55.000-0800 | 182.236.164.11 -- [10/Nov/2013:18:20:55] "POST /oldlink?itemid=EST-18&JSESSIONID=SD6SL8FF10ADFF53101 HTTP 1.1" 408 893 "http://www.buttercupgames.com/product.screen?productid=5F-BV5-G01" "Mozilla/5.0 (Macintosh; Intel Mac OS X 10_7_4) AppleWebKit/536.5 (KHTML, like Gecko) Chrome/19.0.1084.46 Safari/536.5" 506 | tutorialdata.zip:./www2/access.log | mrobichaud-mbp.sv.splunk.com | 893 | 182.236.164.11 | GET | http://www.buttercupgames.com/product.screen?productid=5F-BV5-G01 | | |
| 5 | 2013-11-10T18:20:54.000-0800 | 182.236.164.11 -- [10/Nov/2013:18:20:54] "GET /category.screen?categoryid=ACCESSORIES&JSESSIONID=SD6SL8FF10ADFF53101 HTTP 1.1" 200 3920 "http://www.buttercupgames.com/oldlink?itemid=EST-17" | tutorialdata.zip:./www2/access.log | mrobichaud-mbp.sv.splunk.com | 3920 | 182.236.164.11 | GET | http://www.buttercupgames.com/oldlink?itemid=EST-17 | | EST-17 |

FIG. 8G

| □ Pipelines | | 1112→ filter | | mine  data set  lookup  accelerated |
|---|---|---|---|---|
| i | Title | Actions | Tags | |
| ∨ | All Data ←1104a | 1108a→Edit Use as Input ←1106a | data set ←1110 | mine  accelerated  1102a |
| ∨ | Errors in the last 24 hours<br>Input  *Mobile Payments*<br>Creator  Created by *Search*<br>App  search<br>Schedule  Not scheduled  *Edit*<br>Acceleration  Enabled  *Edit*<br>Permissions  Shared in App. Owned by nobody.  *Edit* | Edit Use as Input | | |
| ∨ | Page Names | Edit Use as Input | | |
| ∨ | Web Logs ←1104b | 1108b→Edit Use as Input ←1106b | lookup  data set | 1102b |
| ∨ | Zeta License Usage | Edit Use as Input | | |
| ∨ | Zeta License Usage | Edit Use as Input | | |
| ∨ | Zeta License Usage | Edit Use as Input | | |
| ∨ | Zeta License Usage | Edit Use as Input | | |
| ∨ | Zeta License Usage | Edit Use as Input | | |
| ∨ | Zeta License Usage | Edit Use as Input | | |
| ∨ | Zeta License Usage | Edit Use as Input | | |

COLUMN-BASED TABLE MANIPULATION OF EVENT DATA TO ADD COMMANDS TO A SEARCH QUERY

CROSS-REFERENCE TO RELAYED APPLICATIONS

This application is a continuation of and claims priority from U.S. application Ser. No. 14/611,018, filed Jan. 30, 2015, entitled "Column-Based Table Manipulation of Event Data," the entire contents of each application being herein incorporated by reference.

BACKGROUND

Modern data centers often include thousands of hosts that operate collectively to service requests from even larger numbers of remote clients. During operation, components of these data centers can produce significant volumes of machine-generated data. In order to reduce the size of the data, it is typically pre-processed before it is stored. In some instances, the pre-processing includes extracting and storing some of the data, but discarding the remainder of the data. Although this may save storage space in the short term, it can be undesirable in the long term. For example, if the discarded data is later determined to be of use, it may no longer be available.

In some instances, techniques have been developed to apply minimal processing to the data in an attempt to preserve more of the data for later use. For example, the data may be maintained in a relatively unstructured form to reduce the loss of relevant data. Unfortunately, the unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority. Moreover, processing of the data may return a large amount of information that can be difficult for a user to interpret. For example, if a user submits a search of the data, the user may be provided with a large set of search results for the data but may not know how the search results relate to the data itself or how the search results relate to one another. As a result, a user may have a difficult time deciphering what portions of the data or the search results are relevant to her/his inquiry.

SUMMARY

Embodiments of the present invention are directed to column-based table manipulation of event data. In accordance with aspects of the present disclosure, a search interface can be displayed in a table format that includes a plurality of columns and a plurality of rows forming cells with the plurality of columns. Each column includes data items of an event attribute of a set of events utilized to populate the table format, and each cell in the table format includes one or more of the data items of the event attribute.

In various implementations, a user may select one or more of the columns in the table format, and based on the user selection, a list of options is displayed that corresponds to the selected one or more columns. The list of options can be contextually relevant to the selection, such that options are included and/or excluded from the list of options based on context. Furthermore, the list of options can be contextually relevant to the selection, such that options that are included may be generated, at least partially based on context. For example, one or more command elements associated with an option may be generated based on the context.

Based on at least an option that is selected from the list of options by the user, and the event attribute for each selected column, one or more commands are added to a search query that corresponds to the set of events. In some implementations, the search query is automatically executed after having the one or more commands added thereto to provide an updated set of events. The updated set of events is utilized to update the table format in the search interface to correspond to the updated set of events. In this way, the user may directly interact with the table format to modify the search query and view results of the modification to effectively and efficiently generate search queries.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 5 illustrates an exemplary search query received from a client and executed by search peers in accordance with the disclosed embodiments.

FIG. 6B illustrates a data summary dialog that enables a user to select various data sources in accordance with the disclosed embodiments.

FIG. 8A illustrates a search screen in accordance with the disclosed embodiments.

FIG. 8B illustrates a search screen in accordance with the disclosed embodiments.

FIG. 8C illustrates a search screen in accordance with the disclosed embodiments.

FIG. 8D illustrates a search screen in accordance with the disclosed embodiments.

FIG. 8E illustrates a search screen in accordance with the disclosed embodiments.

FIG. 8F illustrates a search screen in accordance with the disclosed embodiments.

FIG. 8G illustrates events in a table format including fields extracted from the events.

FIG. 11 illustrates a selection interface in accordance with the disclosed embodiments.

DETAILED DESCRIPTION

Figure 1:
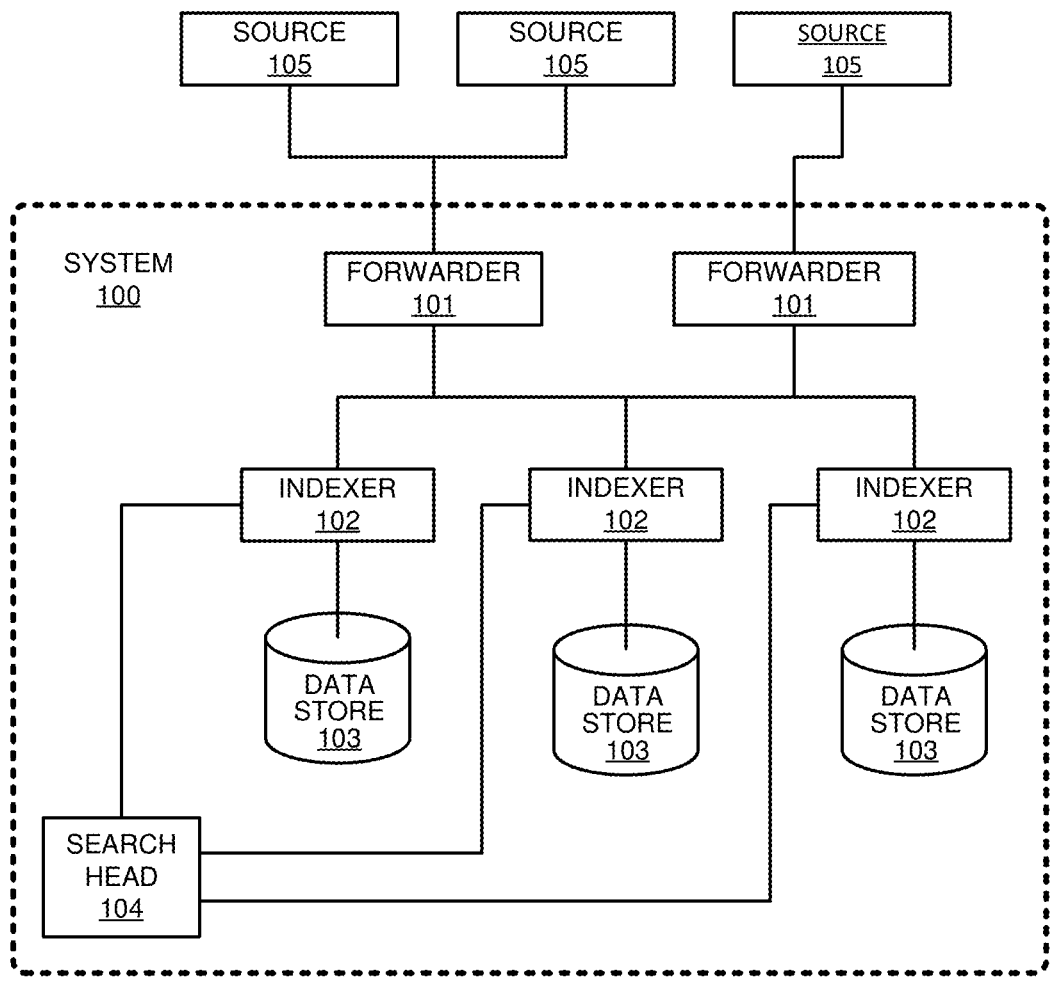
FIG. 1 presents a block diagram of an event-processing system in accordance with the disclosed embodiments.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time.

Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements, or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
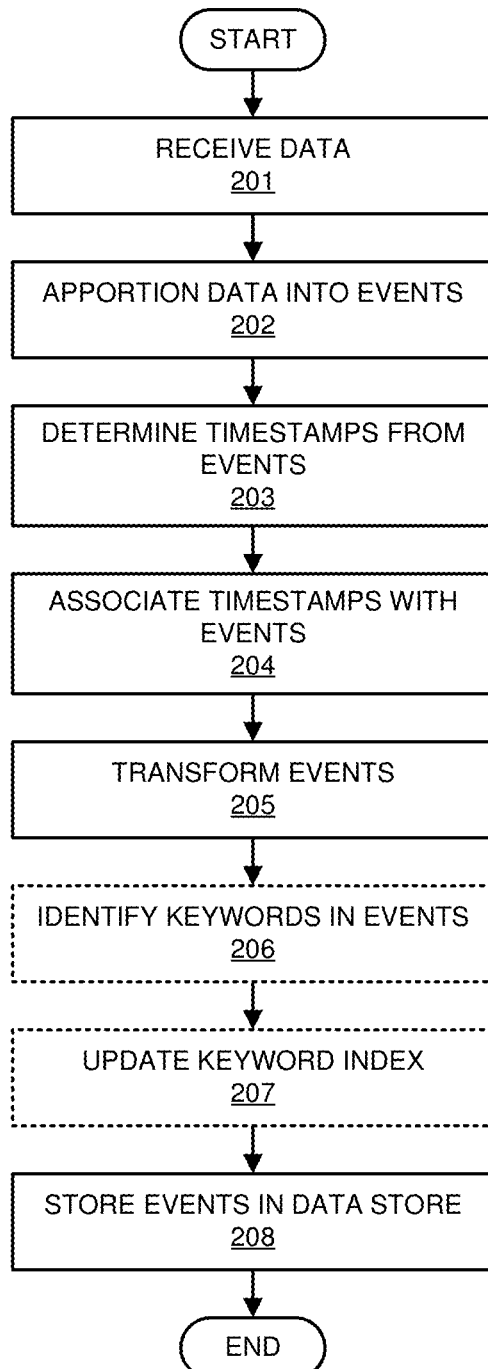
FIG. 2 presents a flowchart illustrating how indexers process, index, and store data received from forwarders in accordance with the disclosed embodiments.

FIG. 2 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored in flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
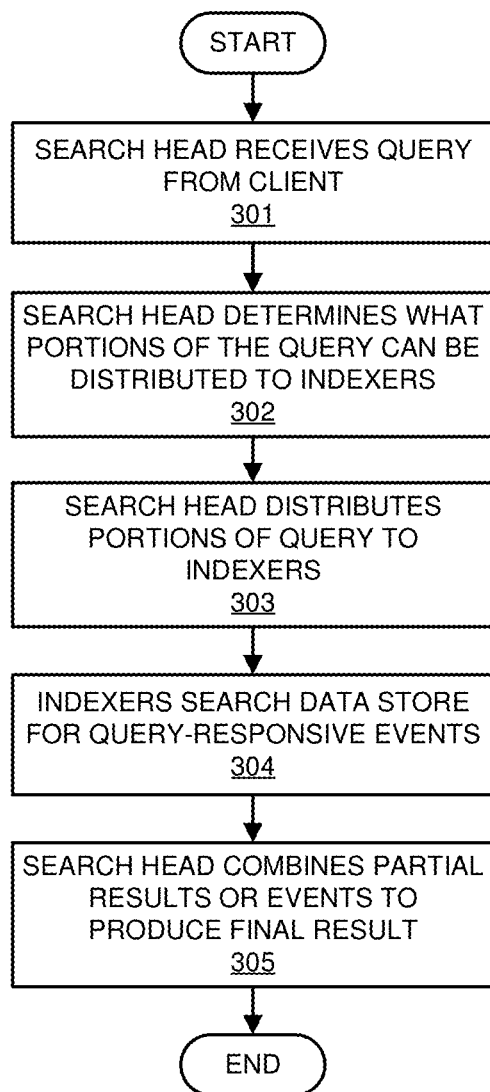
FIG. 3 presents a flowchart illustrating how a search head and indexers perform a search query in accordance with the disclosed embodiments.

FIG. 3 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
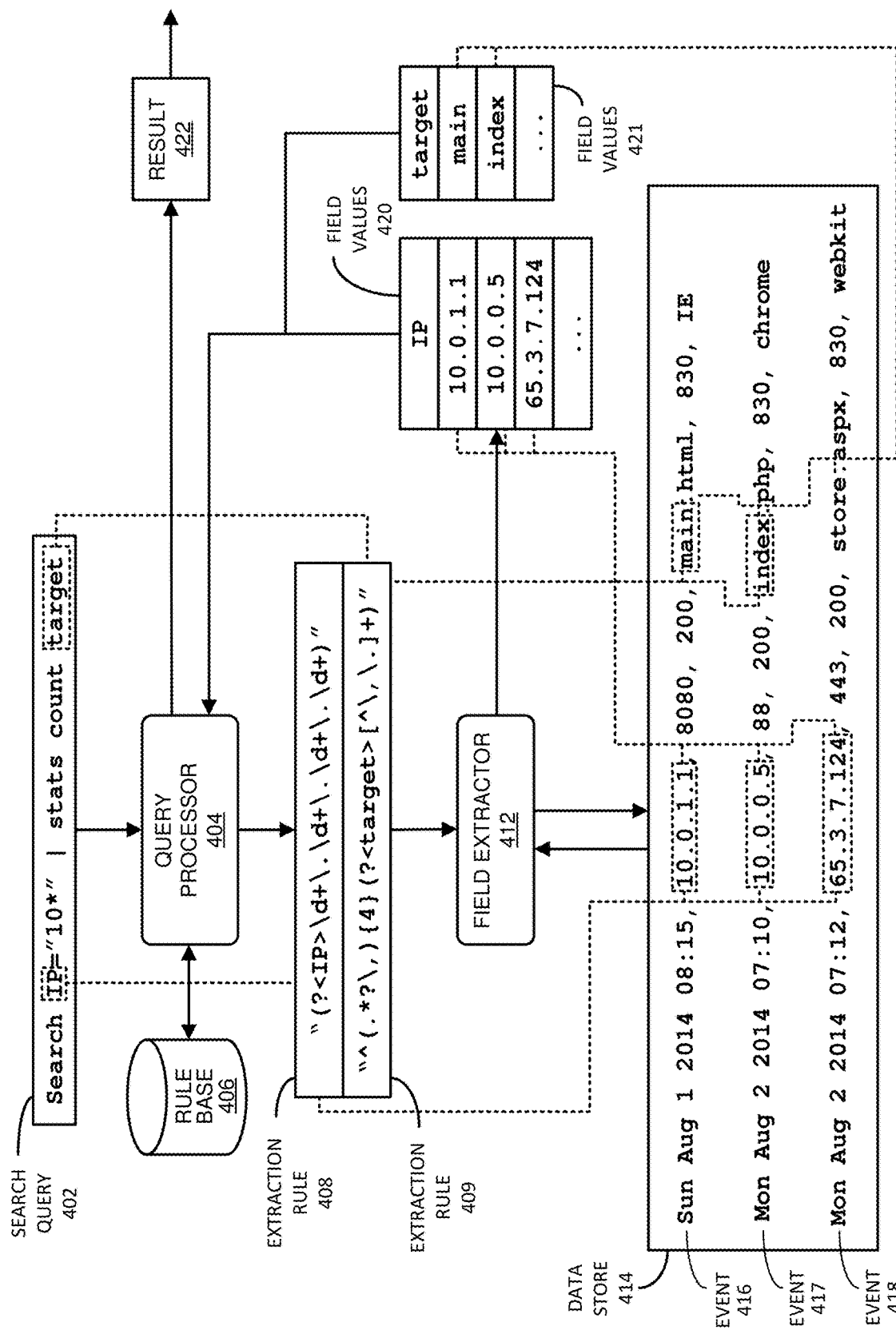
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
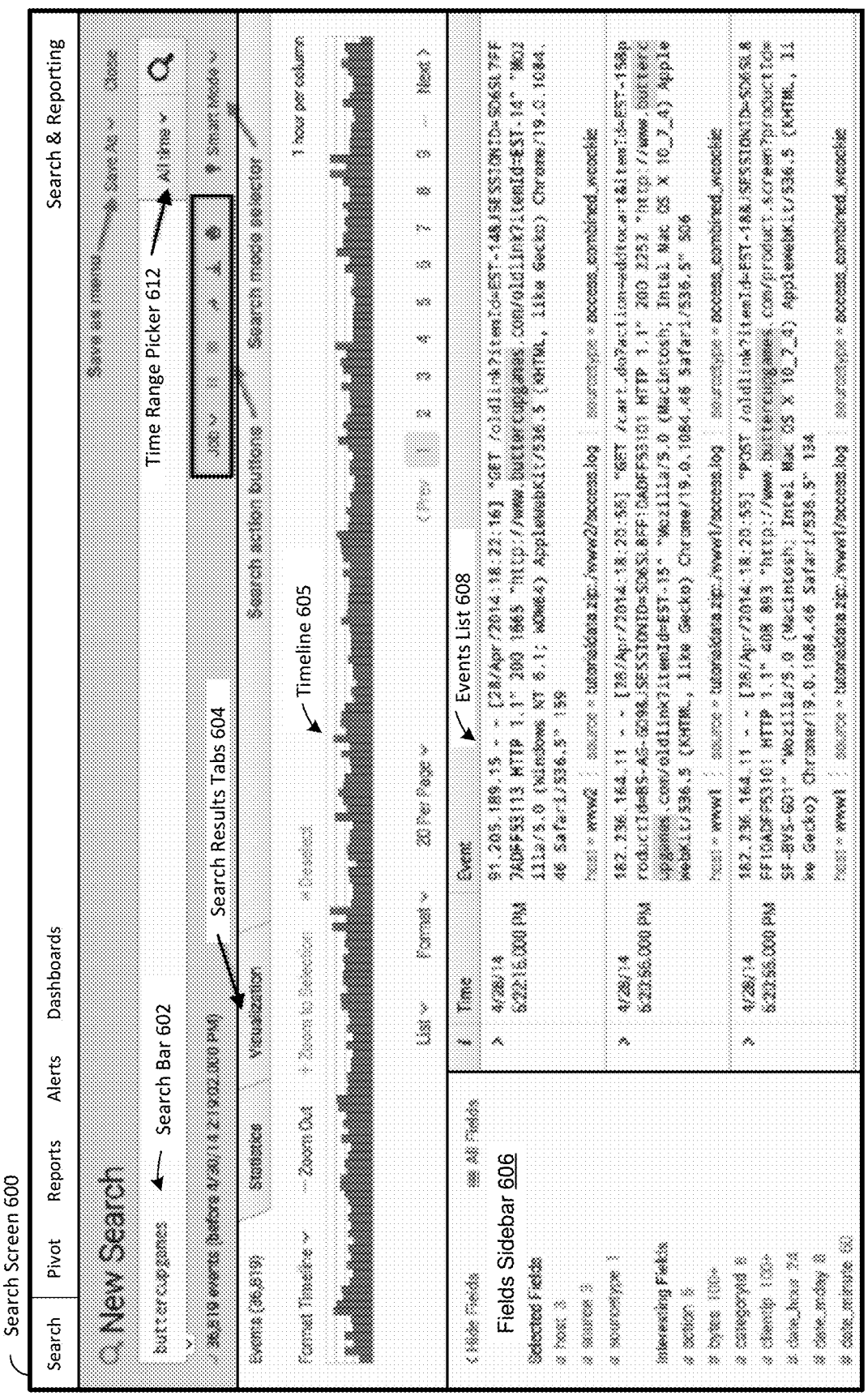
FIG. 6A illustrates a search screen in accordance with the disclosed embodiments.
Figure 6B:
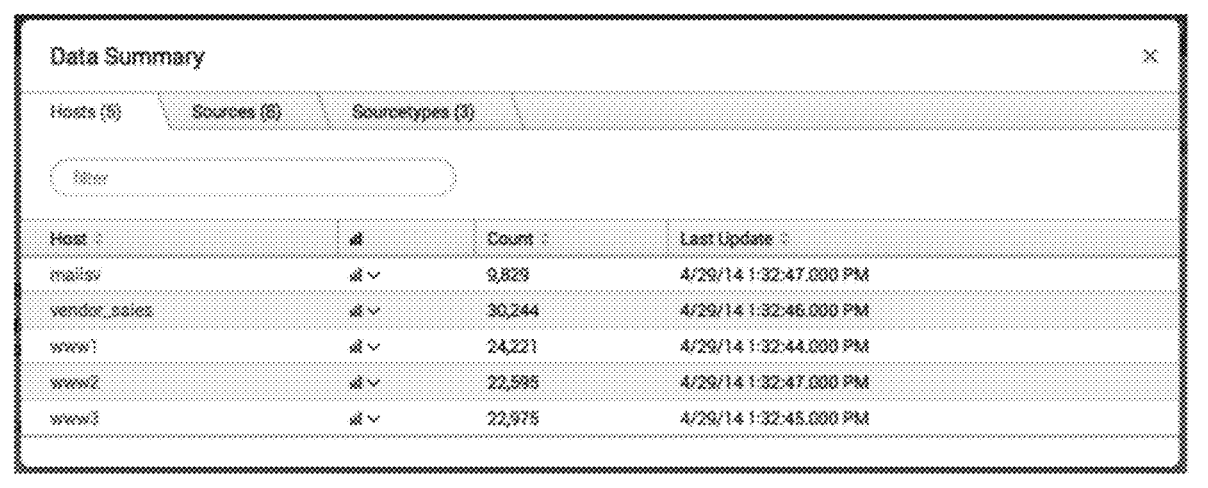

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 include: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3)

using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can be split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices, and sensors. The security-related information can also originate from various sources in a network, such as routers, switches, email servers, proxy servers, gateways, firewalls, and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
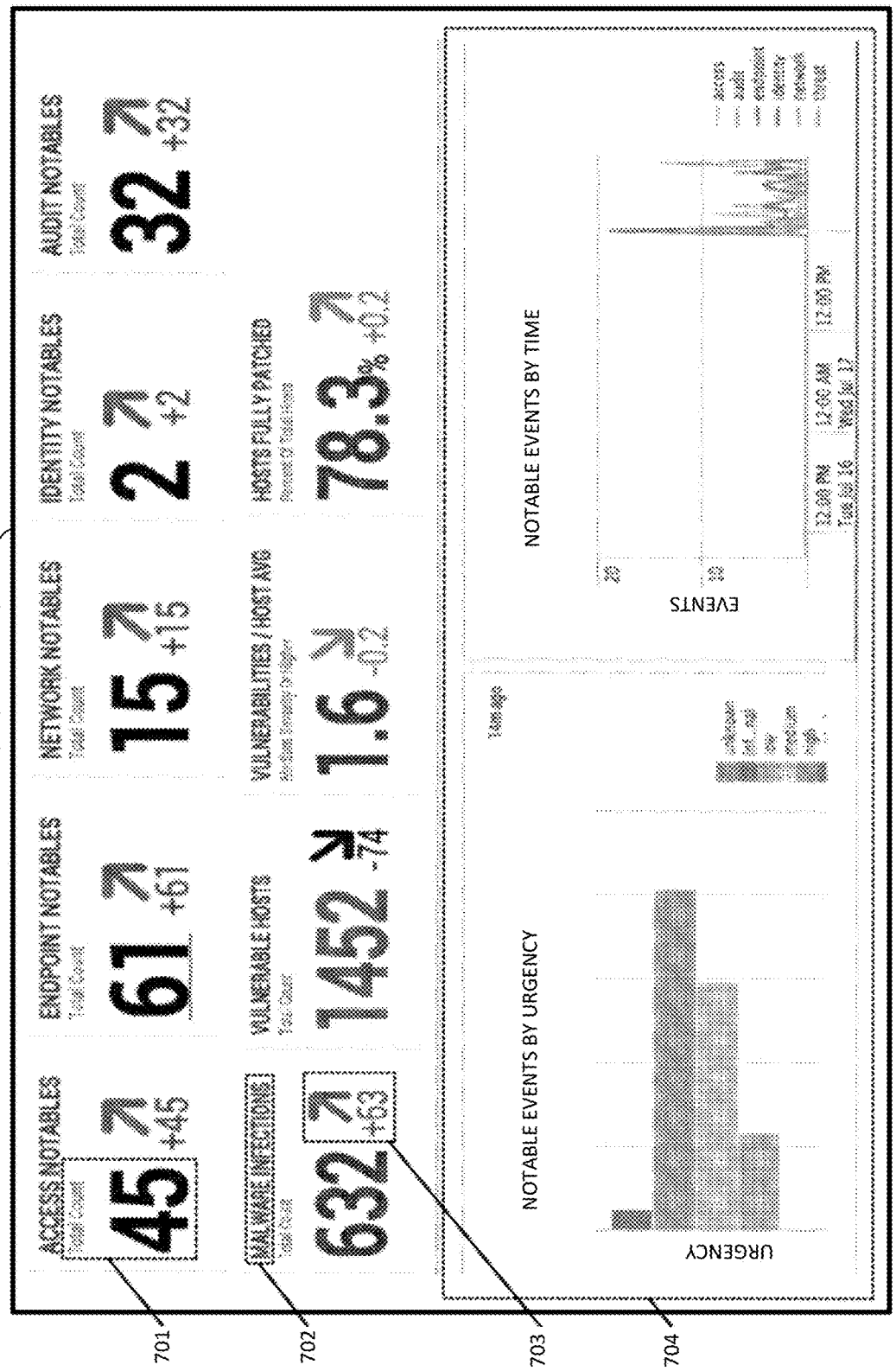
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
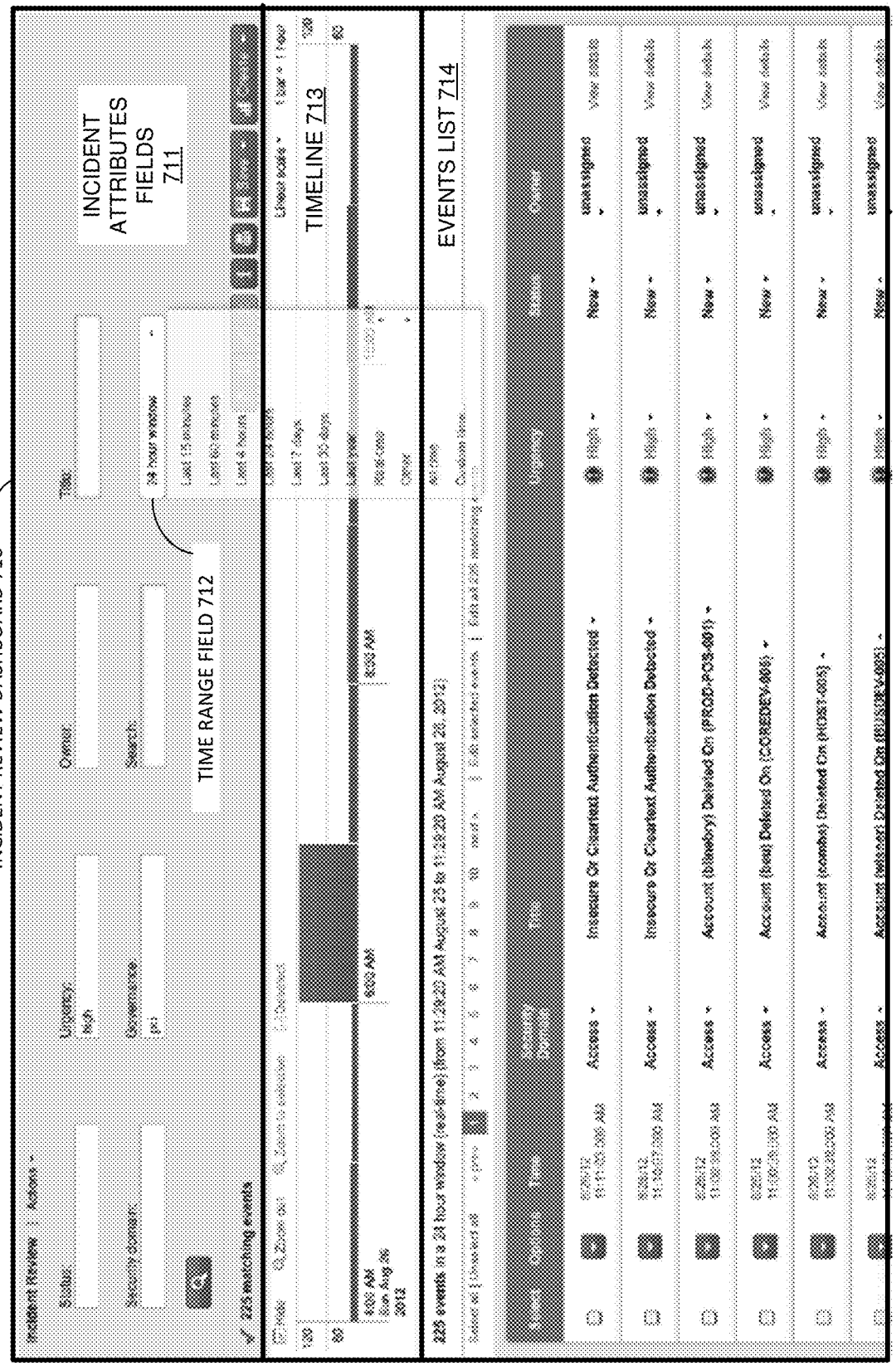
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent application Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware-.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
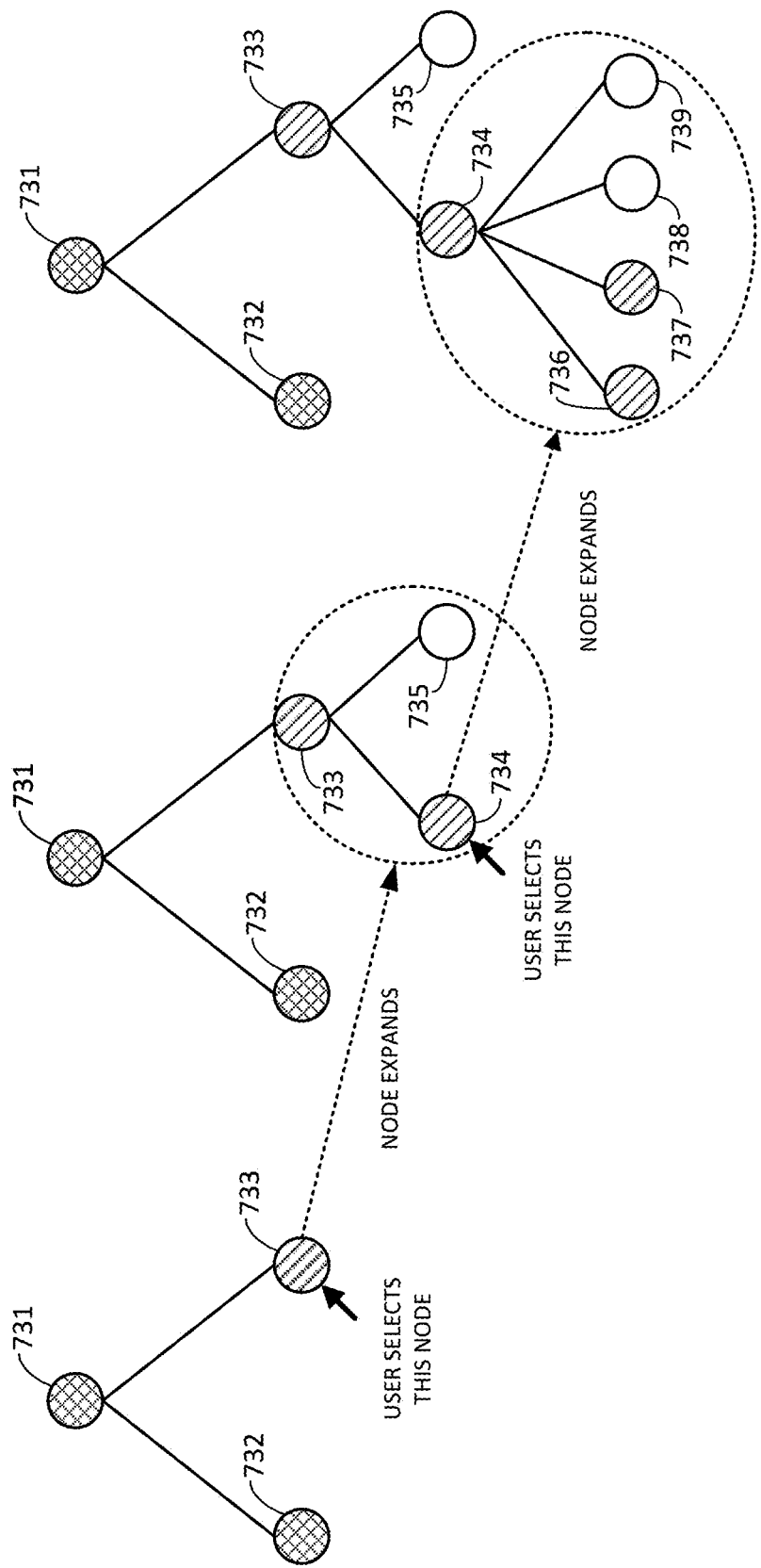
FIG. 7C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
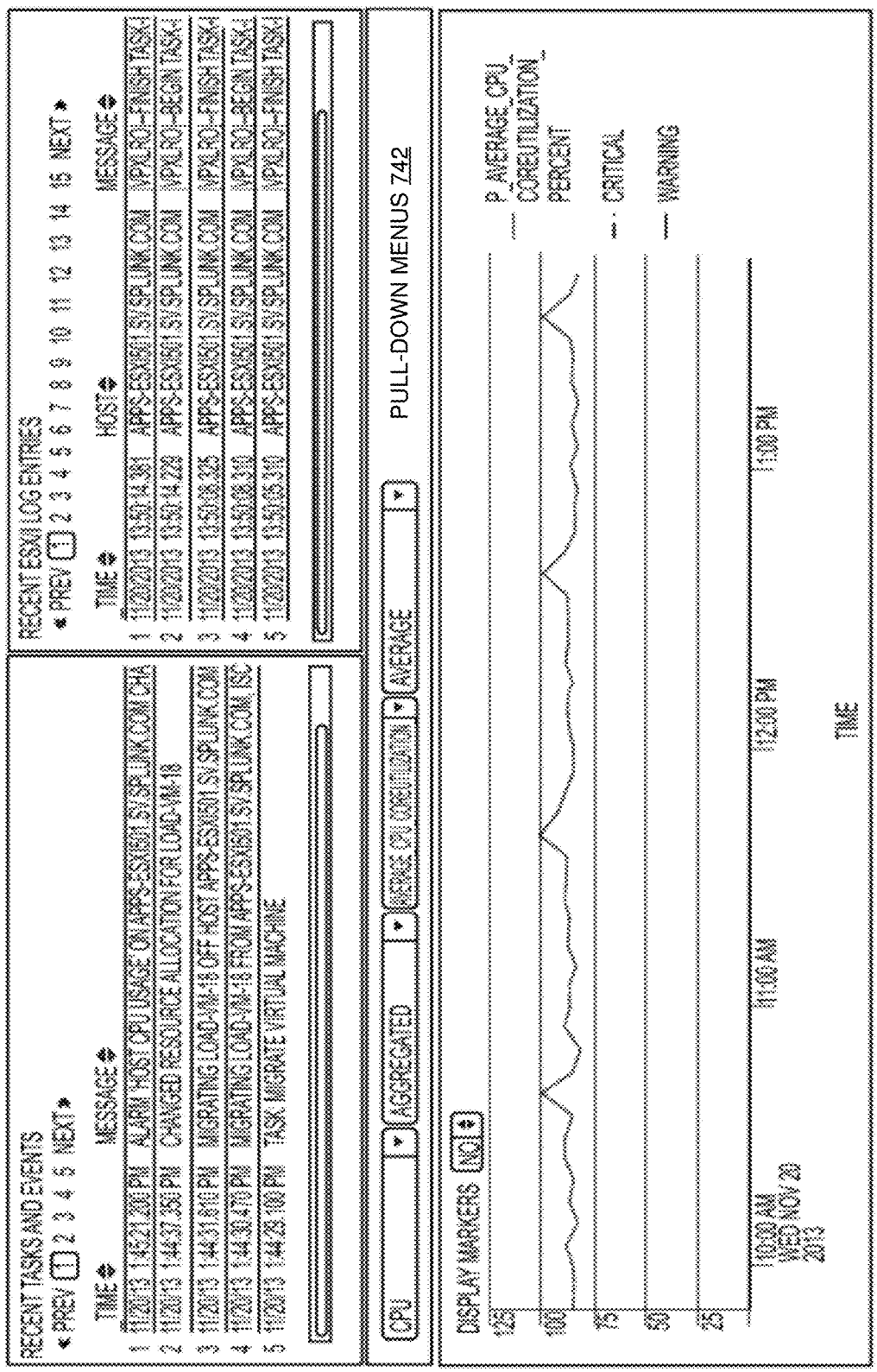
FIG. 7D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data, and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.0 Additional Exemplary Search Screen

FIG. 8A illustrates exemplary search screen 800 in accordance with some implementations of the present disclosure. Search screen 800 may be utilized as part of a search interface to display one or more events returned as part of a search result set based on a search query. Display of an event may include display of one or more event attributes of the event, examples of which include extracted fields, metadata, event raw data, and/or other types of data items assigned to the event. Search screen 800 may also be utilized as part of a search interface that allows a user to modify the search query. Some exemplary options for modifying the search query include any combination of deleting commands from the search query, adding commands to the search query, reordering one or more commands in the search query, and modifying variables, parameters, arguments, and/or other properties of commands in the search query.

Search screen 800 may also be utilized to update the search result set to correspond to the modified search query and to update the events that are displayed in search screen 800 to correspond to the updated search result set. In some cases, based on a search query being modified, the search query could be completely re-executed to retrieve new search results and generate the updated search result set. In other cases, the search query may only be partially executed. For example, in implementations where a pipelined search language, such as SPL, is employed for search queries, additional commands that are added to a search query may be applied to at least some previous search results. These and other variations are possible for updating the search result set to correspond to a search query.

By interacting with search screen 800 to create and/or modify search queries, a user may utilize the search interface to filter, sort, clean, enrich, analyze, report on, and/or otherwise carryout functionality provided for by commands in search queries. Furthermore, as the user generates modified search queries, the search result set can be updated, with events displayed in search screen 800 being updated to reflect the modifications. Utilizing this approach, a user may iteratively modify a search query and view the impact of the modification via updated search results. This approach can be employed to enable users to effectively and efficiently generate queries that return expected and desired results, even without extensive knowledge of the underlying commands and/or search language employed by the queries.

2.1 Exemplary Table Format

In various implementations, one or more events can be displayed in a table format, such as table format 802 in search screen 800. The table format can be employed in various interfaces for interacting with displayed events in various ways and its use is not limited to search interfaces or search screens. Events can be used to populate the table format, and may be search results, such as in search screen 800, but could more generally be any type of events. Furthermore while in search screen 800, events are displayed via table format 802, other formats are possible in various implementations contemplated herein.

Table format 802 comprises one or more columns, such as columns 804a, 804b, 804c, and 804d and one or more rows, such as rows 806a, 806b, 806c, 806d, and 806e. Table format 802 can include additional rows and/or columns, not shown in FIG. 8A, which may optionally be viewed by scrolling search screen 800, or by other suitable means. The scrolling may reveal additional events and/or additional event attributes on search screen 800.

In the example shown, each row corresponds to an event. By way of example, search screen 800 is shown as displaying events 1, 2, 3, 4, and 5, which are each search results of a search result set that can include any number of additional results that are not shown. A search results set may generally include any number of search results. Each column corresponds to an event attribute, such as an extracted field, metadata about events (e.g., a default field), or event raw data. Each event attribute is assigned a respective attribute label, which can be utilized to represent the corresponding attribute in the table format. For example, row 806a corresponds to event 1 and column 804a corresponds to an event attribute of event 1 having an attribute label of_time, comprising a timestamp data item. Other attribute labels shown in FIG. 8A include_raw, corresponding to event raw data, source and host corresponding to metadata, and bytes, clientip, method, and referer, corresponding to extracted fields.

The rows in table format 802 form cells with the columns, and each cell comprises a data item of an event attribute of a corresponding column. For example, in search screen 800, the event attribute having attribute label_time has a value of 2013-11-10T18:22:16.000-0800 for event 1, 2013-11-10T18:22:15.000-0800 for event 2, and so on. Data items of events are shown in FIG. 8A by a textual representation of their value. Although not the case in the table formats shown herein, it is possible that the underlying value could vary from the textual representation. As an example, numeric data items could be textually represented in rounded form. Furthermore, some of the data items could be represented by means other than a textual representation.

Data items in a column are assigned to an event attribute forming sets of attribute-data item pairs, with each data item corresponding to a respective event for that event attribute. Search screen 800 shows data items of multiple events for each event attribute. The displayed event attributes correspond to the search result set, but other event attributes corresponding to the search result set could potentially be hidden from view or not included in a column.

In the present example, each row in table format 802 corresponds to a respective event and each column corresponds to a respective event attribute of multiple events, with each cell comprising one or more data items of the respective event attribute of the respective event. In some cases, columns of the table format may be reordered in a displayed search interface based on a user interaction with the table format. For example, a user may select a column to move (e.g., using a mouse) and drag the selected column to a new position in the table format.

A search query corresponding to the search result set that is utilized to populate the cells of table format 802 can have its constituent commands be at least partially represented in search screen 800. One such approach is illustrated by command entry list 808 in search screen 800. Exemplary command entry lists will later be described in additional detail, and for purposes of the present disclosure, can be employed with other types of interfaces, which do not necessarily include events displayed in a table format.

Command entry list 808 corresponds to at least a partial representation of the commands of the search query and comprises one or more command entries. Each command entry is respectively representing one or more commands of the search query. Furthermore, the list of search command entries is displayed in a sequence corresponding to a sequence of the search commands within the search query. Another approach to at least partially representing search commands of the search query in search screen 800 comprises utilizing a search bar, in addition to, or instead of a command entry list. The search bar can accept user input in the form of textual input to a search string that corresponds to the search query.

2.2 Exemplary Interactions with a Table Format

In some implementations, a user can interact with one or more events of a set of events (e.g., a search result set) that are used to populate a table format by interacting with the table format. For example, a user can interact with table format 802, which is populated with at least some data items from events that correspond to the search result set.

In some respects, a user can make a selection of one or more portions of the table format. Based on the selection, the system causes for display one or more options (e.g., a list of options) corresponding to the selected one or more portions. Based on a user selecting one of the displayed options, operations corresponding to the displayed option can be carried out by the system.

In implementations where the table format is part of a search system, the interactions can be made to create and/or modify search queries. In some approaches, a user makes a selection of one or more portions of the table format. Based on the selection, the search system causes for display one or more options (e.g., a list of options) corresponding to the selection. The search system can cause one or more commands to be added to a search query that corresponds to the set of events used to populate the table format, based on a user selecting one of the options from the list of options. The one or more commands that are added to the search query can be based on (e.g., generated based on) at least the option that is selected by the user, and potentially other factors, such as one or more data items and/or one or more event attributes in the selected one or more portions of the table format.

Examples of selectable portions of a table format include selectable rows, columns, cells, and text, which are described in additional detail below. Depending on the implementation employed, any combination of these table elements may or may not be selectable. As an example, in some implementations, one or more cells may be selectable without necessarily requiring other portions of the table format to be selectable (i.e., only cells could be selectable). The same is true for other types of table elements, such as columns, and text. Furthermore, in some cases portions of the table format are individually selectable (e.g., individual cells or individual columns could be selected). In addition, or instead, portions may be selectable in groups (e.g., multiple cells or multiple columns could be selected).

Figure 8B:
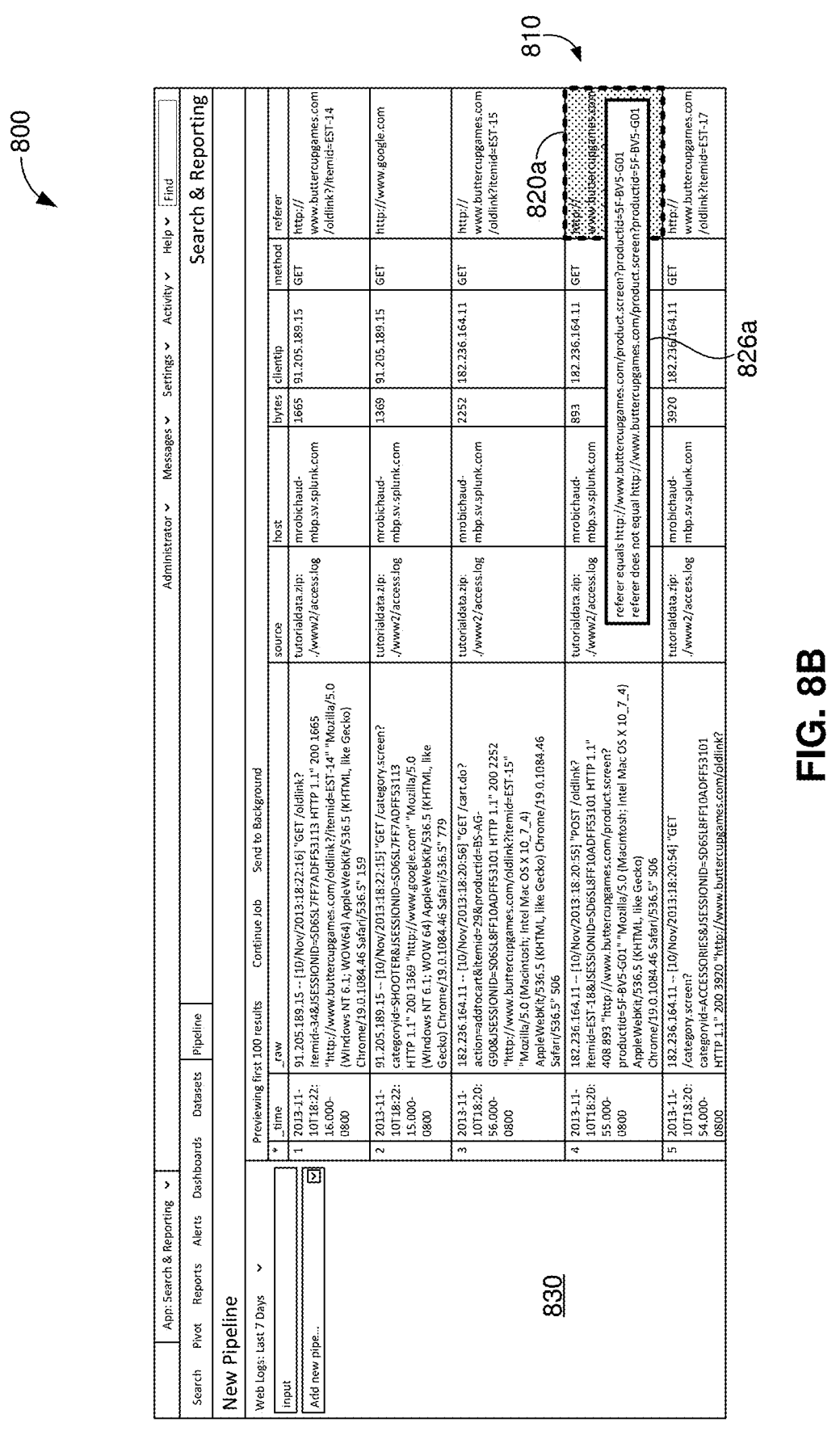
Figure 8C:
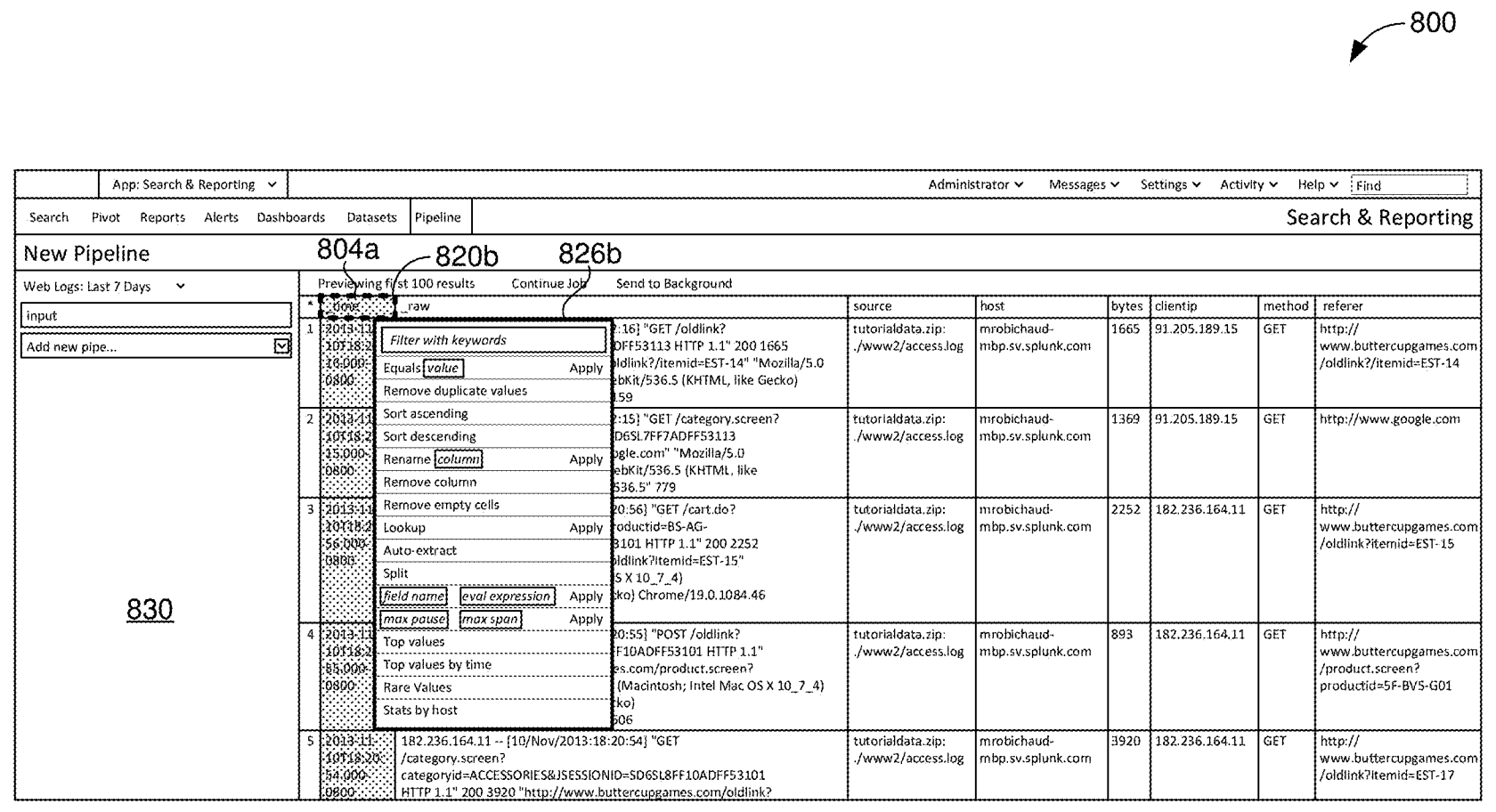
Figure 8D:
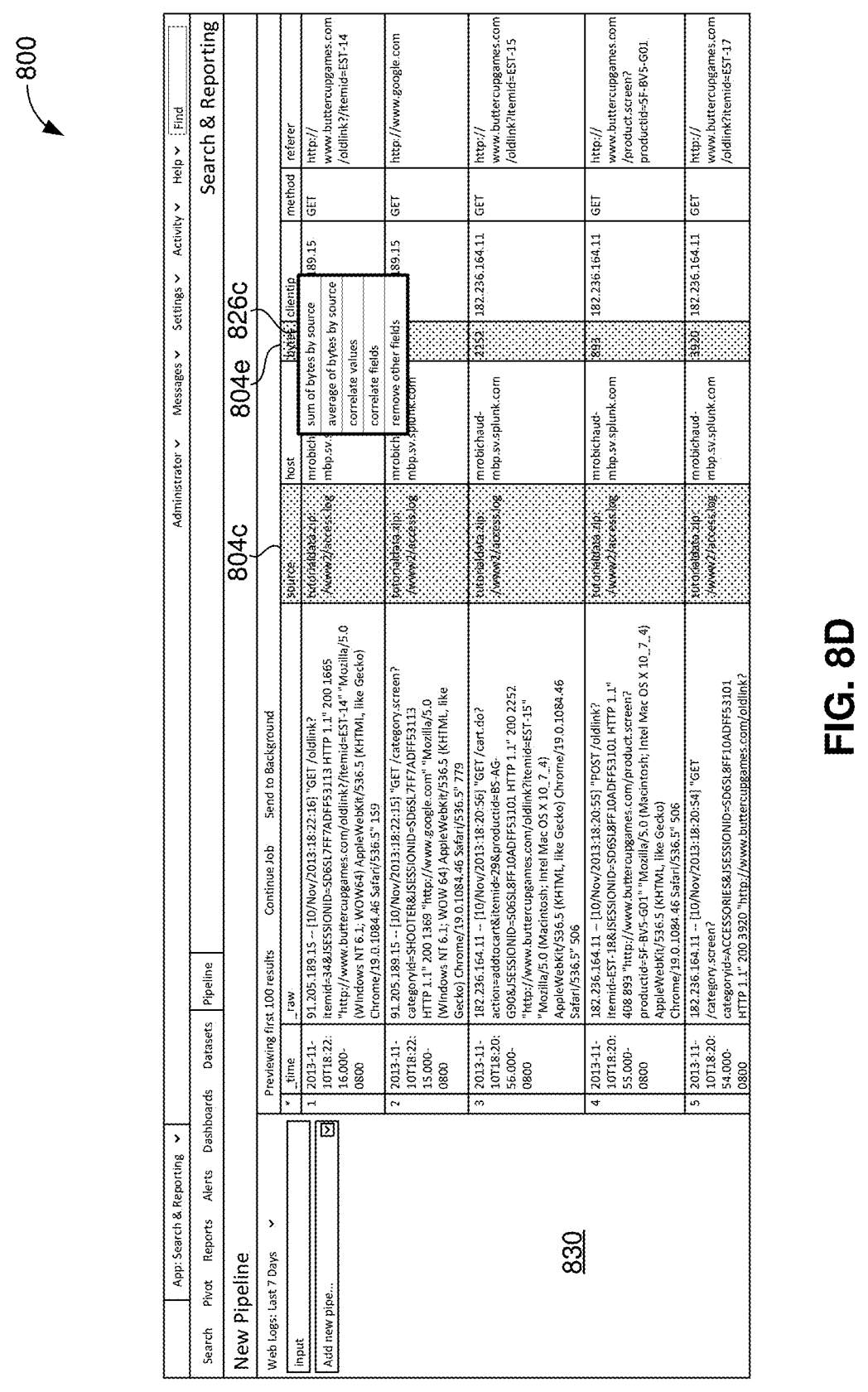
Figure 8E:
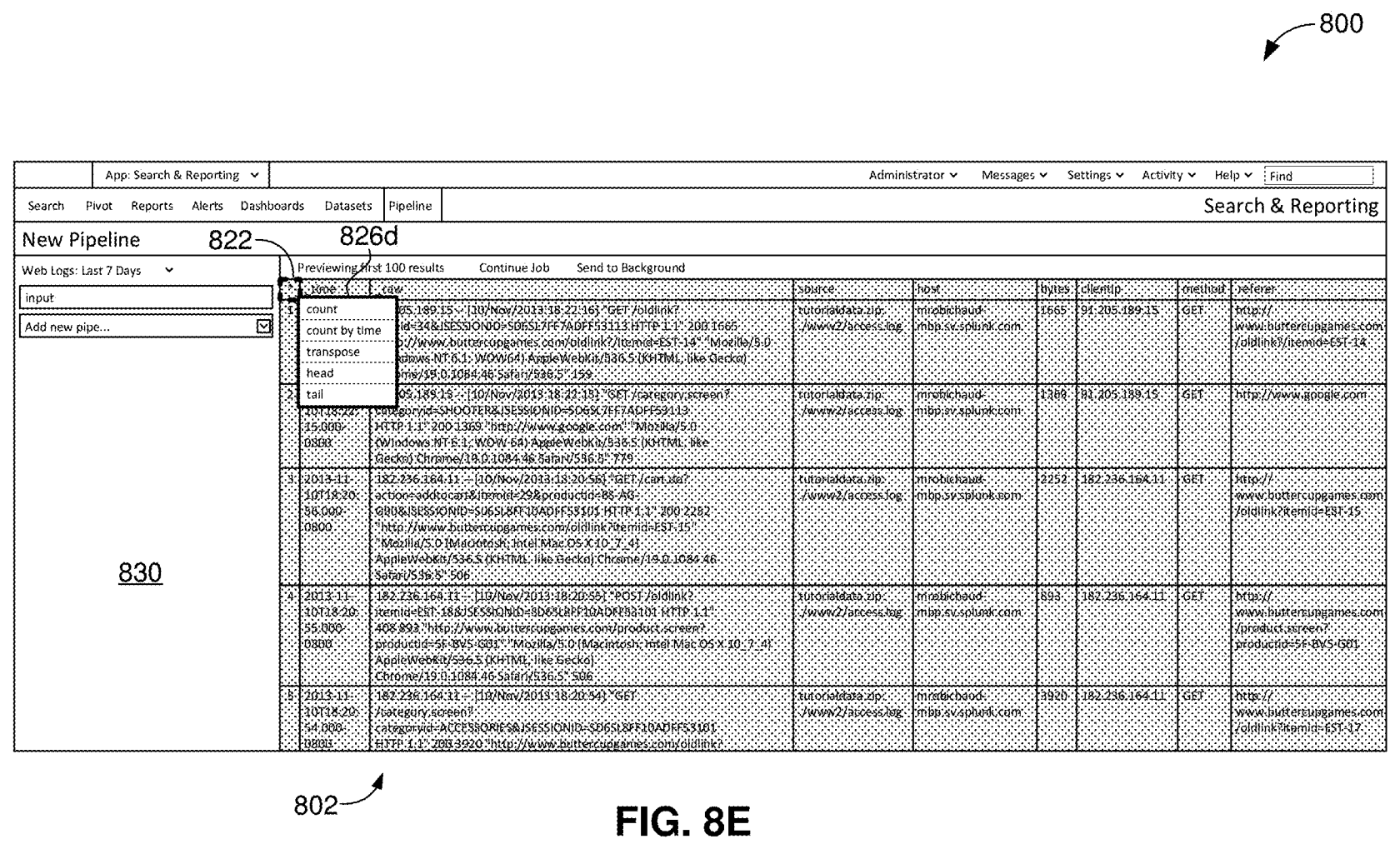
Figure 8F:
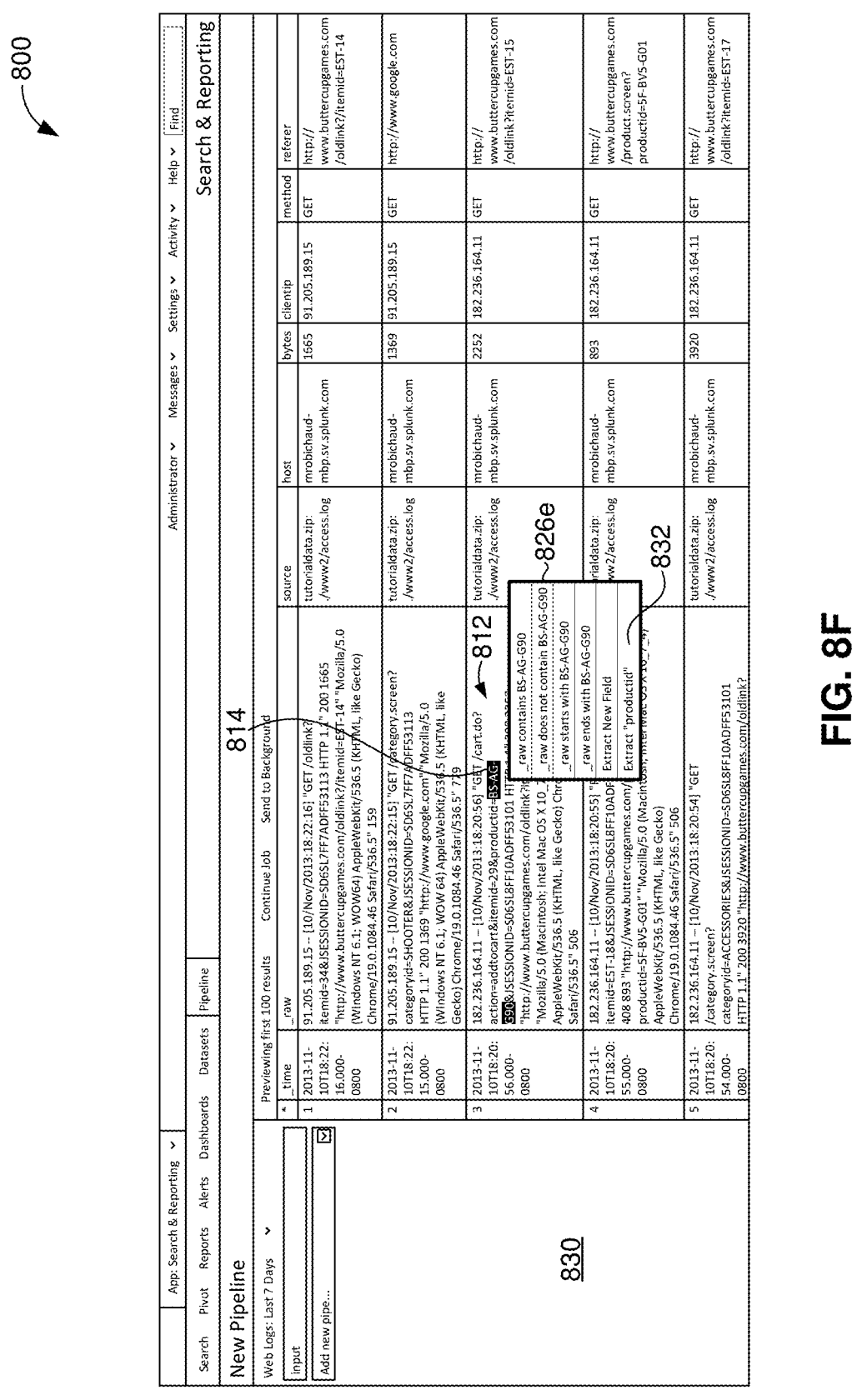

FIGS. 8B, 8C, 8D, 8E, and 8F represent search screen 800 after respective portions of table format 802 have been selected by a user. FIG. 8B illustrates where a selected portion is an individual cell (e.g., cell 810), although in some implementations a user may select multiple cells. FIG. 8C illustrates where a selected portion is an individual column (e.g., column 804a). FIG. 8D illustrates where multiple columns are selected (e.g., columns 804b and 804c). FIG. 8E illustrates where table format 802 itself is selected. FIG. 8F illustrates where a portion of a textual representation (text) of one or more data items (e.g., portion 814 (a text portion) of textual representation 812) is selected. It is noted that, where multiple columns are selected by a user, the selected columns need not be adjacent to one another, as shown. Similarly, where multiple cells are selected in the table format, those selected cells need not be adjacent to one another.

Although many approaches exist for selection of portions of a table format, in some implementations, a selectable portion(s) may be highlighted or otherwise emphasized when a pointer that is displayed in the user interface moves over a particular region of the display (e.g., a region of the table format) that corresponds to the selectable portion(s). This feature is also referred to as highlight with rollover (e.g., detected when a pointer moves over a region). One or more highlighted selectable portions can then be selected in response to additional user input, such as a mouse click or touch input to select the selectable portions. A shift-click or other method could be utilized to select additional selectable portions.

By way of example, in search screen 800, each cell is individually selectable and the region for each cell is substantially coextensive with the cell. For example, in FIG. 8B, region 820a can be used to select cell 810, which is shown as being emphasized and selected. Furthermore, each column is individually selectable and the region for each column is coextensive with the column's header, which comprises an attribute label of the event attribute of the column. For example, in FIG. 8C, region 820b can be used to select column 804a, which is shown as being emphasized and selected. In implementations where rows are selectable, the region for a row could similarly correspond to the row's header (displaying the event number in the present implementation).

Selection of a textual representation, or a portion thereof, could optionally be handled, at least partially using highlight with rollover. In search screen 800, a portion of a textual representation may be selected by the user using a click, drag to highlight, and release, as one example. Any of the various characters in text of a textual representation may be highlighted and selected, and in some implementations, multiple textual representation portions could be selected from multiple cells.

2.3 Exemplary Options

A variety of approaches are available for presenting options that are displayed based on and corresponding to the selection of one or more portions of the table format. In some implementations, options can be presented as a list of selectable options. Options may appear in sidebar 830, or elsewhere. In FIGS. 8B, 8C, 8D, 8E, and 8F, options are displayed in option menus. Display locations of option menus can be based on the one or more portions of the table format that are selected by the user. For example, option menus can be configured to appear proximate to (e.g., over, or adjacent to) the one or more selected portions of the table format, as illustrated by option menus 826a, 826b, 826c, 826d, and 826e.

Figure 9:
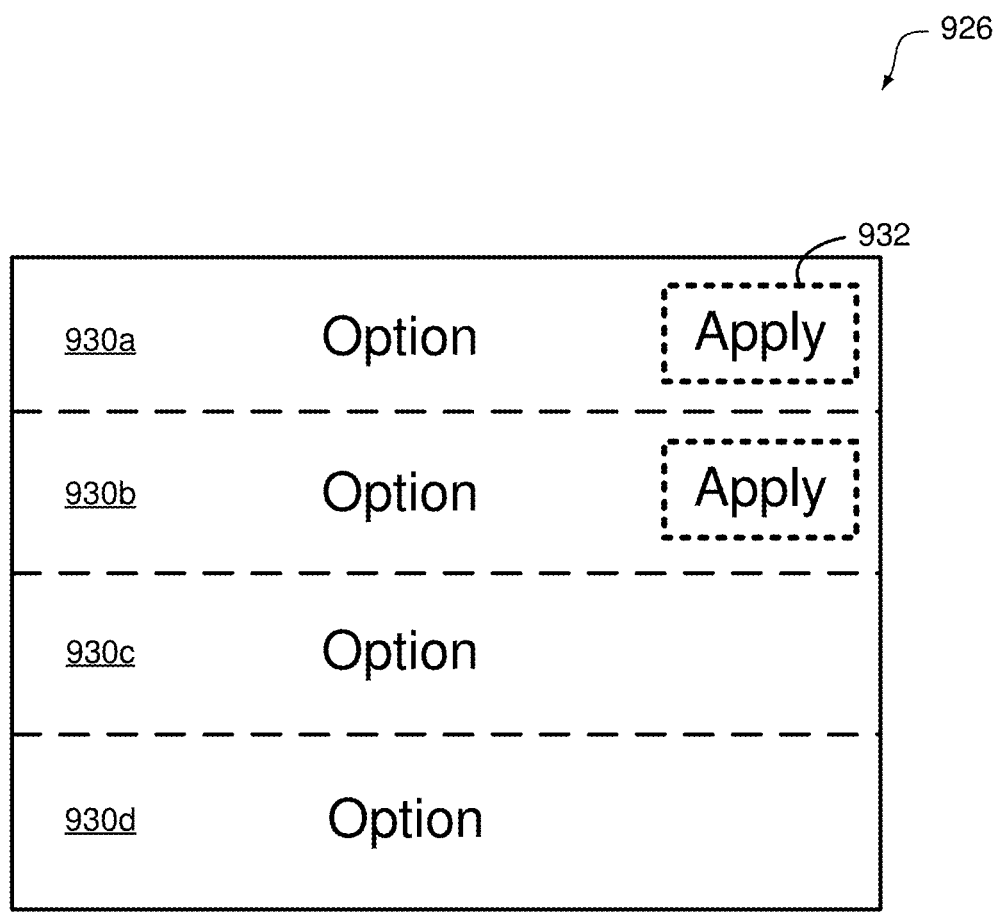
FIG. 9 illustrates an option menu in accordance with the disclosed embodiments.

FIG. 9 shows exemplary option menu 926 in accordance with implementations of the present disclosure. Option menu 926 comprises options 930a, 930b, 930c, and 930d, and is utilized to describe exemplary configurations for option menus, such as any of option menus 826a, 826b, 826c, 826d, and 826e. In the present implementation, each option can correspond to one or more commands that may be included in a search query. However, in some cases, options need not correspond to one or more commands that may be included in a search query. Instead, the option may be operable to interact with the system in some other manner. Where, an option corresponds to a command, the command may be provided to a search query utilizing a format that includes a command identifier that identifies the command and one or more command elements of the command, at least some of which may be optional (e.g., arguments, parameters, values, command options, and the like). In particular, each command could correspond to a pipelined search language command, such as an SPL command, or another type of command compatible with processing of the search query.

In various implementations, option menu 926 is a contextual menu. In this regard, one or more of the options in option menu 926 can be included based on context related to the selection that prompted option menu 926. For example, option 930a may be included in option menu 926 in some contexts, but not in others. This may be desirable in that it may be more intuitive for some options to be invoked in some selection contexts, but not in others. Furthermore, one or more options in option menu 926 may be a contextual option. In this regard, one or more commend elements for any commands corresponding to an option may be incorporated into the commands based on selection context. Furthermore, at least some of the label of the option in option menu 926 can be based on selection context.

In some respects, context can be based, at least partially on the type or types of table elements of the table format selected by the user. In various implementations, the presented option menu may include different options depending on whether the selected portion of the table format is a column, a cell, a portion of a textual representation of a data item, or the table itself. For example, option 930c may be included in option menu 826b for a selection of column 804a, but not in option menu 826a for a selection of cell 810. This may be desirable in that it may be more intuitive for some options to be invoked through selecting a column as opposed to a cell, or vice versa. As an example, the option may correspond to a command that operates on cells of a column, or the column itself, and therefore might be more intuitive when included as an option for a selected column. As such, the option might be contextually included based on selection of a column, but not based on selection of a cell.

Context can further be based on a number of selected portions of the table format, or a number of selected portions of the table format of one or more particular types of table elements. For example, option 930d may be included in option menu 826c of FIG. 8D for a selection of multiple columns 804b and 804c, but not in option menu 826b of FIG. 8C for a selection of only column 804*a*. In this way options included in option menu 826*c* may be different than the options included in option menu 826*b* based on the selected portion comprising two columns in of FIG. 8D, but only one column in FIG. 8C (e.g., based on the number being greater than one column, or based on the number being equal to a designated number of columns). As another possibility, where selection portions of a table format comprise a first selected cell and a second selected cell, an option may be caused to be included in option menu 926 based on a determination that the first and second cells are in different columns in the table format.

Context can also be based on the event attribute(s) corresponding to the selected portion(s) of the table format. For example, one or more options may be included in option menu 926 based on the user selecting a column, cell, or textual representation corresponding to event raw data (e.g., _raw), or based on the user selecting a table portion corresponding to event timestamps (e.g., _time).

Thus, for example, an option may be included in option menu 926 based on a determination that at least one of one or more data items of at least one selected one or more cells comprises event raw data, and/or that at least one of selected one or more columns represent event raw data of a set of events. Furthermore, an option may be included in option menu 926 based on a determination that at least one of one or more data items of at least one selected one or more cells comprises a timestamp of event raw data, and/or that at least one of selected one or more columns represent data items comprising timestamps of a set of events.

Furthermore, context can be based on one or more data types assigned to the selected portion(s) of the table format. Examples of data types include numeric data types, categorical data types, and user defined data types. A numeric data type may correspond to numbers and a categorical data type may correspond to a combination of numbers, letters, and/or other characters. A cell may be identified as comprising a numeric data type or a categorical data type by the system analyzing the data item represented in the cell. A column may be identified as comprising a numeric data type or a categorical data type by the system analyzing at least some of the data items represented in the column (e.g., in cells). Such determinations may be made based on the selection of the table format and prior to selecting an option, or could be performed prior to the selection of the table format. Furthermore, in some cases, the data type could be selected by a user.

Thus, for example, an option may be included in option menu 926 based on a determination by the system that at least one of one or more data items of at least one of selected one or more cells is of a numeric data type (e.g., based on the overall data type of the cell's corresponding column, or based on the cell's particular data type), and/or that at least one of selected one or more columns represent data items of a numeric data type. Similarly, an option may be included in option menu 926 based on a determination that at least one of one or more data items of at least one selected one or more cells is of a categorical data type, and/or that at least one of selected one or more of the columns represent data items of a categorical data type. As an example, where each selected column has a numeric data type, an option may be presented that corresponds to one or more commands that apply at least one statistical functions to the data items of the columns, and/or generate a graph where each axis represents a respective one of the columns. As a further example, the one or more commands be operable to remove one or more non-numeric cells from selected one or more cells and/or selected one or more columns, where at least one non-numeric cell is detected in a selection.

As a further example, context can be based on a source of data items in the selected portion(s) of the table format. For example, one or more options may be included in or excluded from option menu 926 based on a determination by the system that at least one of one or more data items of at least one of selected one or more cells comprises a statistical value generated by one or more statistical functions performed on values of data items of at least some events and/or that at least one of selected one or more columns represents data items comprising statistical values generated by one or more statistical functions performed on values of data items of at least some events. As an example, the system may refrain from offering one or more options related to extracting new data items from data items that comprise statistical values. A statistical value may refer to a value generated from an event using one or more statistical functions (e.g., average, sum, mean, median, mode, standard deviation, variance, count, range), such that the value no longer corresponds directly to event raw data. In some cases, a value may be determined as a statistical value based on identifying the value as an output of a statistical command in a search query. For example, statistical commands may be commands known to produce one or more statistical values an output.

As another example, one or more options may be included in or excluded from option menu 926 based on a determination by the system that at least one of one or more selected one or more cells is an empty cell, and/or that at least one of selected one or more columns comprises one or more empty cells. As an example, the system may offer one or more options related to one or more commands that are operable to remove or otherwise perform some operation on empty cells based on a determination that a selection comprises at least one empty cell. Furthermore, one or more options displayed for selections comprising empty cells may exclude one or more options otherwise displayed where the selection does not comprise empty cells.

In further cases, one or more options may be included in or excluded from option menu 926 based on a determination by the system that at least one of one or more data items of at least one of selected one or more cells comprises multiple values, and/or that at least one of selected one or more columns represents one or more cells comprising multiple values. A data item that comprises multiple values may comprise an array, matrix, or other representation of multiple values for a single event attribute of a single event. Each value could be displayed in the same cell and may be displayed in a manner that indicates the values as being different values for the same event and event attribute. As an example, where a user selects a portion of a textual representation of a data item in a cell, the system may offer or refrain from offering one or more options corresponding to one or more commands, based on whether the data item comprises multiple values.

In option menu 926, options 930*a* and 930*b* are examples of form-based options, which include at least one form element that can be modified by a user. A form-based option may have at least some defaults entered into the form. Examples of form elements that may be included in a form-based option include one or more of a text box, dropdown list, radio button, checkbox, and the like. Where an option corresponds to one or more commands, a form element could be employed for selecting and/or entering one or more command elements for a command and/or a command identifier (so as to select from the one or more commands). Optionally default command elements and/or command identifiers may be automatically entered into the form prior to or after selection of the option. An exemplary form element could be a dropdown list that comprises a list of possibilities for command elements and/or command identifiers. As another example, a text box could be used to enter one or more command elements of a command. The text box could comprise placeholder text that is descriptive of a command element corresponding to the text box.

A form-based option may be selected by a user using a corresponding apply button, or other suitable means. For example, option 930a could be selected by clicking on apply button 932 after providing input to configure the form, or optionally without configuration where the form comprises one or more default values. An option, such as option 930c, could be a nested form-based option, where option menu 926 comprises a link that can be selected by the user to open a form of the nested form-based option. The form may open within or outside of option menu 926 (e.g., replace the link with the form, expand the link to display the form, or appear outside of the option menu). The form could similarly include an apply button to select the option. Option 930d is an example of an option that does not include a form. As an example, option 930d may be selected upon mouse up or mouse down. The option could include one or more default command elements. In addition, or instead one or more of the command elements could be contextually generated, for example, based on the user selection.

As described above, the system can cause one or more commands to be added to a search query that corresponds to a group of events used to populate the table format, based on a user selecting one of the options from the list of options. For example, upon a user selecting an option, the one or more commands could be automatically added to the search query. Where the search query employs a pipelined search language, the one or more commands can be added sequentially to the end of the search query. In implementations where the search query is displayed to the user, for example, in a search bar, the one or more commands may be added to the search bar. In implementations where the search query is represented by a command entry list (e.g., command entry list 808), the command entry list may be updated to represent the one or more commands as one or more command entries.

The one or more commands that are added to the search query may be in proper syntax for the search query, complete with command identifiers and any command elements that are needed or desired for execution of the commands. In some cases, one or more added command elements for a command are default command elements associated with a selected option. Furthermore, one or more added command elements for a command could be provided by the form of a form-based option. As another option, the command elements could be contextually generated based on the portion(s) of the table format selected by the user.

The one or more commands corresponding to an option can be contextually based on an event attribute that corresponds to a selected portion of the table format. For example, the event attribute can be used to generate at least a portion of one or more of the commands for the option. As an example, the event attribute, and/or one or more data items assigned to the event attribute can be incorporated into at least one command element of one or more commands that correspond to the option, or used to generate at least one value for the at least one command element. A reference to an event attribute (e.g., an attribute label of the event attribute) or a data item (a value thereof), or data generated therefrom, could be included in a form element of an option as a default command element for a command. In addition, or instead, one or more references (or values, or data generated therefrom) could be included as text in a command string added to the search query and used to invoke a command. The command string can include a command identifier along with the reference(s), value(s), or data generated therefrom, used for a command element. As one example, a command element that is based on the event attribute may be a command element that instructs the command as to which event attribute and/or data item or items assigned to an event attribute to operate on, for example, within events input into the command.

Thus, where a user selects a column, one or more commands for an option may be based on (e.g., generated using) any event attributes corresponding to the column. For example, at least one command element may be generated from the event attribute(s) and/or one or more data items that are assigned to the event attribute(s), or values thereof. As an example, the user could select column 804a, as in FIG. 8C. A command element for a command corresponding to an option in option menu 826b could instruct the command to operate on data items of an event attribute having the attribute label_time, based on column 804a comprising the event attribute, or could provide data generated from one or more of the data items as input to the command. Similarly, a user could select both columns 804b and 804c, as in FIG. 8D. A command element of a command corresponding to an option in option menu 826c could instruct the command to operate on at least some data items of the event attributes having the attribute labels of source and host, based on columns 804b and 804c respectively comprising those event attributes, or could provide data generated from one or more of the data items as input to the command.

For a cell, the user could select cell 810, as in FIG. 8B, and a command element of a command corresponding to an option in option menu 826a could be generated to instruct the command to operate on the data item assigned to the event attribute having the attribute label referrer, to use the value of that data item as an input to the command, or to generate data from the value of the data item as an input to the command, each based on cell 810 corresponding to a data item assigned to the event attribute.

For text, the user could select portion 814 of textual representation 812, as in FIG. 8F, and a command element of a command corresponding to an option in option menu 826e could be generated to instruct the command to operate on at least the portion of the text in the data item assigned to the event attribute having the attribute label "_raw," to use at least the portion as an input to the command, or to generate data based on the portion as an input to the command (e.g., a keyword that includes the portion), all based on portion 814 being in a data item assigned to the event attribute.

As discussed above, based on the selection of one or more displayed options, operations corresponding to a displayed option that is selected by the user can then be carried out by the system. As one example, when an option is selected (e.g., in option menu 926), the operations may be automatically performed. Furthermore, the screen can be updated based on any changes corresponding to the selected options. For example, in search screen 800, when a user selects an option, the set of events utilized to populate table format 802 (e.g., a search results set) may be automatically updated by the operations associated with the option. As an example, one or more portions of a search query could be executed, as needed to accurately portray events corresponding to the search query in the table format. Furthermore, the displayed table format 802 may be automatically updated to reflect changes to the set of events. More particularly, where one or more commands are added to a search query, or the search query is otherwise modified by an option, table format 802 can be automatically updated to correspond to the modified search query. This could result in more or fewer events being included in the table format, and/or more or fewer event attributes being included in the table format, depending on the commands.

Thus, for example, a user may directly interact with the table format to manipulate a corresponding search query and automatically see the results of the manipulations reflected in the table format. In doing so, the user need not necessarily directly code the search query, which can require extensive knowledge of the underlying search query language. Instead, complicated aspects of coding the search query can be embedded in the options, and results of the options (and any underlying commands) can quickly be portrayed to the user. For example, the user could select an option to remove a column comprising an event attribute, and a command assigned to the option that operates to filter the event attribute from inputted events can automatically be added to the search query. At least the added command could automatically be executed, and the displayed table format could be updated to no longer include the column, as the event attribute would be excluded from search results.

It should be noted that execution of a search query (or one or more portions thereof), as described herein can comprise an automatic reformulation of the search query (or one or more portions thereof), so as to more efficiently achieve equivalent search results as the search query.

Below, various potential options are described with respect to user selections of a table format. Although options may be described as corresponding to a single command, similar functionality may be achieved utilized multiple commands. It is further noted that an omission of a particular option type from a particular option menu is not intended to limit the option from potentially being included from the option menu. As an example, although extraction type options are only shown in option menu 826*e* of FIG. 8F, similar options are contemplated as being included for extracting new fields for option menus 826*a*, 826*b*, 826*c*, and 826*d*.

In FIG. 8B, option menu 826*a* is shown as including two options. The first option corresponds to a command that is operable to filter out each event input into the command that does not include the value "http://www.buttercupgames-.com/productscreen?productid=5F-BV5-G01" for a data item of an event attribute labeled "referer." The value and attribute may be provided to the command from the value and event attribute associated with the user selection. The second option is similar to the first option, but filters out each event input into the command that does include the specified value.

In FIG. 8C, option menu 826*b* is shown as including sixteen options, with a filter text box at the top. The filter text box can be used to filter out events input into a command that do not include any keywords entered into the text box by a user. Those keywords may be incorporated into the command. The first option may be similar to the first option in option menu 826*a*, where the value may be entered by the user.

The second option is associated with a command that is operable to remove events input into the command that contain an identical combination of values for an event attribute. The event attribute may be provided to the command as the event attribute associated with the selected column.

The third option may correspond to a command that is operable to sort the events input into the command in ascending order of values for an event attribute, where the event attribute may be provided to the command as the event attribute associated with the selected column.

The fourth option is similar to the third option, but sorts the events in descending order of the values.

The fifth option corresponds to a command that is operable to change the attribute label of an event attribute for an associated column. The event attribute may be provided to the command as the event attribute associated with the selected column. Furthermore, the new attribute label for the command may be entered into the text box by a user.

The sixth option corresponds to a command that is operable to remove an event attribute from events input into the command. The event attribute may be provided to the command as the event attribute associated with the selected column.

The seventh option corresponds to a command that is operable to remove events input into the command that have an empty cell, or no value, for a given event attribute of events. The event attribute may be provided to the command as the event attribute associated with the selected column.

The eight option corresponds to a command that is operable to apply a lookup table to changes values for a given event attribute of events. The event attribute may be provided to the command as the event attribute associated with the selected column.

The ninth option corresponds to a command that is operable to extract all fields discovered within data items for a given event attribute of events. Such an option is later described in additional detail. The event attribute may be provided to the command as the event attribute associated with the selected column.

The tenth option corresponds to a command that is operable to split a given event attribute for events input to the command into one or more other event attributes (e.g., resulting in additional columns). The event attribute may be provided to the command as the event attribute associated with the selected column.

The eleventh option corresponds to a command that is operable to evaluate an expression for each value of a given event attribute for events input into the command and assign the resulting value to an event attribute for the event that had its value evaluated. The event attribute may be provided to the command as the event attribute associated with the selected column. Furthermore, a user may use the first text box to specify an attribute label for the resulting value and use the second text box to specify the evaluation expression, which are used as command elements in the command. If an event attribute already exists that has the attribute label entered by the user, that event attribute may optionally be overwritten with the resulting values.

The twelfth option corresponds to a command that is operable to find transactions based on events input to the command that meet various constraints. Events may be grouped into transactions based on the values of a given event attribute. The event attribute may be provided to the command as the event attribute associated with the selected column. Furthermore, a user may use the first text box to specify a max pause value for the command and use the second text box to specify a max span value for the command. The maxspan constraint requires the transaction's events to span less than maxspan. The maxpause constraint requires there be no pause between a transaction's events of greater than maxpause.

The thirteenth option corresponds to a command that is operable to display the most common values for a given event attribute in a set of events input to the command. The event attribute may be provided to the command as the event attribute associated with the selected column.

The fourteenth option corresponds to a command that is similar to the command of the thirteenth option, but groups the top values by the event attribute having the attribute label "_time."

The fifteenth option corresponds to a command that is operable to display the least common values for a given event attribute in a set of events input to the command. The event attribute may be provided to the command as the event attribute associated with the selected column.

The sixteenth option corresponds to a command that is operable to provide statistics on values for a given event attribute in a set of events input to the command grouped by the event attribute having the attribute label "host." The given event attribute may be provided to the command as the event attribute associated with the selected column.

In FIG. 8D, option menu 826c is shown as including five options. The first option corresponds to a statistical command that is operable to perform a summation of values of events input to the command for a first event attribute grouped by a second event attribute. The first and second event attributes may be provided to the command as the event attributes associated with the selected columns. Such a command might only be included in option menu 826c where at least one of the selected columns is of a numerical data type (e.g., where one is of a numerical data type and another is of a categorical data type). Furthermore, the event attribute associated with a selected column having a numerical data type may be used as the first event attribute and the event attribute associated with a selected column having a categorical data type may be used as the second event attribute.

The second option corresponds to a command that is similar to the command of the first option, but is operable to perform an average rather than a summation.

The third option corresponds to a command that is operable to correlate values between event attributes of events input to the command to show the co-occurrence between the values. The command may build a contingency table, comprising a co-occurrence matrix for the values of the event attributes. The event attributes may be provided to the command as the event attributes associated with selected columns.

The fourth option corresponds to a command that is operable to correlate event attributes of events input to the command to show the co-occurrence between the event attributes. The event attributes may be provided to the command as the event attributes associated with selected columns.

The fifth option corresponds to a command that is operable to filter out all event attributes from events input to the command except for given event attributes. The given event attributes may be provided to the command as the event attributes associated with selected columns.

In FIG. 8E, option menu 826d is shown as including five options. The first option corresponds to a command that is operable to count the number of events input into the command.

The second option corresponds to a command that is operable to count the number of events input into the command by the event attribute having the attribute label "_time."

The third option corresponds to a command that is operable to transpose events input to the command and event attributes of the commands, such that each row may become a column.

The fourth option corresponds to a command that is operable to return the first N events input to the command where N is a positive integer (e.g., 10).

The fifth option corresponds to a command that is operable to return the last N events input to the command where N is a positive integer (e.g., 10).

In FIG. 8F, option menu 826e is shown as including six options. The first option corresponds to a command that is operable to filter out events input to the command that do not include a given keyword or phrase for a given event attribute. The given event keyword or phrase may be provided to the command as identified from at least a selection portion of the textual representation of a data item, and the given event attribute can be provided by the event attribute associated with the data item.

The second option corresponds to a command that is similar to the first option, but removes events that do not include the given keyword or phrase for the given event attribute.

The third option corresponds to a command that is similar to the first option, but removes events that do not start with the given keyword or phrase for the given event attribute.

The fourth option corresponds to a command that is similar to the first option, but removes events that do not end with the given keyword or phrase for the given event attribute.

The fifth option is operable to initiate a field extraction workflow for extracting one or more new fields.

The sixth option corresponds to a command that is operable to extract a new field having a given field label from a given event attribute for event input to the command. The given field label may be generated from the selected portion of the textual representation of a data item, and the given event attribute can be provided by the event attribute associated with the data item. Such an extraction may be a suggested field extraction, later described in additional detail below.

2.4 Command Entry List

In some respects, the present disclosure relates to a command entry list, an example of which was briefly discussed with respect to command entry list 808. Command entry list 808 corresponds to an exemplary implementation of a command entry list in a search screen of a search system. However, concepts related to a command entry list are not intended to be specifically tied to such implementations. To this effect, command entry lists are discussed in additional detail below with respect to FIG. 10 and command entry lists 1008a and 1008b.

Command entry lists 1008a and 1008b each represent potential implementations of command entry lists, in accordance with concepts disclosed herein. Command entry lists 1008a and 1008b each comprise a list of command entries, which can be displayed in a search interface (such as is command entry list 808), or other interface. As shown, command entry lists 1008a and 1008b each comprise command entries 1040a, 1040b, 1040c, and 1040d. Although the command entries are listed in a vertical column (with one command entry per row), other list formats could be employed.

Figure 10:
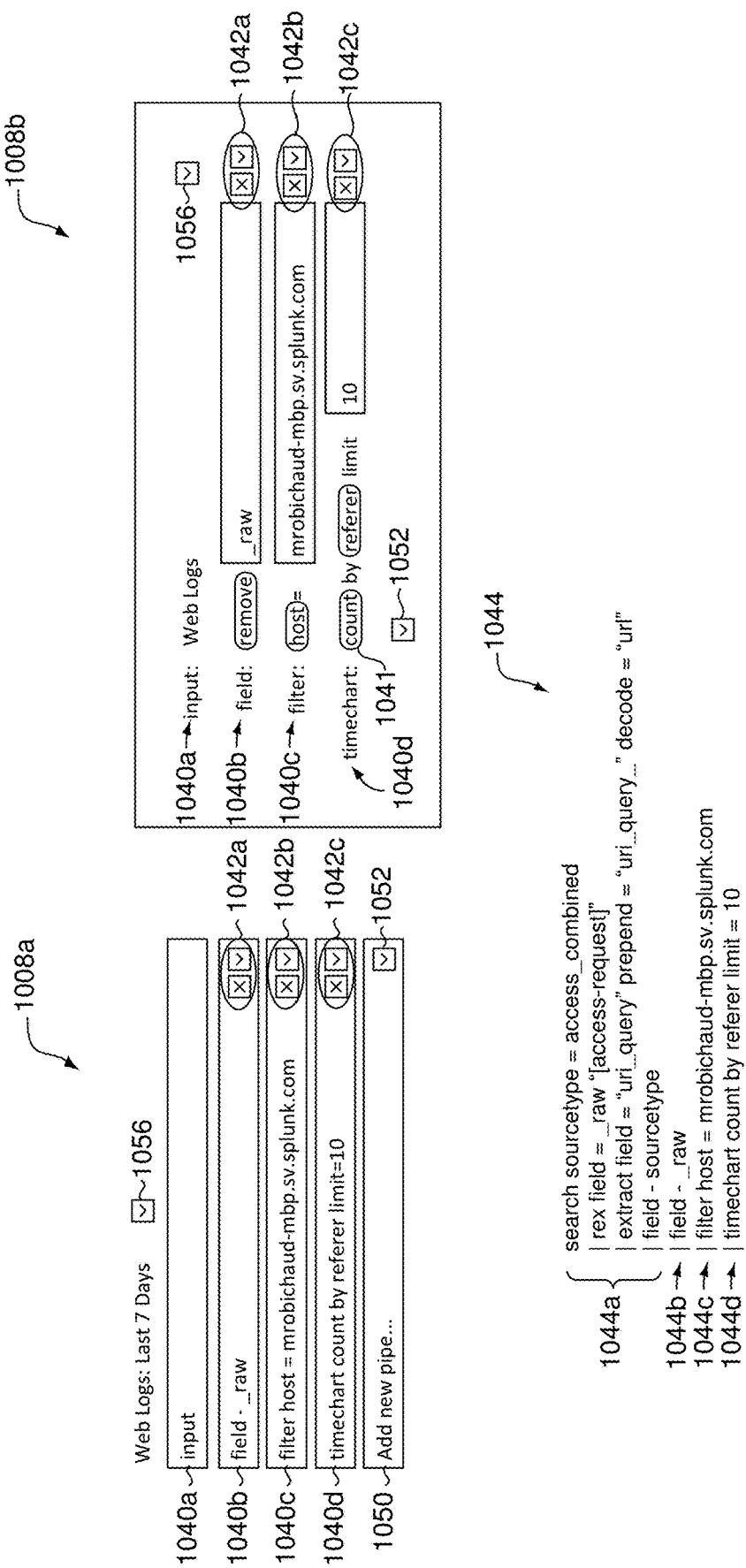
FIG. 10 illustrates command entry lists in accordance with the disclosed embodiments.

Each command entry in a command entry list may represent one or more commands of a plurality of commands of a search query. By way of example, FIG. 10 shows search query 1044 which may corresponds to each of command entry lists 1008a and 1008b. Command entry 1040a corresponds to commands 1044a, command entry 1040b corresponds to command 1044b, command entry 1040c corresponds to command 1044c, and command entry 1040d corresponds to command 1044d, by way of example.

As shown, the list of command entries of command entry lists 1008a and 1008b are displayed in a sequence corresponding to the plurality of commands of the search query. In particular, the command entries are displayed in the list in the same sequence as their corresponding commands appear in the search query. As the search query utilizes a pipelined search language in the present examples, each command entry that corresponds to a command may be considered a data processing pipe and the sequencing can portray to the user the relationship between commands in terms of inputs and outputs for the data processing pipes. It is noted that, the display in the sequence could be visually conveyed using a variety of possible approaches, such as by depicting a combination of alphanumeric characters proximate to each command entry, and/or the by the positioning of the command entries on screen. Furthermore, in some implementations, the list of command entries of a command entry list need not be displayed in a sequence corresponding to a plurality of commands of a search query in every implementation of the present disclosure.

Command entries 1040b, 1040c, and 1040d each display a representation of their respective underlying commands. In the approach depicted in command entry list 1008a, each command is listed as the command would appear in search query 1044. Pipes (e.g., "|") or command separators, are omitted from display, and may be implied from the depiction of the command entries. However, in some implementations, command separators might be depicted, or a subset of command separators might be depicted, for example, within a command entry that corresponds to multiple commands. In the approach depicted in command entry list 1008b, various portions of commands are formatted in different manners, to improve legibility for users. For example, command identifiers are followed by colons and are aligned to the colons, and might be bolded. Command element parameters are formatted in a distinguishable manner using a different color of text than other portions, and command modifiers are distinguishable as unformatted text. Command variables are depicted in text boxes.

In some respects, through interaction with a command entry list, a user can modify the search query. For example, one to all of the command entries can correspond to a respective form for modifying its respective underlying commands in the search query. In the approach depicted in command entry list 1008a, text of any portion of a command may be modified. For example, each command entry comprises a text box that includes the command. A user may modify the command by modifying the text in the text box. The corresponding command in search query 1044 can be updated accordingly to correspond to the modified command. Thus, a user could change "limit=10" in command entry 1040d to "limit=20," and command 1044d may be modified to reflect the changes made using command entry 1040d. Such changes may be reflected automatically, or may first require the user to apply the changes.

In the approach depicted in in command entry list 1008b, portions of the commands are represented by a respective form element. Users may optionally be restricted from modifying at least some portions of the commands in the command entries, such as command identifiers. Furthermore, some portions of the commands may have respective dropdown lists, or option menus, associated therewith that can be used to select fields, aggregation methods, or other command parameters to be used as the portion of the command. The options presented for a given portion of a command may be included based on the type of command element suitable for the position of the given portion in the command. As shown, count, referrer, host, and remove all have corresponding option menus, indicated as rounded rectangular boxes (e.g., 1041 in FIG. 10).

In some cases, a user interaction with the command entry list may break a dependency of a command element(s) of one or more command entries. For example, a user could change "field-_raw" in command entry 1040b to "field-host" and command 1044b may be modified to reflect the change made to command entry 1040b. In the present example, "_raw" and "host" are used as command elements that instruct the command having command identifier "field" as to which event attribute to operate on. When executed, data items of the event attribute may be removed from events input into the command. Thus, due to the modification "_raw" data items may no longer be removed, but "host" data items may be removed instead. However, as shown, command entry 1040c has a command element instructing the command to operate on an event attribute referenced by "host." In some implementations, in response to the user adding "host" to command entry 1040b, the system may optionally detect that the modification to command entry 1040b breaks a dependency of the command element (e.g., event attribute) referenced in command entry 1040c and automatically throw that command entry into an error state. In the error state, the commands associated with the command entry may be excluded from execution in the search query and a visual indication may be displayed to the user that the command entry is in the error state.

Although some modifications may throw one or more command entries into an error state, in some cases, a broken dependency caused by a user interaction may be automatically identified and corrected in the search query. For example, assume that a first command entry represents a command in a search query that is executable to extract a new field from an event attribute and names that field "referer." The command may include a command element "referer," which instructs the command to label the new field "referer." Also assume that a second command entry represents a subsequent command in the search query that is executable to operate on a field labeled "referer." In accordance with implementations of the present disclosure, the system may automatically detect a dependency between the commands of the command entries when a user renames "referer" through interaction with the first command entry. Based on detecting the dependency, the system may automatically rename the command element (e.g., event attribute) in the command(s) represented by the second command entry (and potentially any other dependent commands in the search query) to correspond to or match the renamed command element represented by the first command entry. Thus, where a user interaction comprises a user renaming a command element in one or more commands using a form element in a designated command entry that represents the command element, and one or more other command elements in one or more other commands can be automatically renamed in the search query so as to correspond to the renamed command element. In this way, error states can be avoided for command entries representing commands that include command elements that depend on (e.g., reference) command elements of other commands.

The approach depicted in command entry list 1008*b* may be similar to command entry list 1008*a*, but with only designated portions of a command being directly modifiable by a user, while at least some portions are not directly modifiable by the user. By way of example, command identifiers are not directly modifiable through the depicted command entries. However, as indicated using underlining, command variables are directly modifiable as text boxes. Command element parameters may optionally be modifiable using respective dropdown lists, as one example.

As shown in FIG. 10, each command entry has one or more corresponding selectable options to modify the command entry list with respect to the command entry. The selectable options are accessible through respective form elements. As an example, in each of command entry lists 1008*a* and 1008*b*, command entries 1040*b*, 1040*c*, and 1040*d* each comprise respective options 1042*a*, 1042*b*, and 1042*c*. The options for a command entry are selectable for the command entry by way of one or more respective form elements, which are visually and operably associated with the command entry. In command entry list 1008*a*, two form elements are employed for each of command entries 1040*b*, 1040*c*, and 1040*d*. In particular, a button (e.g., x-button), and dropdown list are included for each command entry. The option corresponding to the button (which in other implementations could be selectable in some other manner) in command entry list 1008*a* is operable to delete at least the corresponding command entry from command entry list 1008*a*. Similar functionality may be incorporated into the options, as shown in command entry list 1008*b*.

Deleting the corresponding command entry may automatically shift positions of the subsequent command entries in the command entry list to fill the gap left by deleting the command entry, while otherwise retaining sequencing of the command entries in the command entry list. Furthermore, deleting the command entry may delete (e.g., automatically) the one or more commands that correspond to the command entry from search query 1044 (and optionally one or more command separators). Similar to the command entries, any subsequent commands in the search query may have their sequencing retained, with a command that immediately preceded any deleted command(s) being configured to receive the input that would otherwise had been provided to the deleted command(s). Thus, through selection of the option, both the search query and the command entry list may be updated.

As other potential options, the options for a command entry can be selectable to reorder the command entry within the command entry list. One exemplary reorder option is a shift up option, which is operable to swap positions of the command entry associated with the option with the command entry immediately preceding the command entry in the list. Swapping a position of the command entry may automatically swap position of the one or more commands represented by the associated command entry with the one or more commands represented by the immediately preceding command entry in search query 1044. Another example of a reorder option is a shift down option, which is similar to the shift up option with the immediately preceding command entry being substituted with the immediately following command entry for swapping. It will be appreciated that other reordering options are possible, and each may comprise modifying the sequencing of command entries in the command entry list and modifying the search query to reflect corresponding changes. Furthermore, in some cases, a user may interact with the command entry list by selecting a command entry (e.g., using a mouse), and dragging the command entry to a different position in the command entry list, thereby reordering the command entry list.

In addition to command entries, a command entry list may include a blank entry, such as blank entry 1050. Blank entry 1050 is operable to add new command entries to the command entry list. In command entry list 1008*a*, blank entry 1050 comprises a form that is operable by a user to input a command into blank entry 1050. In the example shown, the form comprises a text box for inputting the command as text, although other form elements could be employed. As shown, the text box is created with placeholder text that reads "Add new pipe . . . " and may be utilized to apply blank entry 1050, with a command entered therein by a user, to command entry list 1008*a* as a new command entry and/or to include the command entered therein in search query 1044 (e.g., add the new command entry to the end of the list of command entries and/or add the new command(s) to the end of the search query). One or more associated options 1052 may be incorporated into one or more form elements in addition to or instead of the text box. Options 1052 may provide a menu of commands that a user can add to the command entry list to create a new command entry by selecting its associated option.

It should be noted that changes made to the command entry list using a form element may be applied to the search query as part of operations associated with the form element or the form containing the form element (e.g., automatically). However in some implementations, the user may make multiple changes to command entries or sequencing of the command entries in the command entry list, and the changes are individually or collectively applied to the search query by the user, for example, using one or more apply buttons, and/or save features.

In FIG. 10, command entry 1040*a* is an input command entry. An input command entry can optionally be included in a command entry list and corresponds to an input query (e.g., 1044*a*), or pipeline, which serves as an input to the subsequent commands of the search query. Therefore, an input command entry may be the first command entry in a command entry list, if present. The input command entry may be permitted to represent more than one command, while command entries 1040*b*, 1040*c*, and 1040*d* may optionally be restricted to representing single commands. One or more commands corresponding to an input command entry may optionally be hidden from display in the interface and/or the command entry list (although they may optionally be capable of being revealed in some manner). Furthermore, the interface and/or the command entry list may restrict the user from directly modifying the commands represented by the input command entry.

In some implementations, an input command entry corresponds to a saved input query or pipeline that is selected by the user as an input. "Web Logs" in FIG. 10 is an example of a label corresponding to a saved input query or pipeline that can be displayed with the command entry list. The user can optionally be permitted to selectively replace the saved input query with a different input search query (e.g., another saved query) through the interface comprising the command entry list. As an example, form element 1056 could comprise an option operable to initiate such a selection. It should be appreciated that search query 1044 can be updated accordingly to replace commands of a previous input search query (e.g., commands 1044*a*) with a newly selected input search query or pipeline.

From the foregoing, it should be appreciated that one or more command entry lists can be employed to create and/or modify a search query. It is further noted that, command entry lists can be incorporated into interfaces that allow search queries to be created and/or modified using additional means. Command entry list 808 in FIG. 8A is one such example where, as described above, a user may modify or create the search query, for example, through interactions with table format 802, or possibly using a search bar. Thus, the search query described with respect to search screen 800 could correspond to search query 1044 of FIG. 10.

In these cases, where the search query is modified through table interactions, the search bar, or other means, the changes may be propagated to the command entry list (automatically or otherwise). To illustrate the foregoing, when a user selects an option, such as one of the options in option menu 926, one or more commands corresponding to the option can be automatically added to the end of command entry list 808 as a command entry. In some cases, where the option is a form-based option, the form corresponding to the option might be reproduced in the command entry, as completed by the user. In particular, each of command entries 1040b, 1040c, and 1040d in command entry list 1008b could correspond to a form of a respective option previously selected by a user. The form elements utilized for creation and/or modification of the command in the form of the option can be reproduced, as shown.

2.5 Exemplary Pipeline Selection Interface

In further respects, implementations of the present disclosure relate to data processing pipelines (or simply pipelines) that are defined by one or more search queries. A data processing pipeline can correspond to a set of sequenced commands configured such that inputs to the pipeline are operated on by a first command in the sequence, and each subsequent command operates on results produced by the preceding command in the sequence, until a final command in the sequence provides one or more outputs to the pipeline. The sequence of the commands can be defined by a search query, such as by using a pipelined search language like SPL.

In various implementations, a search query can be created that defines a data processing pipeline that extends another data processing pipeline, which itself may be defined by a search query. In some cases, to create such a search query, one or more saved data processing pipelines can be selected as a basis for the search query (e.g., as an input search query or pipeline, as described above). In doing so, the full search query need not be created (e.g., by a user), instead, only an additional query may be defined that corresponds to an extended portion of the selected data processing pipeline(s).

In some implementations, a user can select the one or more saved data processing pipelines as a basis for the search query using a selection interface. The selection interface could optionally be displayed with another interface, such as a search interface, in the same screen as the other interface, or in a different screen. An example of a suitable selection interface is described with respect to selection interface 1100 of FIG. 11.

As shown, selection interface 1100 comprises a plurality of pipeline entries, such as pipeline entries 1102a and 1102b, which are listed in selection interface 1100. Each pipeline entry represents a saved pipeline (e.g., a persistently stored pipeline) and displays a pipeline label assigned to the saved pipeline. For example, pipeline entry 1102a has pipeline label 1104a that reads "All Data," and represents a respective saved pipeline that could optionally serve as a basis for all other pipelines. As another example, pipeline entry 1102b has pipeline label 1104b that reads "Web Logs," and represents a respective saved pipeline. Each saved pipeline can represent a saved search query that defines the saved pipeline. As an example, the saved pipeline corresponding to pipeline entry 1102b can represent a saved search query comprising commands 1044a of FIG. 10, by way of example.

Each pipeline entry is selectable to load the saved pipeline that corresponds to the pipeline entry. For example, each pipeline entry can have one or more links that are selectable to load the corresponding pipeline. In the example shown, two links are included for each pipeline entry, which are "edit pipeline" links and "use as input" links. As shown, pipeline entry 1102a comprises edit pipeline link 1108a and use as input link 1106a and pipeline entry 1102b comprises edit pipeline link 1108b and use as input link 1106b.

To this effect, in some implementations, a user may assign one or more tags to any pipeline entry. As an example, pipeline entry 1102a has an assigned "data set" tag. Other tags for other shown include "mine," "accelerated," and "lookup." A user can filter out pipeline entries from selection interface 1100 based on their assigned tags. For example, filter form 1112 can be used to select which tag(s) pipeline entries should have to be included in selection interface 1100. As another possible feature, each pipeline entry has a down chevron, which is selectable to show configuration settings for that pipeline entry. As shown, the pipeline entry with a pipeline label that read "Errors in the last 24 hours" has been selected, and thereby expanded to show its configuration settings. Some of the configuration settings may be changed through selection interface 110, such as those shown as including "Edit" links that may be selected to edit a corresponding setting.

In response to a user selecting an edit pipeline link, the system may cause the corresponding pipeline of the pipeline entry to be loaded for editing. By selecting edit pipeline link 1108b, for example, a saved pipeline corresponding to commands 1044a in FIG. 10 could be loaded into an interface where the user may modify the pipeline. Loading a saved pipeline may comprise loading at least some of a saved search query corresponding to the saved pipeline. Thus, commands 1044a could be loaded into an interface. A user may modify at least a portion of the saved search query by adding, deleting, and/or modifying one or more commands of the pipeline using the interface.

The saved pipeline may be loaded into a search interface, which may correspond to search screen 800, as one example. Thus, the saved pipeline could be used as the search query described above that can be modified using the search interface. In addition, or instead, the saved pipeline could be loaded as the search query described above as being modified using a command entry list by populating the command entry list with command entries representing the saved pipeline. However, the saved pipeline may be loaded into other interfaces, which may still implement an interactive table format or command entry list, as described above, or another type of interface. The interface may or may not display events that correspond to the search query. In implementations where the events are displayed, upon loading the saved pipeline, events may be loaded and/or displayed that correspond to the saved pipeline (e.g., an output data set of the saved pipeline).

The events could be loaded by optionally executing the saved pipeline. However, in some implementations, the events could be loaded from an existing data set corresponding to the saved data pipeline. In some cases, the data set may be saved (e.g., persistently) in association with the saved data pipeline and may correspond to an output data set of the saved data pipeline. A saved data set could be saved as a table, or in another format. By loading the saved data set, the saved pipeline need not be executed to load the events, thereby saving system resources. Furthermore, where one or more commands are added to the saved pipeline, the one or more commands may use the data set as an input data set for further processing, rather than executing the entire pipeline.

Any modifications that may have been made to the loaded pipeline may be saved, for example, to the saved pipeline, such that the saved pipeline is updated to correspond to the modified search query (the save process may be initiated by the user, for example, by selecting a save option in the interface). Furthermore, an updated output data set may be saved in association with the updated saved pipeline, which may replace a previously saved data set. The updated saved pipeline and/or updated saved data set may then be accessed using the pipeline entry in the selection interface, for example, through edit pipeline link 1108*b* or use as input link 1106*b*.

In response to a user selecting a use as input link, the system may cause the corresponding pipeline of the pipeline entry to be loaded as an input pipeline for an existing search query, or as a basis for a new pipeline that may be created based on the input pipeline. By selecting use as input link 1106*b*, for example, a saved pipeline corresponding to commands 1044*a* in FIG. 10 could be loaded into an interface for creating and/or modifying a search query that builds on, or extends, the saved pipeline. Loading a saved pipeline may comprise loading at least some of a saved search query corresponding to the saved pipeline. Thus, commands 1044*a* could be loaded into the interface. A user may possibly delete and/or modify the loaded one or more commands using the interface. However, in some cases, the one or more commands may be hidden from the user and/or the interface may preclude the one or more commands from being modified (e.g., as a default that may be overridden by the user). Furthermore, the user may be precluded from modifying the underlying saved pipeline using the interface (at least directly).

The saved pipeline may be loaded into a search interface, which may correspond to search screen 800, as one example. Thus, the saved pipeline could be used at least as a basis for the search query described above that can be modified using the search interface. In addition, or instead, the saved pipeline could be loaded as at least a basis of the search query described above that may be modified using a command entry list by populating the command entry list with one or more command entries representing the saved pipeline. However, the saved pipeline may be loaded into other interfaces, which may still implement an interactive table format or command entry lists, as described above, or another type of interface. In implementations where the events are displayed, upon loading the saved pipeline, events may be loaded and/or displayed that correspond to the saved pipeline (e.g., an output data set of the saved pipeline).

The events could be loaded by optionally executing the saved pipeline. However, in some implementations, the events could be loaded from an existing data set corresponding to the saved data pipeline. In some cases, the data set may be saved (e.g., persistently) in association with the saved data pipeline and may correspond to an output data set of the saved data pipeline. By loading the saved data set, the saved pipeline need not be executed, thereby saving system resources. Furthermore, where one or more commands are added to the saved pipeline, the one or more commands may use the data set as an input for further processing, rather than executing the entire pipeline.

In various implementations, one or more commands can be added to and/or edited in a search query that builds off of, or extends, the loaded saved pipeline (e.g., commands 1044*a*). The search query may correspond to the saved pipeline (e.g., commands 1044*a*), with an additional search query that builds off of the saved pipeline. One such example is search query 1044 in FIG. 10, with the additional search query comprising commands 1044*b*, 1044*c*, and 1044*d* that might have been added using command entry list 1008*a* or 1008*b*. As another example, the additional search query may have been added using a combination of command entry list 808 and interactions with table format 802, where the interface corresponds to search screen 800. Where updated events are needed for display, the updated events may be generated based on the output data set of the loaded saved pipeline, for example, by executing the additional search query using the output data set as an input, thereby saving system resources. Furthermore, by preventing the user from modifying the loaded pipeline in the interface, it may be ensured that the output data set can be used regularly for this purpose.

The constructed search query may be saved, for example, as a new saved pipeline that corresponds to the search query (the save process may be initiated by the user, for example, by selecting a save option in the interface). Furthermore, an output data set may be saved in association with the new saved pipeline that corresponds to an output of the pipeline. Additionally, the constructed search query can be saved in association with the saved pipeline and a new pipeline entry. The saved pipeline may then be accessed, for example, in selection interface 1100 using an associated use for input pipeline link and an associated edit pipeline link in the pipeline entry, similar to web logs.

2.6 Dependent Pipelines

In some respects, the present disclosure relates to creating a dependency between a first search query and a second search query, where the first search query defines a first data processing pipeline and the second search query defines a second data processing pipeline that extends the first data processing pipeline. The system can detect a modification to the first data processing pipeline defined by the first search query, and based on the modification of the first data processing pipeline being detected, enforce the dependency, such that the second data processing pipeline is modified to extend the modified first data processing pipeline.

In the context of the previous example, a dependency may be created between the saved pipeline (input pipeline) and the new pipeline being modified in the interface, where the first search query is the query corresponding to the saved pipeline and the search query being created corresponds to the second search query. In some cases, the modification that is detected could be performed while a user is modifying the first search query using an edit pipeline link, as one example. For example, the user could be modifying the first search query and creating the new pipeline concurrently (e.g., in different tabs). By enforcing the dependency, the new pipeline is modified to still extend the modified first data processing pipeline (e.g., automatically). As an example, the changes made to the first search query may be incorporated into the base pipeline being used to construct the new pipeline. In some cases, a non-persisted data set that corresponds to an output of the modified first search query (e.g., generated while modifying the first search query) could be used as an input to the additional search query, such that only the additional search query needs to be executed. As a further example, such a dependency may only be detected and/or enforced based on the modified first search query being saved by the user to update the saved pipeline (e.g., persistently).

As another example, in the context of the previous example, a dependency may be created between the saved pipeline and the newly saved pipeline (e.g. associated with the new pipeline entry), where the first search query is a query corresponding to the saved pipeline that served as a basis for the newly saved pipeline, and the second search query is a query corresponding that the extended saved pipeline. The modification that is detected could be performed using an edit pipeline link, as one example. Furthermore, the modification could correspond to an update to the saved pipeline that serves as a basis for the dependent pipeline. The dependency can be enforced so as to ensure that when a user selects the dependent pipeline for editing, or as an input pipeline, the pipeline that is loaded extends the updated saved pipeline.

Dependencies can be created and/or saved at any suitable time, such as based on a user selecting to save a pipeline. As another option, the dependency may be created and/or saved in response to the user selecting a saved data processing pipeline as a basis for the new pipeline (e.g., prior to any saving of the new pipeline). Furthermore, dependencies can be enforced at any suitable time. As an example, dependencies and be enforced at load time (e.g., using selection interface 1100), at save time (e.g., a user selected save process), or during query modification (e.g., using search screen 800).

It is noted that multiple pipelines may be created that extend that same base pipeline. Thus, dependencies may exist for each of these pipelines, such that changes to the base pipeline are propagated to the dependent pipelines. In this way, a user may only need to modify the base pipeline, instead of having to individually modify the other pipelines. Furthermore, each dependent pipeline may optionally apply its own additional processing to the same output data set produced by the base pipeline, without necessarily having to execute the base pipeline each time, as one example. Such features may be especially beneficial where the pipelines are used to apply a late-binding schema.

It is further noted that pipelines can be created that extend a pipeline, which itself extends a base pipeline. In such a case, a pipeline may have multiple dependencies, thereby creating a chain of saved pipelines. It is further noted that one pipeline can extend more than one base pipeline. In such a case, the pipeline may also have multiple dependencies. For example, the base pipelines could correspond to a combination of the base pipelines that may act to join, transact, or otherwise mix the pipelines in processing.

2.7 Extracting Field Label-Value Pairs

In some respects, the present disclosure relates to various approaches for extracting field label-value pairs from data items of events, such as event raw data, extracted fields, metadata, or other data items that may be assigned to one or more events. These approaches are useful in combination with some implementations described herein, such as various search interfaces. For example, various aspects of these approaches may be incorporated into at least one of the options that may be presented based on a user selecting a portion of a table format, which may be one of the options in option menu 926 (e.g., as one or more commands). However, it is noted that these approaches are more generally useful in the context of analyzing and/or interacting with events, which may optionally be facilitated by a graphical interface for displaying the events.

Extracting a field label-value pair from an event can generally refer to a process whereby a field label and a value associated with the field label are identified from the content of an event, such as event raw data of the event, or another event attribute, as a field label-value pair. Extractions of field label-value pairs can be implemented utilizing extraction rules that are applied to data in the events to extract values for specific fields as data items for the fields. In the context of extracting field label-value pairs, an extraction rule for a field can include one or more instructions that specify how to extract a value for the field from event data and further how to identify and/or extract a field label for the value from the event data. In some cases, an extraction rule comprises one or more regular expressions to provide instructions for identifying a field label and/or value. The field label may optionally be assigned to the field.

An extraction rule for extracting field label-value pairs can generally include any type of instruction(s) for identifying and extracting values and for identifying and/or extracting a field label corresponding to any extracted values, from data in events. The field label may optionally be generated from the data in the events. In contrast, other extraction rules may only provide instructions for identifying and extracting values from data in events. A field label may be manually entered for a field associated with the values.

An example of an extraction rule for extracting field label-value pairs is a rule that identifies a field label for a field based on text on the left hand side of an equal sign ("="), and identifies a value for a new data item or value associated with the field label based on text on the right hand side of the equal sign within a value of a data item. The equal sign can be used to demarcate text representing a field label and text representing a value associated with that field label. The identified text on each side of the equal sign could further be demarcated by a space character (" "). It should be noted that other demarcating character(s) could be employed in addition to, or instead of equal signs and space characters to define text representing a field label and/or value associated with the field label, such as one or more colons, back slashes, ampersands, quotation marks, and the like. Furthermore, rules that identify demarcating characters can vary in complexity, such as by considering text representing a value as being demarcated by characters that are not a number or word character. A word characters may include a to z, A to Z, or underscore, as an example. Furthermore, text representing a field label could be demarcated in a different manner than text representing the value, for at least one boundary thereof. Additionally, processing, such as decoding, could optionally be applied to the text portions to generate the field label and/or value.

Using such an extraction rule that identifies field labels and values using one or more demarcating characters, a system can identify within text in a data item that reads "itemid=EST-14," "itemid" as a field label, and "EST-14" as a value for a data item associated with the field label for a field label-data item pair. Such as in the raw event data of event 1 in FIG. 8A. Any values that are extracted from events using an extraction rule may be assigned to a new or existing field of an event as data items, for example, to define a late-binding schema for events. Thus, with reference to FIG. 8A, using the extraction rule, a new event attribute (an extracted field) may be created and assigned the extracted field label "itemid" for each event, along with data items corresponding to the extracted value associated with the field label for that event. As an example, the extraction rule may generate itemid data items having the values of "EST-14," "EST-15," "EST-18" respectively for events 1, 3, and 4 in FIG. 8A. As events 2 and 5 do not include text in the format of "itemid=," they could optionally be assigned a data item having a blank, or default value, or no value (e.g., empty). Similar extraction rules can be applied to each search result. The aforementioned example utilizes events that are part of search results for convenience only. It is noted that concepts related to extracting field label-value pairs are more generally applicable to any set of events.

2.8 Distinguishing Between Extracted Field Label-Value Pairs and Existing Field-Data Item Pairs In accordance with some implementations of the present disclosure, an extraction rule for extracting field label-value pairs from events can be used to extract a field label that corresponds to a field label assigned to another previously extracted field of the events. The previously extracted field may have been extracted using any suitable means, such as an extraction rule that only identifies and extracts values for a field, or an extraction rule that extracts field label-value pairs for a field. The values of the extracted field label-value pairs may be assigned to data items of another field of the events (e.g., a new field), in addition to or instead of assigning the values to data items of the existing field of the events.

Thus, the newly extracted values can be distinguished from the previously extracted values. This approach can be useful in many contexts, such as to distinguish between values that were extracted from events using different extraction rules. As another example, this approach can be used to distinguish between values that were extracted from one event attribute of events (e.g., event raw data), and values that were extracted from another event attribute of the event (e.g., an extracted field).

Referring to FIG. 8G, exemplary events are shown in table format 802 including fields extracted from the events. Assume that field 850 having field label 852 "itemid" was extracted from event attribute 854 having attribute label 856 "_raw" (e.g., event raw data) using an extraction rule which may include a regular expression and may extract values associated with instance 872 of "itemid=". An extraction rule for extracting field label-value pairs from field 858 having field label 860 "referer" can be used to extract field label 862 that corresponds to field label 852 "itemid" of previously extracted field 850 of the events. In accordance with implementations of the present disclosure, the system may cause values 864 of the extracted field label-value pairs to be assigned as data items of another field of the events (e.g., a new field 866 having field label 868 "referer_itemid" in FIG. 8G), in addition to, or instead of assigning values 864 to data items of existing field 852 of the events (e.g., automatically).

Where a new field is created, in some cases, the new field could be assigned the field label that was associated with the values (e.g., field label 862). However, in the example shown, new field 866 is assigned another field label 868, such as a modified version of field label 862. As examples, the assigned field label could be the identified field label prepended, appended, or otherwise supplemented with text, such as user specified text. Instead of user specified text, the text could be automatically generated. In the example shown, the text is from attribute or field label 852 that is assigned to event attribute or field 858 from which values 864 were extracted (i.e., "referer"). Thus, field label 868 that is assigned to new field 866 identifies the source of values 864 for that field.

In accordance with some implementations, the extraction of field label-value pairs can be invoked using a command. A command identifier for the command could be "autoextract," as a specific example. The command could optionally allow the user to specify how to supplement the identified field label, such as the text for supplementing the identified field label, for example, using prepend (if any). The command could also optionally specify which attribute(s) of the events should be used to identify the field label-value pairs. Furthermore, the command could also optionally specify which attribute label(s) of the events should be identified as field labels for the field label-value pairs in the events. In some cases, the command may identify all field label-value pairs that exist in the events, or only in specified attributes thereof. Where an attribute label is specified, the command may optionally only identify field label-value pairs that include the attribute label as a field label. Additionally, the command could optionally specify whether to decode the field label and/or value during extraction. Where decoding is specified, the command may further specify which decoding libraries should be utilized for the decoding.

An exemplary command in accordance with the forgoing could be invoked with "autoextract attribute='itemid' prepend='new_' decode='url'." In this example, "autoextract" is a command identifier, "attribute='itemid'" instructs the command to extract from the event attribute having an attribute label of "itemid," and "prepend='new_'" instructs the command to prepend any field labels identified in the itemid attribute with "new_." Furthermore, decode='url'" instructs the command to use URL decoding (e.g., by referring to a URL decoding library) on any extracted values.

In executing this exemplary autoextract command, the system may search through the data items associated with the itemid attribute for events provided as input to the command. The autoextract command can employ extraction rules to extract sets of field label value pairs for each field label and associated values identified in the data items. In this case, the field labels may not only be identified in the data items, but also generated, or extracted from the data items. For example, the command may search for text in data items having the format "A=B," where each unique A is made a field label for extraction and each B is a value associated with the field label, as one example. Using such a command, at least one field label automatically discovered and extracted from the data items may match or otherwise correspond to a field label of an already existing extracted field. Despite this, the values associated with discovered field labels are assigned to data items of new fields, thereby distinguishing the values from the values of already existing fields. Based on the prepend, the new fields generated by the autoextract command will each be assigned field labels comprising the discovered field labels prepended with "new_." Thus, a user may easily identify the fields in a graphical interface. The autoextract command may optionally correspond to the option labeled "Auto-extract" in FIG. 8C.

It will be appreciated that many variations of the forgoing are possible. In the foregoing example, each field label that is discovered is automatically prepended with text regardless of whether the discovered field labels correspond to a field label of an already existing field. In accordance with some implementations of the present disclosure, the system can identify (e.g., automatically) where an extraction rule for extracting field label-value pairs from events extracts a field label that corresponds to a field label assigned to another previously extracted (and assigned) field of the events.

Doing so can provide various benefits. In the autoextract command above, for example, the system could optionally treat discovered field labels that do not correspond to a field label of an existing field different from those that do (also referred to as "duplicate field labels" for convenience). As an example, the system may automatically perform some action, such as presenting one or more options to the user based on the identification. As another example, the system could apply the prepended text (or other modified version of a field label) only to duplicate field labels (e.g., as part of the command), which may be performed automatically, or could be one of the above options selectable by the user. However, it is noted that benefits associated with identifying duplicate field labels in field label-value pair extraction are not limited to the autoextract command, and are more generally applicable to field label-value pair extraction.

2.9 Extracting Field Label-Value Pairs from Extracted Fields

In further respects, the preset disclosure relates to extracting field label-value pairs from data items of a field (e.g., assigned to one or more events) that were themselves extracted from an event attribute. For example, the data items may have been extracted from event raw data, or another extracted field. Furthermore, the data items may have been extracted using any suitable extraction rule. Examples of suitable extraction rules include an extraction rule for extracting field label-value pairs, and an extraction rule that only provides instruction(s) for identifying and extracting values from data for a field.

Such an approach provides many potential benefits, an example of which is described with respect to the events of FIG. 8G by way of example only. As can be seen in FIG. 8G, some of the event raw data shown in event attribute 854 of events 1, 3, and 4 includes two instances of "itemid=," instance 870 embedded in a (uniform resource identifier) URI and instance 872. A user may wish to create a field based on instance 870 only, as each instance may have a different meaning. Instead of one complicated extraction rule, two simpler extraction rules could be employed to extract the desired data. First, a regular expression based extraction rule could be used to extract the URI to new field 858 having field label 860 "referer," as shown in FIG. 8G. Subsequently, field label-value pair extraction can be performed on extracted field 858, so as to extract values 864 associated with field label 862 "itemid" in the URI, as opposed to anywhere in the raw event data. FIG. 8G shows extracted field 866 having field label 868 "referer_itemid," which can be a new field extracted from extracted field 858 having field label 860 "referer."

As another example, the subsequent extraction could be part of a command to automatically extract any field label-value pairs it discovers in data items of a specified attribute for events, such as in some of the exemplary autoextract commands described above (e.g., using "Auto-Extract" in FIG. 8C). Applying such as command to the event raw data of event attribute 854 of events 1, 3, and 4 may extract field label-value pairs for each field label discovered therein, which may include, itemid, JSESSIONID, categoryid, productid, and action, and also might automatically assign those field label-value pairs to fields. However, the user may only be interested in itemid. In accordance with implementations of the present disclosure, the command could be applied to an extracted field (e.g., field 858), such that the field labels (e.g., field label 862) that are extracted from the extracted field comprise a subset of the field labels that would have been extracted had the same command(s) been applied to event attribute 854 (or another event attribute such as a field). Where the events are displayed in a table format, such as table format 802, such a command(s) could be associated with an option in an option menu where the user selected a column corresponding to the extracted field (e.g., field 858). Amongst other possible benefits, this approach can simplify the user experience while avoiding unwanted or unnecessary extractions.

3.0 Suggested Field Label-Value Pair Extractions

In some respects, the present disclosure relates to suggesting field label-value pair extractions. One or more field label-value pair extractions can be suggested to a user, and may be suggested based on analyzing one or more portions of one or more events of a set of events. In some cases, the one or more portions that are analyzed are selected by a user, such as in a user interface displaying at least some of the set of events. One such suitable interface may display a table format, such as table format 802. Furthermore, the selected one or more portions could correspond to selected portions of the table format, which could be accomplished in a similar manner as described above, amongst other possibilities.

In some implementations, the system receives data indicating the selection of one or more portions of data items of a set of events in a graphical interface displaying one or more events of the set of events. Based on the selection, the system automatically detects at least one field label-value pair at least partially within the selected one or more portions of the data items. Each detected field label-value pair can include a value and an associated field label. For example, the system may automatically determine an extraction rule capable of extracting a field label-value pair at least partially within at least selected one or more value, thereby detecting the field label-value pair.

If a user selects a cell in the table interface, which could correspond to the selection of cell 810 shown in FIG. 8B, the system could attempt to detect at least one field label-value pair that is at least partially within the data item corresponding to cell 810. One such field label-value pair that may be detected in cell 810 has a field label of "productid" and a value of "SF-BVF-G01."

If a user selects a column in the table interface, which could correspond to the selection of column 804a shown in FIG. 8C, the system could attempt to detect at least one field label-value pair that is at least partially within the data items corresponding to column 804a. As a further example, if a user selects multiple columns in the table interface, which could correspond to the selection of columns 804c and 804e shown in FIG. 8D, the system could attempt to detect at least one field label-value pair that is at least partially within the data items corresponding to columns 804c and 804e.

Additionally, if a user selects a portion of a textual representation of a values of one or more data items in the table interface, which could correspond to the selection of portion 814 of textual representation 812 shown in FIG. 8F, the system could attempt to detect at least one field label-value pair that is at least partially within portion 814. One such field label-value pair that may be detected partially within portion 814 has a field label of "productid" and a value of "BS-AG-G09." The user may select at least a portion of text corresponding to the field label, the value, or both the field label and value. In some cases, the user may optionally be required to select all of the associated text and not just the portion.

In further respects, each field label-value pair may be detected based on determining a corresponding extraction rule. For example, as indicated above, a field label-value pair may be detected based on being extractable using the corresponding extraction rule. However, in order to detect the field label-value pair, the field label-value pair does not necessarily have to be extracted using the corresponding extraction rule (although it may be). Rather, the system need only detect that a field label-value pair is extractable at least partially within the selection portion using the corresponding extraction rule. A field label-value pair may be considered at least partially within a selected portion of a data item for purposed of detection where at least some of the textual representation of the data item could be utilized to generate the value and/or the field label of the field label-value pair using the corresponding extraction rule.

The corresponding extraction rule could be a predefined extraction rule, a user generated extraction rule, a user specified extraction rule, or an automatically generated extraction rule, as some examples. In some cases the extraction rule may be generated at least partially based on the selection of the portion of the data items. In these cases, the extraction rule may be automatically generated by the system, or may be automatically generated and subsequently revised based on user input. As an example, an extraction rule can comprise one or more regular expressions that provide instructions for identifying field labels and/or values from data. As another example, an extraction rule can include detecting a first text portion as being separated by one or more designated demarcating characters from a second text portion in data.

Further based on the selection of the portion of the data items, the system can cause display of one or more options corresponding to one or more of the detected field label-data item pairs. For example, the options could be included in an option menu, which could be one of options 930*a*, 930*b*, 930*c*, or 930*d* or option menu 926 of FIG. 9 based on detection of a field label-value pair at least partially in a selected portion of a table format (e.g., cell(s), column(s), and/or portion(s) of a textual representation(s)). With respect to FIG. 8F, the option could be option 832 and could read "Extract 'productid'," with 'productid' being contextually generated based on the user selection. In addition, or instead, one of the options could read "Autoextract," and correspond to the autoextract command described above.

It is noted that not all detected field-label value pairs may be suggested with the options. Instead, a subset of detected field-label pairs may be suggested for extraction. Various selection criteria could be employed to choose which detected field-label pairs to suggest for extraction. In some cases, the selection criteria may be based on a number of field label-value pairs that are extractable using the corresponding extraction rule, with one or more detected field label-value pairs corresponding to the top numbers being used for suggestion.

Based on an option of the displayed one or more options being selected, the system can carry out one or more operations associated with the option. In some cases, the operations comprise one or more data items being assigned to one or more fields of the set of events (e.g., a new fields and/or existing fields). The one or more data items can be extracted using the corresponding extraction rule(s) for the one or more of the detected field label-data item pairs that correspond to the option.

At least one of the one or more data items may optionally comprise a value extracted and/or displayed before the option was selected, for example, as part of detecting the at least one field label-value pairs. However, at least one of the one or more data items may optionally comprise a value extracted based on, or responsive to, the selection of the option. For example, as described above, detection of a field label-value pair does not require extraction by the corresponding extraction rule, but could use some heuristic. Another scenario could be that the corresponding extraction rule was only partially executed for detection, for example, until at least one field label-value pair had been extracted. Yet another example is where the option corresponds to a command that extracts field label-value pairs that are identified within more than just the selected portion(s) of the data item(s), such as an entire column, where the user selected a cell or a textual representation of a data item value.

Thus, a user could select the "Extract 'productid'" option described above, and the system could assign only field label-value pairs that include the field label "productid" and any associated extracted values to data items of events as a new field that the system assigns the field label of "productid" (e.g., using a command associated with the selected option). The system may further automatically add a column corresponding to the new data items to the table format, or other format utilized to display events. As another example, a user could select the "Autoextract" option described above, and similar operations may be performed as the Extract 'productid'" option, with additional operations being performed to extract any other field label-value pairs that an autoextract command discovers at least partially in the selected portion(s) of the data item(s).

It is noted that options that are displayed and correspond to one or more of the detected field label-data item pairs need not be displayed in an option menu, or in the same option menu as other options when implemented with search screen 800. In some cases, one or more options may be displayed in a sidebar, such as sidebar 830, as one example. As another example, one or more of options may not be selectable. For example, an option could be displayed as non-selectable dialog, and may be included in a dialog box. The user may select the one or more portions of the events by hovering over a selectable region that corresponds to the one or more portions of the events. If a field label-value pair is detected, the dialog may be presented to the user.

It is further noted that although suggesting field label-value pair extractions could be integrated into a search interface that corresponds to search screen 800, with the set of events being search results described with respect to search screen 800, field label-value pair extractions could be suggested in other contexts, and need to be based on search results. As an example, the suggestions could be provided as part of a configuration interface (or search interface), where an option may be operable to save the corresponding extraction rule(s) (e.g., generated based on the user's selection of events) to a configuration file. In addition, or instead, an option may save the data items extracted with the corresponding extraction rule(s) (e.g., to the configuration file). The configuration file could be used to apply the suggested field label-value pair extractions (e.g., the corresponding extraction rule(s)) to other events than were utilized to generate the suggestions. For example, the configuration file may be loaded for this purpose in a search interface (e.g., in search screen 800). These and other possibilities are contemplated with respect to suggesting field label-value pair extractions.

3.1 Log Chat

In some respects, the present disclosure relates to various approaches for displaying data from events in a visually distinct display format. In various implementations, at least one request is received to display at least a portion of a first events set and at least a portion of a second events set (e.g., first time-stamped events set and a second time-stamped events set). In response to receiving the at least one request, the system can cause for display, on a user interface, the at least a portion of the first events set and the at least a portion of the second events set in the visually distinct display format. The visually distinct display format can be utilized to aid in searching and analysis of event data. For example, because the at least a portion of the first events set is displayed in a visually distinct manner from the at least a portion of the second events set, a user can quickly and efficiently identify patterns in the data.

Figure 12:
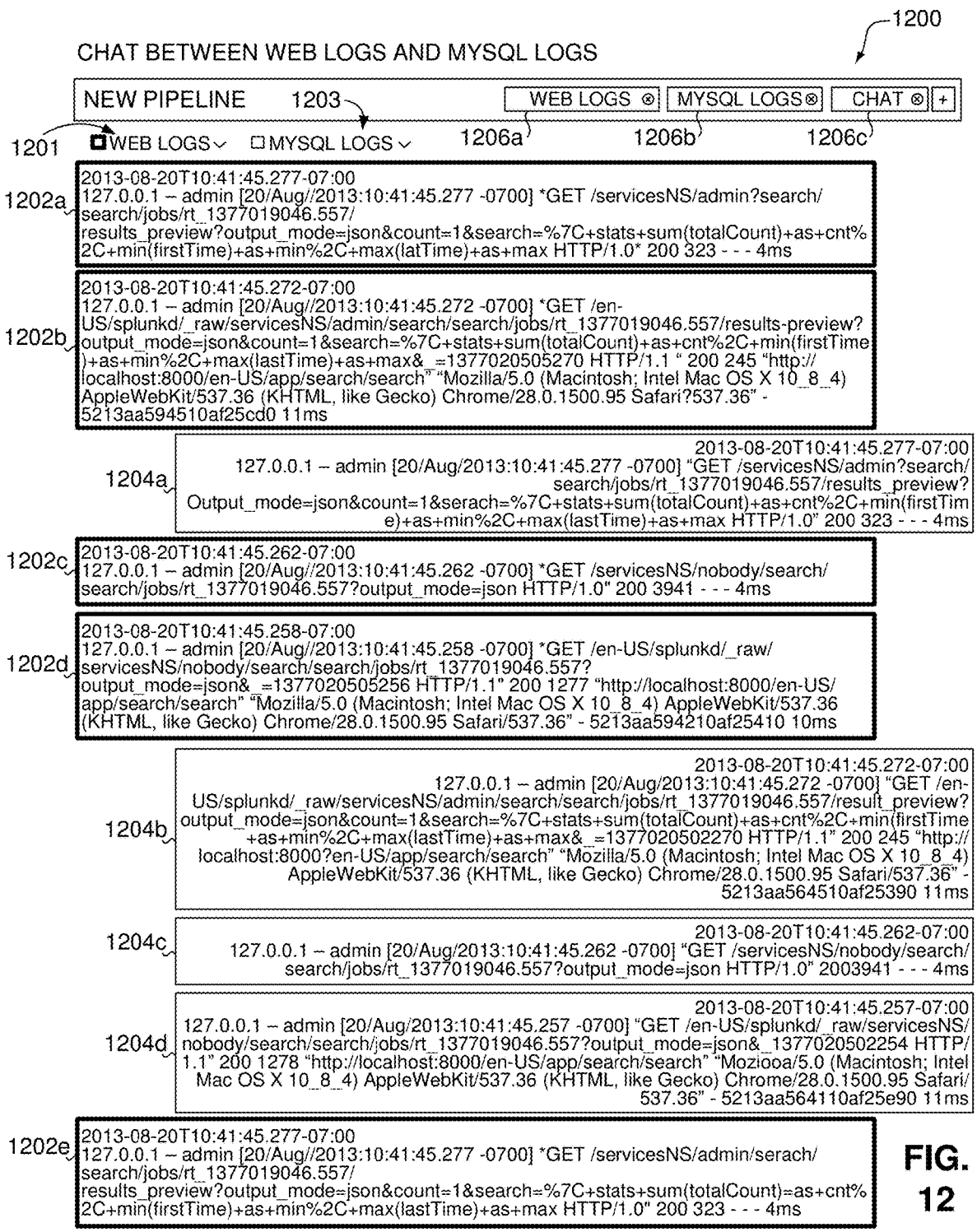
FIG. 12 illustrates a log chat interface in accordance with the disclosed embodiments.

Referring to FIG. 12, an exemplary display of data from events in a visually distinct display format is shown. The visually distinct display format may also be a log chat format, an example of which is shown in log chat screen 1200. In FIG. 12, the at least a portion of the first events set can correspond to data portions 1202a, 1202b, 1202c, 1202d, and 1202e (which are also referred to collectively herein as "data portions 1202"). Also in FIG. 12, the at least a portion of the second events set can correspond to data portions 1204a, 1204b, 1204c, and 1204d (which are also referred to collectively herein as "data portions 1204"). Although only data portions 1202 and 1204 are shown, each of the at least a portion of the first and second events sets can comprise additional data portions, which may be displayed, for example, by scrolling, or otherwise interacting with log chat screen 1200.

Each data portion can correspond to an event in an events set. For example, each data portion may represent event raw data of a respective event, as shown. Although data portions are shown with text from event raw data, the event raw data could be represented in another way, and furthermore, not all of the event raw data need be shown, or could be modified and shown. Furthermore, a data portion may represent, or correspond to, any event attribute of an event, such as an extracted field, a default field or metadata field of an event, or any statistics, aggregates, or values calculated from one or more events, and could comprise a value of the event attribute for its corresponding event.

Thus, for example, either one of the at least a portion of the first events set and the at least a portion of the second events set can comprise statistics, aggregates, or calculations based on an event or a value in the event.

Data portions 1202 and data portions 1204 are visually distinguishable from one another. For example, data portions 1202 are each formatted in accordance with a first presentation format and data portions 1204 are each formatted in accordance with a second presentation format. In some respects, the causing display, on the user interface, of the at least a portion of the first events set and of the at least a portion of the second events set in the visually distinct display format can include causing display, on the user interface, of the at least a portion of the first events set in a first color, and causing display, on the user interface, of the at least a portion of the second events set in a second color that is different from the first color.

In the present example, each data portion of data portions 1202 and 1204 may be contained within a respective box, as shown. Boxes for data portions 1202 can be shaded with one color and boxes for data portions 1204 with another to visually distinguish the data portions. In the example shown, boxes for data portions 1202 are bolded so as to distinguish them from boxes for data portions 1204. Furthermore, the first presentation is distinguished from the second presentation format in that each have a different alignment for the data portions. In particular, boxes for data portions 1202 are aligned with one side of log chat screen 1200 (e.g., in a left-aligned format) and boxes for data portions 1204 are aligned with the other side of log chat screen 1200 (e.g., in a right-aligned format).

Further shown in FIG. 12, the visually distinct display format is an interleaved and visually distinct display format, where, data from the at least a portion of the first events set is interleaved with data from the at least a portion of the second events set. As shown, data portions 1202 are interleaved with data portions 1204 such that the data portions are displayed in an alternating arrangement. The data from the at least a portion of the first events set and the data from the at least a portion of the second events set can be presented in chronological order based on timestamps, using the interleaving. For example, as shown, each data portion represents a respective event, and is positioned based on a time-stamp (e.g., _time field value) assigned to the event.

A source for the at least a portion of the first events set represents a first participant in the visually distinct display format, and a source for the at least a portion of the second events set represents a second participant in the visually distinct display format. In the example shown, the source of data portions 1202 is visually indicated as being "web logs" 1201, and the source of data portions 1204 is visually indicated as being "MySQL Logs" 1203. The visual indications may each optionally include a respective checkbox that can be used to selectively enable or disable display of corresponding data portions (not shown). For example, a checkbox for Web Logs can be used to remove data portions 1202 from the visualization, or otherwise minimize or alter their presentation. The checkbox may be selected again to restore the original presentation. Additionally, the visual indications may each optionally include a legend element, as shown which is formatted similar to the boxes for the data portions to indicate which data portions are associated with which source.

In some implementations, the sources can correspond to different search result sets, which may be provided from different search queries. For example, the source web logs 1201 could correspond to an output data set of the saved pipeline "Web Logs" in FIG. 11 and the source MySQL Logs 1203 could correspond to an output data set of the saved pipeline "MySQL Logs" in FIG. 11. However, it is noted that the pipelines need not be saved to be a source. As an example, one or both of web logs 1201 and MySQL Logs 1203 could be loaded in respective interfaces (e.g., windows), which may be respectively accessible using tabs 1206a and 1206b. The interfaces may be an interface described above, such as search interfaces, or other interfaces. The log chat interface shown may correspond to tab 1206c in FIG. 12 and a user may select the tabs to traverse between interfaces.

Thus, in some respects, a first request can be received to represent the at least a portion of the first time-stamped events set as a first tab on the user interface (e.g., to load the source in tab 1206a) and a second request is received to represent the at least a portion of the second time-stamped events set as a second tab on the user interface (e.g., to load the source in tab 1206b). Furthermore, a request may be received to join data represented by the first and second tabs in the visually distinct display format. For example, a user may initiate a request to join data represented by tabs 1206a and 1206b as data portions 1202 and 1204 in the visually distinct display format.

It is further noted that in some implementations, multiple sources can be provided by the same pipeline, or search query. As an example, the two sources might be from the same output data set of the saved pipeline "MySQL Logs"

in FIG. 11. As an example, one source could be assigned as each event in an output data set that has a data item of a particular field with a first value and another source could be assigned as each event in the output data set that has a data item of the particular field with a second value. As another example, each source may correspond to a different field within the same output data set. As a further example, one source could correspond to a particular field or other value assigned to events from an output data set and another source could correspond to event raw data of the events of the output data set. It is further noted that, a single source could be provided by multiple pipelines, or search queries. As an example, the sources might be from a mixing of output data sets provided by the saved pipelines "MySQL Logs" and "Web Logs" in FIG. 11, or loaded in a tab.

In some cases, the at least a portion of the first events set comprises the first events set, and the at least a portion of the second events set comprises the second events set. For example, the first events set could correspond an output data set from one pipeline (e.g., the saved pipeline "Web Logs" in FIG. 11), and the second events set could correspond to an output data set from another pipeline (e.g., the saved pipeline "MySQL Logs" in FIG. 11). In other cases, subsets of the output data sets can be employed.

The first events set can represent data from a first system (e.g., raw log data), and the second events set can represents data from a second system (e.g., raw log data). For example, the first events set may only comprise data corresponding to events from a first system and the second events set may only comprise data corresponding to events from a second system. This may be achieved, for example, by filtering out events from other systems in a pipeline used to provide the data. As an example, the first events set may have been provided by filtering out events that do not have a particular first host field value and, the second events set may have been provided by filtering out events that do not have a particular second host field value. As another example, each source could be assigned as a different value of a host field from the same output data set. It should be appreciated that fields other than the host field can be utilized in the forgoing examples, such as other default fields (e.g., a source type field, or a source field), or extracted fields.

The at least a portion of the first events set can represent a column of data from a first data table, and the at least a portion of the second events set can represent a column of data from a second data table. For example, where the source representing the first participant is loaded into a table format, for example, in a search screen such as search screen 800 (e.g., in tab 1206a), data portions 1202 may be provided from an event attribute that corresponds to a column in the table format (e.g., values of data items in the column). Similarly, where the source representing the second participant is loaded into a table format, for example, in a search screen such as search screen 800 (e.g. in tab 1206b), data portions 1204 may be provided from an event attribute that corresponds to a column in the table format (e.g., values of data items in the column).

As another example, the at least a portion of the first events set can represent a column of data from a first data table, and the at least a portion of the second events set can represent another column of data from the first data table. For example, in the example above, the source representing the second participant may instead be loaded into the table format as the source representing the first participant, and data portions 1204 may be provided from an event attribute that corresponds to a column in the table format (e.g., values of data items in the column).

Regardless of whether sources correspond to the same or different search queries and/or data processing pipelines, any source may be configured such that its data portions correspond to any single event attribute of the events, such as an extracted field, a default field or metadata field of an event, or any statistics, aggregates, or values calculated from one or more events, combinations thereof, or multiple event attributes thereof. For example, one source could comprise event raw data with each data portion comprising event raw data for a respective event. Another source could comprise a field extracted from event raw data with each data portion comprising values of the field for a respective event. As a further example, a source could comprise multiple event attributes of events with each data portion comprising values of each of the event attributes or combinations or derivations thereof.

Furthermore, the source for any given participant in the visually distinct display format could optionally change to another source, such as any source described herein based on one or more conditions being met. One such condition could be time, which may be calculated from the values of time-stamps of events corresponding to the source. After the time between data portions exceeds a threshold value, or when a timestamp associated with an event corresponding to a data portion exceeds a threshold value, the source might change (e.g., to a different event attribute, such as a different field extracted from the events, or a different data processing pipeline, or both a different event attribute and a different data processing pipeline). In addition to, or instead of time, other values associated with event attributes may be considered. More particularly, while time-stamp values of one or more events might be compared to the threshold value as in the examples above, other values of one or more other event attributes may be compared to a respective threshold value, such as values of extracted fields, or statistical or calculated values derived from the events. In addition to, or instead of changing to another source, in any of the foregoing situations, the presentation format of data portions associated with that participant may change based on one or more values exceeding one or more threshold values. Any aspect of the presentation format may change, such as the color, boxes, font size, or formatting.

It is further noted that the visually distinct display format need not be limited to two participants. For example, in some cases, a request is received to display the at least a portion of the first events set, the at least a portion of the second events set, and at least a portion of a third events set (e.g., a time-stamped events set) in the visually distinct display format. The system causes display, on the user interface, the at least a portion of the first events set, the at least a portion of the second events set, and the at least a portion of the third events set in the visually distinct display format (e.g., an interleaved and visually distinct display format). A source for the at least a portion of the third events set can represent a third participant in the visually distinct display format. Thus, data portions can be provided from the source that are interleaved with data portions 1202 and 1204 and may be represented using a different color (or other presentation format) than either of data portions 1202 and 1204 (e.g., with different colored boxes).

3.2 Additional Exemplary Implementations

Figure 13:
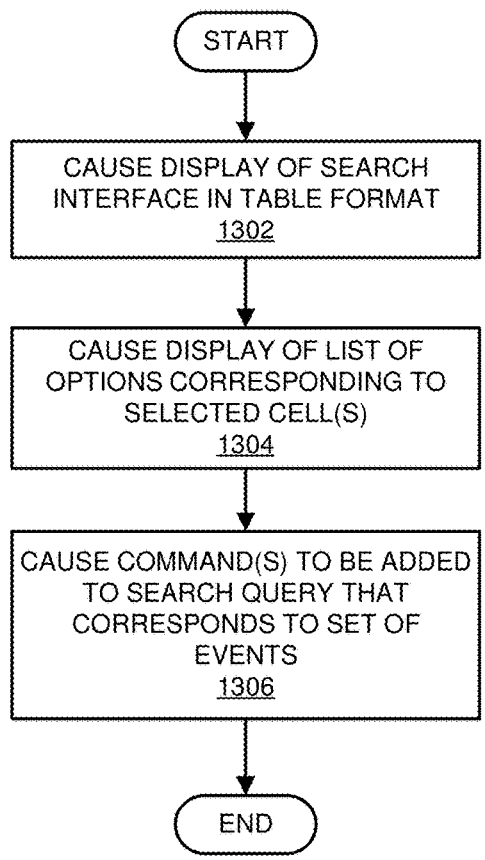
FIG. 13 presents a flowchart illustrating cell-based table manipulation in accordance with the disclosed embodiments.

FIG. 13 presents a flowchart illustrating cell-based table manipulation in accordance with the disclosed embodiments. Each block illustrating methods in accordance with FIG. 13, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1302, display is caused of a search interface in a table format. For example, a search system can cause display of a search interface in a table format (e.g., table format 802) that includes one or more columns (e.g., one or more of columns 804a, 804b, 804c, 804d, 804e, 804f, 804g, and 804h), each column comprising data items of an event attribute, the data items being of a set of events, and a plurality of rows forming cells with the one or more columns (e.g., any combination of rows 806a, 806b, 806c, 806d, and 806e), each cell comprising one or more of the data items of the event attribute of a corresponding column, and each cell being selectable by a user (e.g., any of the cells shown in table format 802).

At block 1304, display is caused on of a list of corresponding to a selected cell(s). For example, based on the user selecting one or more of the cells (e.g., cell 810 in FIG. 8B) in the table format, display can be caused of a list of options (e.g., option menu 826a in FIG. 8B) corresponding to the selected one or more cells.

At block 1306, a command(s) is added to a search query that corresponds to a set of events (e.g., a search results set produced by the search query, or based on the search query). For example, one or more commands may be caused to be added to a search query that corresponds to the set of events, the one or more commands being based on at least an option that is selected from the list of options and the event attribute for each of the one or more of the data items of each of the selected one or more cells.

In some cases, the selected option is caused to be included in the displayed list of options based on a determination that at least one of the selected one or more cells is an empty cell. In some cases, the selected option is caused to be included in the displayed list of options based on a determination that at least one of the one or more of the data items of at least one of the selected one or more cells is of a numeric data type. In some cases, the selected option is caused to be included in the displayed list of options based on a determination that at least one of the one or more of the data items of at least one of the selected one or more cells is of a categorical data type. In some cases, the selected option is caused to be included in the displayed list of options based on a determination that at least one of the one or more of the data items of at least one of the selected one or more cells comprises event raw data. In some cases, the selected option is caused to be included in the displayed list of options based on a determination that at least one of the one or more of the data items of at least one of the selected one or more cells comprises a timestamp (e.g., of event raw data). In some cases, the selected one or more cells comprise a first selected cell and a second selected cell, and the selected option is caused to be included in the displayed list of options based on a determination that the first and second cells are in different columns of the one or more columns. In some cases, the selected option is caused to be included in the displayed list of options based on a determination that at least one of the one or more of the data items of at least one of the selected one or more cells comprise a statistical value generated by one or more statistical functions performed on values of data items of at least some of the set of events. In some cases, the selected option is caused to be included in the displayed list of options based on a determination that at least one of the one or more of the data items of at least one of the selected one or more cells comprises multiple values. In some cases, the selected option is caused to be included in the displayed list of options based on detection of at least one field-label value pair in the selected one or more cells.

In some cases, the data items of the event attribute of the corresponding column of at least one of the selected one or more cells each comprise values extracted from the set of events using a common extraction rule.

In some cases, the selected one or more cells is an individually selected cell. In some cases, the selected option is caused to be generated at least partially based on detection of at least one field label-value pair in the selected one or more cells.

In some cases, a field label of a field-label value pair is caused to be detected in the selected one or more cells, and the field label is caused to be displayed in an option in the displayed list of options.

In some cases, one or more command elements of the one or more commands entered into a form by the user are received, the option is displayed in the list of options as the form.

In some cases, one or more command elements of the one or more commands include at least one value of the one or more of the data items for each of the selected one or more cells.

In some cases, further based on the user selecting the one or more of the cells in the table format, the event attribute for each of the one or more of the data items of each of the selected one or more cells is caused to be included as one or more command elements of the one or more commands.

In some cases, further based on the user selecting the one or more of the cells in the table format, the search query comprising the one or more commands is caused to be automatically executed, the set of events is caused to be updated to correspond to the executed search query, and the displayed search interface is caused to be updated to correspond to the updated set of events.

In some cases, further based on the user selecting the one or more of the cells in the table format, a displayed representation of the search query in the user interface is caused to be automatically updated to include a representation of the added one or more commands.

In some cases, further based on the user selecting the one or more of the cells in the table format, the search query comprising the added one or more commands is caused to be executed, the executing applying a late binding schema to events, the late binding schema associated with one or more extraction rules defining one or more fields for the set of events.

In some cases, the one or more commands are operable by the search system to extract one or more field label-values pairs from at least the data items of each of the selected one or more cells and assign the field label-value pairs to at least one event of the set of events.

In some cases, display is caused of the option as a form in the displayed list of options, the form comprising at least one form element operable to enter one or more command elements into the one or more commands, and further based on the user selecting the one or more of the cells in the table format, the form is caused to be automatically reproduced in the search interface, the reproduced form being operable by the user to modify the one or more commands added in the search query.

In some cases, further based on the user selecting the one or more of the cells in the table format, a command entry that represents the one or more commands is caused to be automatically added to a displayed list of command entries in the search interface, each of the command entries respectively representing one or more commands of a plurality of commands of the search query, the list of command entries being displayed in a sequence corresponding to the plurality of commands of the search query.

In some cases, the one or more commands are of a pipelined search language.

In some cases, the search query comprises an input search query and an additional search query that extends the input search query, the search interface restricting the user from modifying the input search query.

Figure 14:
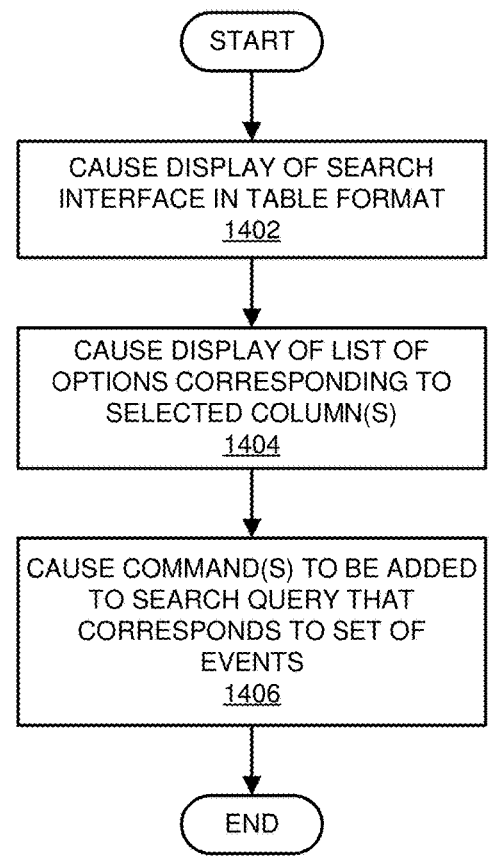
FIG. 14 presents a flowchart illustrating column-based table manipulation in accordance with the disclosed embodiments.

FIG. 14 presents a flowchart illustrating column-based table manipulation in accordance with the disclosed embodiments. At block 1402, display is caused on a search interface in a table format. For example, display can be caused of a search interface in a table format (e.g., table format 802) that includes a plurality of columns (e.g., any combination of columns 804a, 804b, 804c, 804d, 804e, 804f, 804g, and 804h), each column comprising data items of an event attribute, the data items being of a set of events, each column being selectable by a user, and a plurality of rows (e.g., any combination of rows 806a, 806b, 806c, 806d, and 806e) forming cells with the one or more columns, each cell comprising one or more of the data items of the event attribute of a corresponding column.

At block 1404, display is caused on of a list of corresponding to a selected column(s). For example, based on the user selecting one or more of the columns (e.g., column 804a in FIG. 8C or Columns 804c and 804e in FIG. 8D) of the plurality of columns in the table format, display can be cause of a list of options (e.g., option menu 826b in FIG. 8C or option menu 826c in FIG. 8D) corresponding to the selected one or more columns.

At block 1406, a command(s) are caused to be added to a search query that corresponds to a set of events (e.g., a search results set produced by the search query, or based on the search query). For example, one or more commands can be caused to be added to a search query that corresponds to the set of events, the one or more commands being based on at least an option that is selected from the list of options and the event attribute of each of the selected one or more columns.

In some cases, the selected option is caused to be included in the displayed list of options based on a determination that at least one of the cells of at least one of the selected one or more of the columns is an empty cell. In some cases, the selected option is caused to be included in the displayed list of options based on a determination that at least one of the selected one or more of the columns represents data items of a numeric data type. In some cases, the selected option is caused to be included in the displayed list of options based on a determination that at least one of the selected one or more of the columns represents data items of a categorical data type. In some cases, the selected option is caused to be included in the displayed list of options based on a determination that at least one of the selected one or more of the columns represents event raw data of the set of events. In some cases, the selected option is caused to be included in the displayed list of options based on a determination that at least one of the selected one or more of the columns represents data items comprising timestamps (e.g., of the set of events). In some cases, the selected option is caused to be included in the displayed list of options based on a determination that at least one of the selected one or more of the columns represents data items comprising statistical values generated by one or more statistical functions performed on values of data items of at least some of the set of events. In some cases, the selected option is caused to be generated at least partially based on detection of at least one field label-value pair in the selected one or more columns.

In some cases, the columns of the plurality of columns in the table format are individually selectable by the user. In some cases, the selected one or more columns is an individually selected column. In some cases, the selected one or more columns comprises at least a first selected column and a second selected column.

In some cases, the data items of the event attribute of at least one of the selected one or more columns comprise values extracted from the set of events using a common extraction rule.

In some cases, a field label of a field-label value pair is caused to be detected in the selected one or more columns, and the field label is caused to be displayed in an option in the displayed list of options.

In some cases, one or more command elements of the one or more commands entered into a form by the user are received, the option is displayed in the list of options as the form.

In some cases, one or more command elements of the one or more commands include at least one value of the data items for each of the selected one or more columns.

In some cases, further based on the user selecting the one or more of the columns of the plurality of columns in the table format, the event attribute for each of the data items of each of the selected one or more columns is caused to be included as one or more command elements of the one or more commands.

In some cases, further based on the user selecting the one or more of the columns of the plurality of columns in the table format, the search query comprising the one or more commands is caused to be automatically executed, the set of events is caused to be updated to correspond to the executed search query, and the displayed search interface is caused to be updated to correspond to the updated set of events.

In some cases, further based on the user selecting the one or more of the columns of the plurality of columns in the table format, a displayed representation of the search query in the user interface is caused to be automatically updated to include a representation of the added one or more commands.

In some cases, further based on the user selecting the one or more of the columns of the plurality of columns in the table format, the search query comprising the added one or more commands is caused to be executed, the executing applying a late binding schema to events, the late binding schema associated with one or more extraction rules defining one or more fields for the set of events.

In some cases, the one or more commands are operable by the search system to extract one or more field label-values pairs from at least the data items of each of the selected one or more columns and assign the field label-value pairs to at least one event of the set of events.

In some cases, display is caused of the option as a form in the displayed list of options, the form comprising at least one form element operable to enter one or more command elements into the one or more commands, and further based on the user selecting the one or more of the columns of the plurality of columns in the table format, the form is caused to be automatically reproduced in the search interface, the reproduced form being operable by the user to modify the one or more commands added in the search query.

In some cases, further based on the user selecting the one or more of the columns of the plurality of columns in the table format, a command entry that represents the one or more commands is caused to be automatically added to a displayed list of command entries in the search interface, each of the command entries respectively representing one or more commands of a plurality of commands of the search query, the list of command entries being displayed in a sequence corresponding to the plurality of commands of the search query.

In some cases, the one or more commands are of a pipelined search language.

In some cases, the plurality of columns of the table format is caused to be reordered in the displayed search interface based on a user interaction with the table format (e.g., the user dragging a column in the table format).

In some cases, the selected option is caused to be included in the displayed list of options based on a data type assigned to the event attribute of at least one of the one or more of the data items of at least one of the selected one or more cells.

Figure 15:
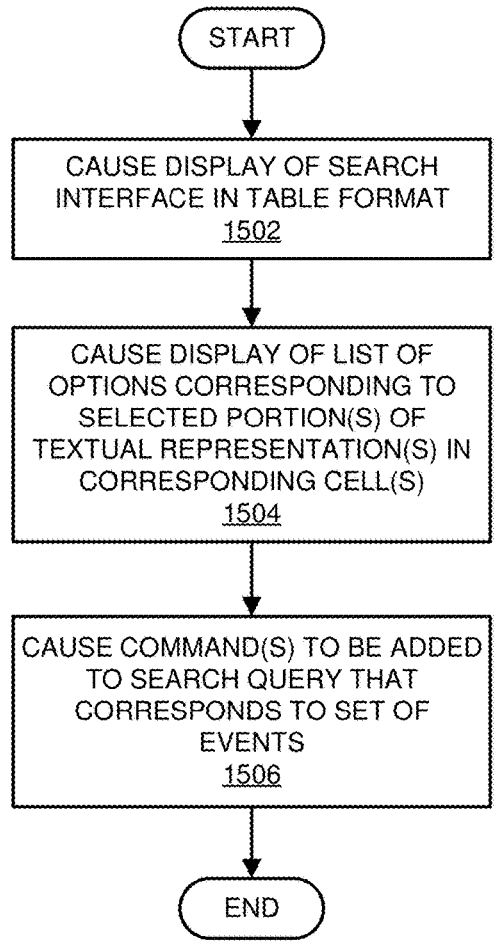
FIG. 15 presents a flowchart illustrating text-based table manipulation in accordance with the disclosed embodiments.

FIG. 15 presents a flowchart illustrating text-based table manipulation in accordance with the disclosed embodiments. At block 1502, display is caused of a search interface in a table format. For example, display can be caused on a search interface in a table format (e.g., table format 802) that include one or more columns (e.g., one or more of columns 804a, 804b, 804c, 804d, 804e, 804f, 804g, and 804h), each column comprising data items of an event attribute, the data items being of a set of events, and a plurality of rows forming cells with the one or more columns (e.g., any combination of rows 806a, 806b, 806c, 806d, and 806e), each cell displaying a textual representation of at least one of the data items of the event attribute of a corresponding column (e.g., textual representation 812 in FIG. 8F), the textual representation being selectable by a user.

At block 1504, display is caused of a list of options corresponding to a selected portion(s) of a textual representation(s) in a corresponding cell(s). For example, based on the user selecting a portion of the textual representation in a corresponding cell (e.g., portion 514 of textual representation 512 in FIG. 8F) display can be caused of a list of options (e.g., option menu 826e in FIG. 8F) corresponding to the selected portion of the textual representation in the corresponding cell.

As block 1506, a command(s) is caused to be added to a search query that corresponds to a set of events. For example, one or more commands can be caused to be added to a search query that corresponds to the set of events (e.g., a search results set produced by the search query, or based on the search query), the one or more commands being based on at least an option that is selected from the list of options and the selected portion of the textual representation in the corresponding cell.

In some cases, the selected option is caused to be included in the displayed list of options based on a determination that the selected portion of the textual representation represents a data item having multiple values. In some cases, the selected option is caused to be included in the displayed list of options based on a determination that the selected portion of the textual representation represents a data item comprising event raw data. In some cases, the selected option is caused to be included in the displayed list of options based on a determination that the selected portion of the textual representation represents a data item of a categorical data type. In some cases, the selected option is caused to be included in the displayed list of options based on detection of at least one field-label value pair in the corresponding cell.

In some cases, the data items of the event attribute of the corresponding column of the corresponding cell each comprise values extracted from the set of events using a common extraction rule.

In some cases, further based on the user selecting the portion of the textual representation in the corresponding cell, a field label-value pair is caused to be detected in at least the selected portion of the textual representation, where one or more options in the list of options are based on the detecting of the field label-value pair.

In some cases, one or more options in the list of options are based on an identification of the selected portion of the textual representation comprising at least some of a field label of a field label-value pair.

In some cases, the textual representation is of a single data item.

In some cases, a field label of a field-label value pair is caused to be detected in at least some of the selected portion of the textual representation, and the field label is caused to be displayed in an option in the displayed list of options.

In some cases, one or more command elements of the one or more commands entered into a form by the user are received, the option is displayed in the list of options as the form.

In some cases, the one or more commands are further based on the event attribute for each of the at least one data items corresponding to the textual representation comprising the selected portion of the textual representation.

In some cases, one or more command elements of the one or more commands include at least the selected portion of the textual representation.

In some cases, further based on the user selecting the portion of the textual representation in the corresponding cell, the event attribute for each of the at least one of the data items corresponding to the textual representation comprising the selected portion of the textual representation is caused to be included as one or more command elements of the one or more commands.

In some cases, based on the user selecting the portion of the textual representation in the corresponding cell, the search query comprising the one or more commands is caused to be automatically executed, the set of events is caused to be updated to correspond to the executed search query, and the displayed search interface is caused to be updated to correspond to the updated set of events.

In some cases, based on the user selecting the portion of the textual representation in the corresponding cell, a displayed representation of the search query in the user interface is caused to be automatically updated to include a representation of the added one or more commands.

In some cases, based on the user selecting the portion of the textual representation in the corresponding cell, the search query comprising the added one or more commands is caused to be executed, the executing applying a late binding schema to events, the late binding schema associated with one or more extraction rules defining one or more fields for the set of events.

In some cases, the one or more commands are operable by the search system to extract one or more field label-values pairs from at least the corresponding cell and assign the field label-value pairs to at least one event of the set of events.

In some cases, display is caused of the option as a form in the displayed list of options, the form comprising at least one form element operable to enter one or more command elements into the one or more commands, and further based on the user selecting the portion of the textual representation in the corresponding cell, the form is caused to be automatically reproduced in the search interface, the reproduced form being operable by the user to modify the one or more commands added in the search query.

In some cases, based on the user selecting a portion of the textual representation in a corresponding cell, a command entry that represents the one or more commands is caused to be automatically added to a displayed list of command entries in the search interface, each of the command entries respectively representing one or more commands of a plurality of commands of the search query, the list of command entries being displayed in a sequence corresponding to the plurality of commands of the search query.

In some cases, the one or more commands are of a pipelined search language.

Figure 16:
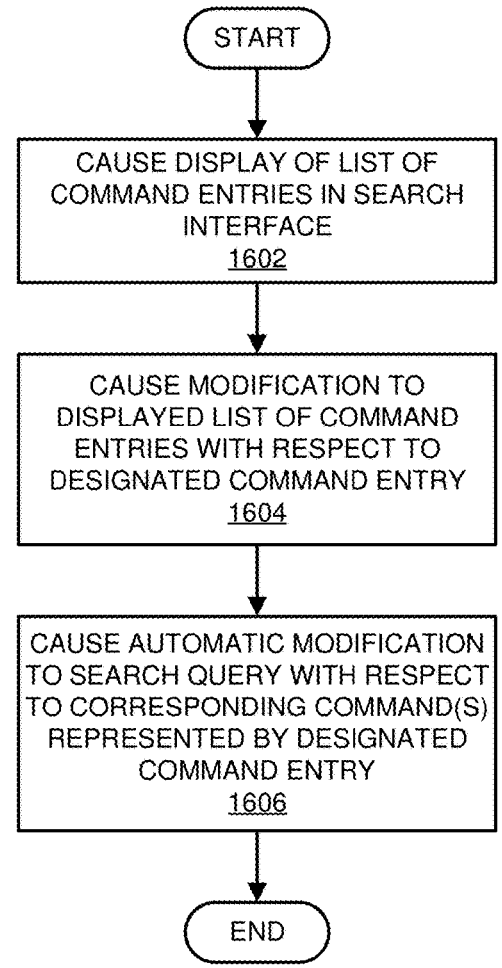
FIG. 16 presents a flowchart illustrating command entry list interaction in accordance with the disclosed embodiments.

FIG. 16 presents a flowchart illustrating command entry list interaction in accordance with the disclosed embodiments. At block 1602, display is caused of a list of command entries in a search interface. For example, display is caused of a list of command entries (e.g., command entries 1040b, 1040c, and 1040d in FIG. 10) in a search interface, each of the command entries representing one or more commands of a plurality of commands (e.g., commands 1044b, 1044c, and 1044d) of a search query (e.g., search query 1044), the list of command entries being displayed in a sequence corresponding to the plurality of commands of the search query.

As block 1604, modification is caused to the displayed list of command entries with respect to a designated command entry. For example, based on a user interaction (e.g., selecting an option associated a command entry, dragging the command entry to another place in the list to reorder the command entry) with a designated command entry in the displayed list of command entries, modification is caused to the displayed list of command entries with respect to the designated command.

At block 1606, modification is automatically caused to the search query with respect to a corresponding command(s) represented by the designated command entry. For example, an automatic modification is caused to the search query with respect to the corresponding one or more commands represented by the designated command entry.

In some cases, the modification comprises causing the designated command entry to be removed from the displayed list of command entries and the automatic modification comprises causing the corresponding one or more commands to be removed from the search query. In some cases, the modification comprises causing the designated command entry to be reordered in the displayed list of command entries and the automatic modification comprises causing the corresponding one or more commands to be reordered in the search query. In some cases, the modification comprises causing the designated command entry to be shifted up in the displayed list of command entries and the automatic modification comprises causing the corresponding one or more commands to be shifted up in the search query. In some cases, the modification comprises causing the designated command entry to be shifted down in the displayed list of command entries and the automatic modification comprises causing the corresponding one or more commands to be shifted down in the search query.

In some cases, further based on the user interaction with the designated command entry in the displayed list of command entries, a search result set corresponding to the search query is caused to be automatically updated based on the modified search query.

In some cases, display is caused of a set of events corresponding to the search query in the search interface, and further based on the user interaction with the designated command entry in the displayed list of command entries; the displayed set of events is caused to be automatically updated to correspond to the modified search query.

In some cases, the designated command entry displays a textual representation of at least portions of the corresponding one or more commands in a form, the user interaction comprises a user editing the textual representation using the form, and the automatic modification comprises causing at least some of the edited textual representation to be incorporated into the search query.

In some cases, the designated command entry comprises a textual representation of at least one command identifier of the corresponding one or more commands and a form element representing a command element of the corresponding one or more commands, and the user interaction is with the form element.

In some cases, the user interaction comprises a user renaming a command element in the corresponding one or more commands using a form element in the designated command entry that represents the command element, and the automatic modification comprises causing one or more other command elements in one or more other commands to be renamed in the search query so as to correspond to the renamed command element.

In some cases, one or more new commands are caused to be added to the modified search query, and based on the one or more new commands being added to the modified search query, a new command entry is caused to be added to the modified displayed list of command entries, the new command entry representing the one or more new commands.

In some cases, based on a user selection of a saved data processing pipeline from a plurality of saved data processing pipelines in a selection interface, the search query is caused to be loaded into the search interface, where the list of command entries is populated with the command entries based on the loaded search query, and where the loaded search query defines the saved data processing pipeline.

In some cases, based on a user selection of a saved data processing pipeline from a plurality of saved data processing pipelines in a selection interface, an input search query is caused to be loaded into the search interface, where the list of command entries is populated with an input command entry representing the input search query, where the loaded input search query comprises a plurality of commands defining the saved data processing pipeline, and where the search query corresponds to an extension of the saved data processing pipeline.

In some cases, based on a user selection of a saved data processing pipeline from a plurality of saved data processing pipelines in a selection interface, the saved data processing pipeline is caused to be loaded into the search interface, and a saved pipeline label assigned to the saved data processing pipeline is caused to be displayed in the search interface, where the search query extends the loaded saved data processing pipeline.

In some cases, display is caused of a plurality of form elements, each form element having a position corresponding to a respective command element of the list of command elements, where the user interaction comprises a user selection of an option using one of the plurality of form elements that corresponds to the designated command element.

In some cases, display is caused of a plurality of form elements, each form element being displayed in association with a respective command element of the list of command elements, and each form element is selectable by a user to cause modification to the displayed list of command entries with respect to the respective command element, and cause an automatic modification to the search query with respect to the corresponding one or more commands represented by the respective command entry.

Figure 17:
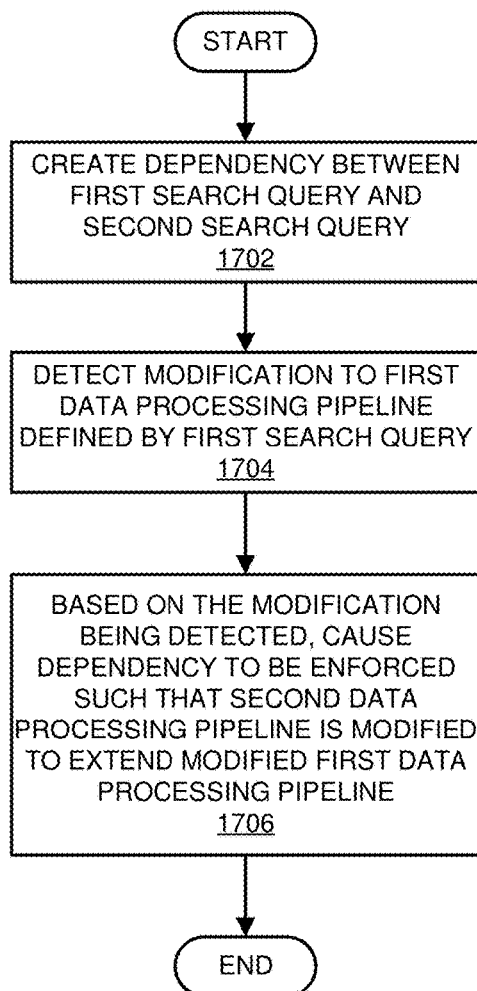
FIG. 17 presents a flowchart illustrating enforcing dependency between search queries in accordance with the disclosed embodiments.

FIG. 17 presents a flowchart illustrating enforcing dependency between search queries in accordance with the disclosed embodiments. At block 1702, a dependency is created between a first search query and a second search query. For example, a dependency is created between a first search query and a second search query, the first search query defining a first data processing pipeline and the second search query defining a second data processing pipeline that extends the first data processing pipeline.

At block 1704, a modification is detected to a first data processing pipeline defined by the first search query. For example, a modification is detected to the first data processing pipeline defined by the first search query.

At block 1706, based on the modification being detected, the dependency is caused to be enforced, such that a second data processing pipelines defined by the second search query is modified to extend the modified first data processing pipeline. For example, based on the modification to the first data processing pipeline being detected, the dependency is caused to be enforced such that the second data processing pipeline is modified to extend the modified first data processing pipeline.

In some cases, the causing of the dependency to be enforced comprises causing the second data processing pipeline to be automatically modified to extend the modified first data processing pipeline.

In some cases, the first search query comprises a first plurality of pipelined commands and the second search query comprises a second plurality of pipelined commands.

In some cases, the modification to the first data processing pipeline comprises a first set of pipelined commands corresponding to the first search query being modified, and the causing the dependency to be enforced comprises causing a second set of pipelined commands corresponding to the second search query to be modified to include the modified first set of pipelined commands.

In some cases, further based on the modification to the first data processing pipeline being detected, a dependency is caused to be enforced between the first search query and a third search query, such that a third data processing pipeline defined by the third search query is modified to extend the modified first data processing pipeline, where the third search query defines the third data processing pipeline that extends the first data processing pipeline.

In some cases, the causing the dependency to be enforced comprises causing a data set to be applied as an input to a portion of the second search query that is extending the first data processing pipeline.

In some cases, display is caused of a selection interface that is operable by a user to select the first search query from a plurality of saved search queries, the first search query and the second search query being of the plurality of saved search queries. Based on the user selecting the first search query using the selection interface, display is caused of at least some commands of the first search query in a graphical interface that is operable by the user to modify the first search query, where the detected modification to the first data processing pipeline defined by the first search query is caused by the user modifying the first search query using the graphical interface.

In some cases, display is caused of a selection interface that is operable by a user to select the first search query from a plurality of saved search queries, the first search query being of the plurality of saved search queries. Based on the user selecting the first search query using the selection interface, display is caused of an interface that is operable by the user to extend the first data processing pipeline by extending the first search query with an additional search query, and the extended search query is caused to be saved as the second search query that extends the first data processing pipeline.

In some cases, display is caused of a selection interface that is operable by a user to select the first search query from a plurality of saved search queries, the first search query being of the plurality of saved search queries, and the dependency between the first search query and the second search query is caused to be created based on the user selecting the first search query from the plurality of saved search queries.

In some cases, the detected modification to the first data processing pipeline causes a modification to an output data set corresponding to the first data processing pipeline, an, the causing of the dependency to be enforced comprises causing the modified output data set to be applied as an input to a portion of the second search query that is extending the first data processing pipeline.

In some cases, the detected modification to the first data processing pipeline generates an output data set from the modified first date processing pipeline, and the causing the dependency to be enforced comprises causing the output data set to be applied as an input to a portion of the second search query that is extending the first data processing pipeline.

In some cases, the causing the dependency to be enforced comprises causing the second search query to be modified to define the modified second data processing pipeline.

In some cases, the first search query is caused to be executed, the executing applying a late binding schema to events, the late binding schema associated with one or more extraction rules defining one or more fields for a set of events.

In some cases, the modification to the first data processing pipeline defined by the first search query comprises a modification to the first search query.

In some cases, the second data processing pipeline is modified to extend the modified first data processing pipeline while loaded into a search interface displaying an output data set of the second data processing pipeline, and further based on the modification to the first data processing pipeline being detected, display is automatically caused of a new output data set corresponding to the modified second data processing pipeline in the search interface.

In some cases, the first search query is caused to be executed to generate an output data set, and the output data set is caused to be displayed in a search interface, the output data set comprising a plurality of time-stamped events, each of the plurality of time-stamped events comprising event raw data.

In some cases, the second search query is caused to be executed to generate an output data set, and the output data set is caused to be displayed in a search interface, the output data set comprising a plurality of time-stamped events, each of the plurality of time-stamped events comprising event raw data.

Figure 18:
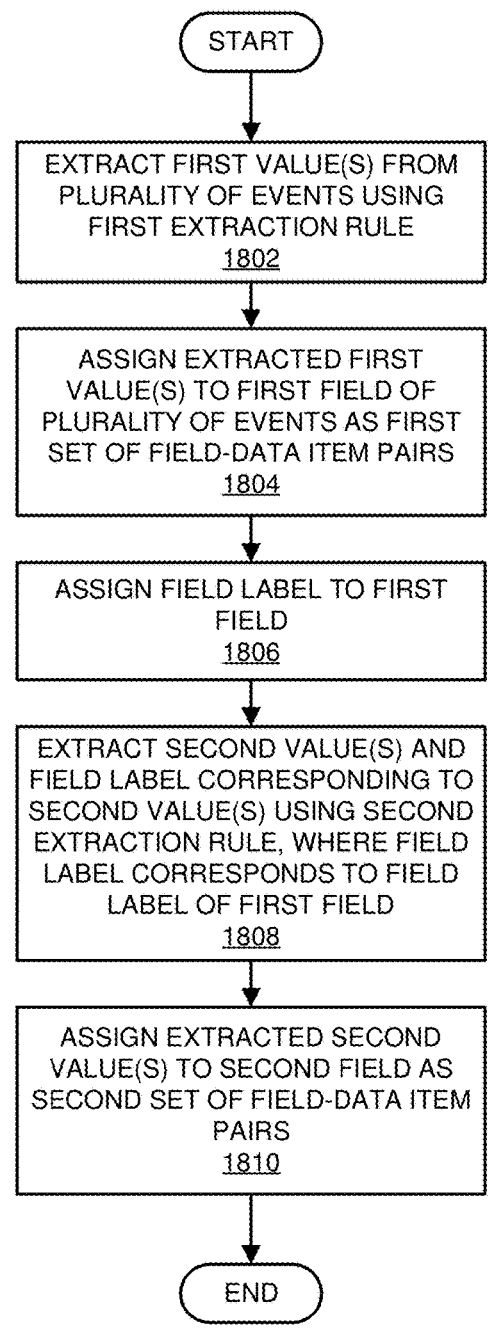
FIG. 18 presents a flowchart illustrating distinguishing field labels from multiple extractions in accordance with the disclosed embodiments.

FIG. 18 presents a flowchart illustrating distinguishing field labels from multiple extractions in accordance with the disclosed embodiments. At block 1802, a first value(s) is extracted from a plurality of events using a first extraction rule. For example, first one or more values are extracted from a plurality of events using a first extraction rule. At block 1804, the extracted first value(s) is assigned to a first field of the plurality of events as a first set of field-data items pairs. For example, the extracted first one or more values are assigned to a first field of the plurality of events as a first set of field-data item pairs. At block 1806, a field label is assigned to the first field. At block 1808, a second value(s) and a field label corresponding to the extracted second value(s) are extracted using a second extraction rule, where the field label corresponds to the field label of the first field. For example, second one or more values and a field label corresponding to the second one or more values are extracted from the plurality of the events using a second extraction rule, the extracted field label corresponding to the assigned field label of the first field. At block 1810, the extracted second values are assigned to a second field as a second set of field-data items pairs. For example, the extracted second one or more values are assigned to a second field of the plurality of events as a second set of field-data item pairs, thereby distinguishing the extracted second one or more values from the extracted first one or more values.

In some cases, the using the second extraction rule identifies a value of the second one or more values for each text portion in a set of data items of the plurality of events discovered as being separated by one or more designated demarcating characters from another text portion that matches the field label, the discovered text portion being used as the value. In some cases, the using the second extraction rule is part of a command that automatically extracts all identified field label-value pairs in a set of data items of the plurality of events, each field label-value pair comprising a field label and a value, where one of the field label-value pairs is identified for each first text portion separated by one or more designated demarcating characters from a second text portion in the set of data items, the first text portion matching the field label and the second text portion being used as the value.

In some cases, the using the second extraction rule is part of a command that automatically extracts all identified field label-value pairs within a set of data items specified by a command element of the command, where each pair of text portions separated by one or more designated demarcating characters in the set of data items is identified as one of the field label-value pairs.

In some cases, the first extraction rule comprises instructions defining identification and extraction of a value for a data item of a field and a field label corresponding to the value from data.

In some cases, the second extraction rule generates the second one or more values and the field label corresponding to the second one or more values from the first one or more values of the first set of field-data item pairs.

In some cases, it is identified by the system that the extracted field label corresponds to the assigned field label of the first field, and the extracted second one or more values are assigned to the second field as the second set of field-data item pairs based on the extracted field label corresponding to the assigned field label of the first field.

In some cases, it is identified by the system that the extracted field label corresponds to the assigned field label of the first field, and one or more options are caused to be presented to the user based on the identified correspondence, at least one of the options being selectable by the user to cause the assigning of the extracted second one or more values to the second field as the second set of field-data item pairs.

In some cases, a different field label than the extracted field label corresponding to the second one or more values is assigned to the second field. In some cases, a modified version of the extracted field label corresponding to the second one or more values is assigned to the second field. In some cases, a modified version of the extracted field label corresponding to the second one or more values is assigned to the second field, the modified version being the extracted field label prepended with text (e.g., with text from an a field label assigned to an event attribute from which the second one or more values were extracted from).

In some cases, the using the second extraction rule generates the second one or more values and the field label from event raw data of the plurality of events.

In some cases, a late binding schema is applied to the plurality of events, the late binding schema being defined by at least the first and second extraction rules.

In some cases, the extracting the first one or more values from the plurality of events using the first extraction rule is performed as part of a first command of a search query being executed by a search system and the extracting the second one or more values and the field label corresponding to the second one or more values from the plurality of the events using the second extraction rule is performed as part of a second command of the search query being executed by the search system.

In some cases, the extracted field label corresponding to the second one or more values is modified to include at least a portion of text of a field label assigned to an event attribute that the second one or more values were extracted from, and the modified version of the extracted field label is assigned to the second field.

Figure 19:
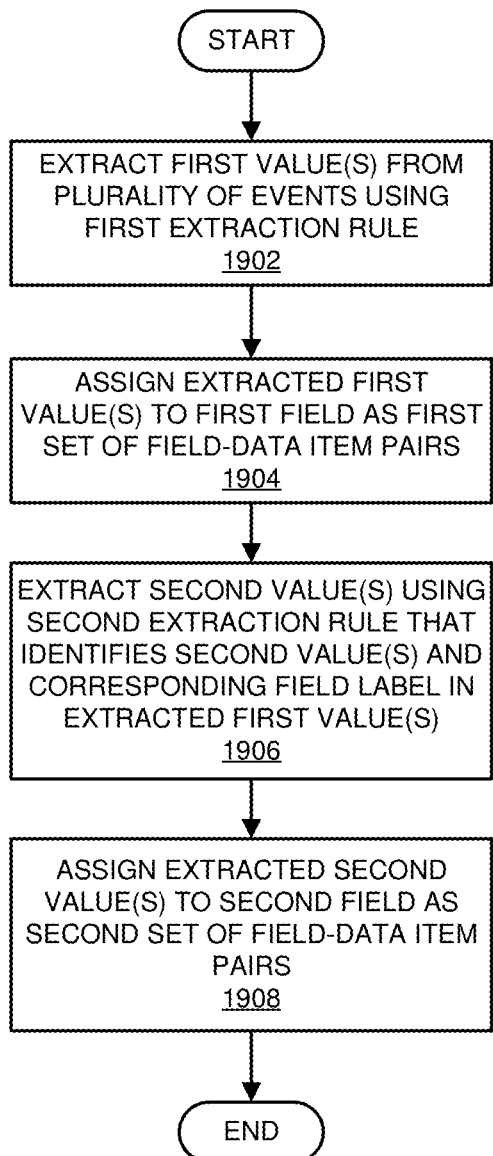
FIG. 19 presents a flowchart illustrating extracting from extracted event fields in accordance with the disclosed embodiments.

FIG. 19 presents a flowchart illustrating extracting from extracted event fields in accordance with the disclosed embodiments. At block 1902, a first value(s) is extracted from a plurality of events using a first extraction rule. For example, first one or more values are extracted from a plurality of events using a first extraction rule. At block 1904, the extracted first value(s) is assigned to a first field as a first set of field-data items pairs. For example, the extracted first one or more values are assigned to a first field of the plurality of events as a first set of field-data item pairs. At block 1906, a second value(s) is extracted using a second extraction rule that identifies the second value(s) and a corresponding field label in the extracted first value(s). For example, second one or more values are extracted from the plurality of the events using a second extraction rule, the second extraction rule identifying the second one or more values and a field label corresponding to the second one or more values in the extracted first one or more values of the first set of field-data item pairs. At block 1908, the extracted second value(s) is assigned to a second field as a second set of field-data items pairs. For example, the extracted second one or more values are assigned to a second field of the plurality of events as a second set of field-data item pairs.

In some cases, the using the second extraction rule identifies a value of the second one or more values for each text portion in the extracted first one or more values of the first set of field-data item pairs discovered as being separated by one or more designated demarcating characters from another text portion that matches the field label, the discovered text portion being used as the value.

In some cases, the using the second extraction rule is part of a command that automatically extracts all identified field label-value pairs in the extracted first one or more values of the first set of field-data item pairs, each field label-value pair comprising a field label and a value, where one of the field label-value pairs is identified for each first text portion separated by one or more designated demarcating characters from a second text portion in the extracted first one or more values of the first set of field-data item pairs, the first text portion matching the field label and the second text portion being used as the value.

In some cases, the using the second extraction rule is part of a command that automatically extracts all identified field label-value pairs within the extracted first one or more values of the first set of field-data item pairs as specified by reference to the first field in the command, where each pair of text portions separated by one or more designated demarcating characters in the extracted first one or more values of the first set of field-data item pairs is identified as one of the field label-value pairs.

In some cases, the first extraction rule comprises instructions defining identification and extraction of a data item of a field and a field label corresponding to the data item from data.

In some cases, the first extraction rule generates the first one or more values from event raw data of the plurality of the events.

In some cases, the extracting the first one or more values from the plurality of events using the first extraction rule generates the first one or more values from one or more data items assigned to a third field of the plurality of events as a third set of field-data item pairs.

In some cases, execution of a search query is causes, where the extracting the second one or more values from the plurality of the events using the second extraction rule is executed as part of a command of the search query, and display is caused of at least some of the plurality of the events in a search interface with at least some of the second one or more values of the second set of field-data item pairs.

In some cases, the using the second extraction rule is part of a command that automatically extracts all identified field label-value pairs in the extracted first one or more values of the first set of field-data item pairs, each field label-value pair comprising a field label and a value, where one of the field label-value pairs is identified for each first text portion separated by one or more designated demarcating characters from a second text portion in the extracted first one or more values of the first set of field-data item pairs, the first text portion matching the field label and the second text portion being used as the value, and a new field is caused to be assigned to the plurality of events for each unique field label of a plurality of unique field labels in the identified field label-value pairs, each new field being assigned a modified version of a respective one of the plurality of unique field labels.

In some cases, the field label extracted using the second extraction rule is assigned to the second field. In some cases, a different field label than the field label extracted using the second extraction rule is assigned to the second field. In some cases, a modified version of the field label extracted using the second extraction rule is assigned to the second field. In some cases, the field label extracted using the second extraction rule is assigned to the second field as supplemented with text of a field label assigned to the first field.

In some cases, the using the first extraction rule generates the first one or more values from event raw data of the plurality of events.

In some cases, a late binding schema is applied to the plurality of events, the late binding schema being defined by at least the first and second extraction rules.

In some cases, the extracting the first one or more values from the plurality of events using the first extraction rule is performed as part of a first command of a search query being executed by a search system and the extracting the second one or more values from the plurality of the events using the second extraction rule is performed as part of a second command of the search query being executed by the search system.

Figure 20:
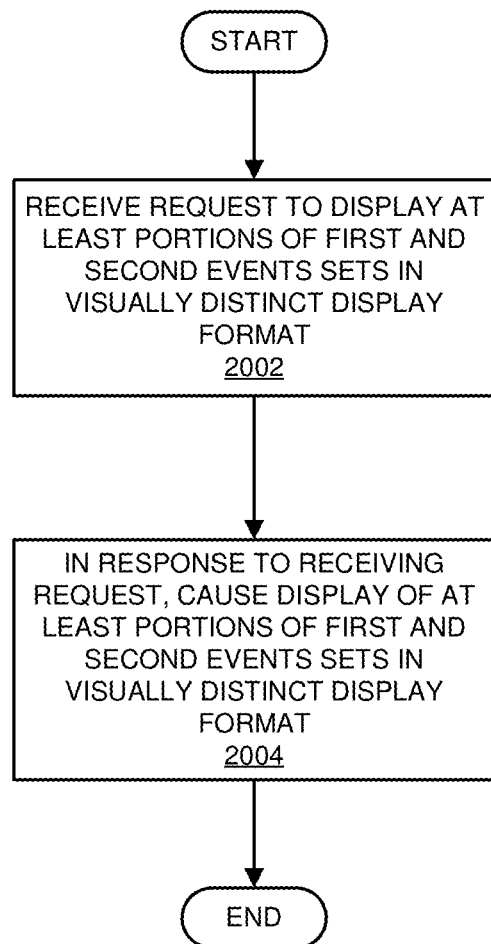
FIG. 20 presents a flowchart illustrating displaying at least portions of first and second events sets in a visually distinct display format in accordance with the disclosed embodiments.

FIG. 20 presents a flowchart illustrating displaying at least portions of first and second events sets in a visually distinct display format in accordance with the disclosed embodiments. At block 2002, a request is received to display at least portions of first and second events sets in a visually distinct display format. For example, a request is received to display at least a portion of a first time-stamped events set and at least a portion of a second time-stamped events set in an interleaved and visually distinct display format, where, in the interleaved and visually distinct display format, the at least a portion of the first time-stamped events set is displayed in a visually distinct manner from the at least a portion of the second time-stamped events set, and further where, in the interleaved and visually distinct display format, data from the at least a portion of the first time-stamped events set is interleaved with data from the at least a portion of the second time-stamped events set.

At block 2004, in response to receiving the request, display is caused of the at least portions of the first and second events sets in the visually distinct display format. For example, in response to receiving the request, display is caused, on a user interface, of the at least a portion of the first time-stamped events set and the at least a portion of the second time-stamped events set in the interleaved and visually distinct display format, where a source for the at least a portion of the first time-stamped events set represents a first participant in the interleaved and visually distinct display format, and further where a source for the at least a portion of the second time-stamped events set represents a second participant in the interleaved and visually distinct display format, further where the first time-stamped events set and the second time-stamped events set are extracted by executing a search query, and where the executing the search query comprises applying a late binding schema to source data, the late binding schema associated with one or more extraction rules defining one or more fields.

In some cases, the causing display, on the user interface, of the at least a portion of the first time-stamped events set and of the at least a portion of the second time-stamped events set in the interleaved and visually distinct display format comprises causing display, on the user interface, of the at least a portion of the first time-stamped events set in a first color, and causing display, on the user interface, of the at least a portion of the second time-stamped events set in a second color, where the second color is different from the first color.

In some cases, the causing display, on the user interface, of the at least a portion of the first time-stamped events set and of the at least a portion of the second time-stamped events set in the interleaved and visually distinct display format comprises causing display, on the user interface, of the at least a portion of the first time-stamped events set in a left aligned format, and causing display, on the user interface, of the at least a portion of the second time-stamped events set in a right aligned format.

In some cases, the at least a portion of the first time-stamped events set comprises the first time-stamped events set, where the at least a portion of the second time-stamped events set comprises the second time-stamped events set. In some cases, the first time-stamped events set represents data from a first system, where the second time-stamped events set represents data from a second system. In some cases, the first time-stamped events set represents raw log data from a first system, where the second time-stamped events set represents raw log data from a second system. In some cases, the first time-stamped events set comprises a first subset of a time-stamped events set, and the second time-stamped events set comprises a second subset of the time-stamped events set, where each time-stamped event of the first time-stamped events set has a first field value for a particular field, where each time-stamped event of the second time-stamped events set has a second field value for the particular field, and where the first field value is different from the second field value.

In some cases, the first time-stamped events set comprises a first subset of a time-stamped events set, where the second time-stamped events set comprises a second subset of the time-stamped events set, and each time-stamped event of the first time-stamped events set has a first field value for a particular field, where each time-stamped event of the second time-stamped events set has a second field value for the particular field, where the first field value is different from the second field value, and where the particular field is a host field, a source field, a source type field, a timestamp field, or any other field.

In some cases, the data from the at least a portion of the first time-stamped events set is interleaved with the data from the at least a portion of the second time-stamped events set using timestamps of the data from the at least a portion of the first time-stamped events set and timestamps of the data from the at least a portion of the second time-stamped events set, where the data from the at least a portion of the first time-stamped events set and the data from the at least a portion of the second time-stamped events set is presented in chronological order based on the timestamps.

In some cases, the at least a portion of the first time-stamped events set represents a result of a first search query applying the late binding schema to the source data, and where the at least a portion of the second time-stamped events set represents a result of a second search query applying the late binding schema to the source data.

In some cases, the at least a portion of the first time-stamped events set represents output of a first data processing pipeline, where the at least a portion of the second time-stamped events set represents output of a second data processing pipeline.

In some cases, the at least a portion of the first time-stamped events set represents a column of data from a first data table, where the at least a portion of the second time-stamped events set represents a column of data from a second data table or another column of data from the first data table.

In some cases, the receiving comprises receiving a first request to represent the at least a portion of the first time-stamped events set as a first tab on the user interface, receiving a second request to represent the at least a portion of the second time-stamped events set as a second tab on the user interface, and receiving a request to join data represented by the first and second tabs in the interleaved and visually distinct display format.

In some cases, the receiving comprises receiving a request to display the at least a portion of the first time-stamped events set, the at least a portion of the second time-stamped events set, and at least a portion of a third time-stamped events set in the interleaved and visually distinct display format, and the causing comprises causing display, on the user interface, the at least a portion of the first time-stamped events set, the at least a portion of the second time-stamped events set, and the at least a portion of the third time-stamped events set in the interleaved and visually distinct display format, where a source for the at least a portion of the third time-stamped events set represents a third participant in the interleaved and visually distinct display format.

In some cases, the at least a portion of the first time-stamped events set represents raw log data from a first system, and each time-stamped event of the at least a portion of the second time-stamped events set has a first field value for a particular field.

In some cases, the at least a portion of the first time-stamped events set changes based upon time, and the at least a portion of the second time-stamped events set changes based upon time.

In some cases, a format of the at least a portion of the first time-stamped events set changes based upon time, and a format of the at least a portion of the second time-stamped events set changes based upon time.

In some cases, the at least a portion of the first time-stamped events set changes based upon a first event threshold value, and the at least a portion of the second time-stamped events set changes based upon a second event threshold value.

In some cases, a format of the at least a portion of the first time-stamped events set changes based upon a first event threshold value, and a format of the at least a portion of the second time-stamped events set changes based upon a second event threshold value.

In some cases, the at least a portion of the first time-stamped events set and the at least a portion of the second time-stamped events set comprise one or more metadata fields.

In some cases, the first time-stamped events set comprises a first subset of a time-stamped events set, the second time-stamped events set comprises a second subset of the time-stamped events set, each time-stamped event of the first time-stamped events set has a first metadata field value for a particular metadata field, each time-stamped event of the second time-stamped events set has a second metadata field value for the particular field metadata field, and the first metadata field value is different from the second metadata field value.

In some cases, the first time-stamped events set comprises a first subset of a time-stamped events set, the second time-stamped events set comprises a second subset of the time-stamped events set, each time-stamped event of the first time-stamped events set has a first field value for a particular field, each time-stamped event of the second time-stamped events set has a second field value for the particular field, the particular field is defined by one or more extraction rules, and the first field value is different from the second field value.

Figure 21:
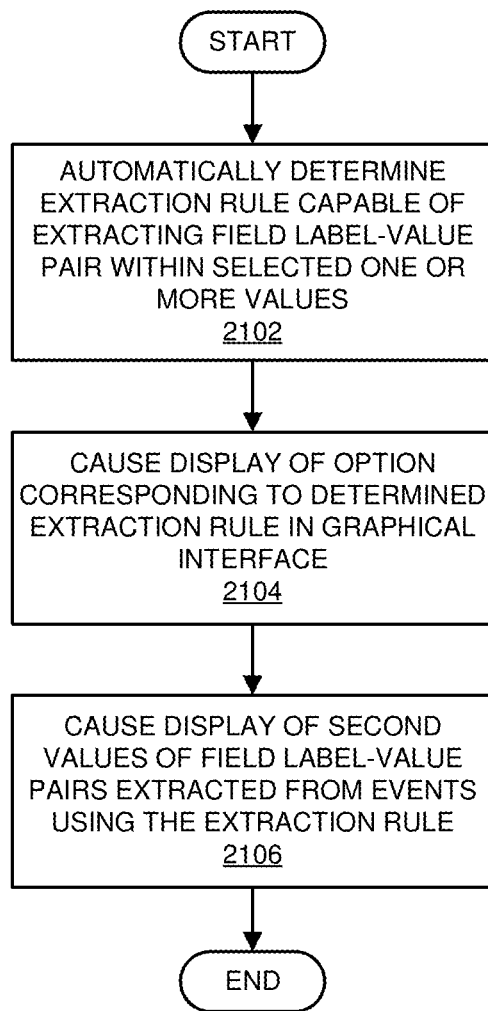
FIG. 21 presents a flowchart illustrating suggested field extraction in accordance with the disclosed embodiments.

FIG. 21 presents a flowchart illustrating suggested field extraction in accordance with the disclosed embodiments. At block 2102, a system automatically determines an extraction rule capable of extracting a field-label value pair within selected one or more values. For example, based on a selection by a user of first one or more values of one or more events displayed in a graphical interface, an extraction rule is automatically determined that is capable of extracting a field label-value pair at least partially within at least the selected one or more values.

At block 2104, display is caused on an option corresponding to the determined extraction rule in a graphical interface. For example, display is caused of an option corresponding to the determined extraction rule in the graphical interface.

At block 2106, display is caused on second values of field label-value pairs extracted from events using the extraction rule. For example, based on the user selecting the option in the graphical interface, display is caused of second one or more values of one or more field label-value pairs extracted from the one or more events using the extraction rule.

In some cases, the one or more events are displayed in a table format, and a value of the first one or more values is selected by the user selecting a cell in the table format, the cell comprising the value. In some cases, the one or more events are displayed in a table format, and the one or more values are selected by the user selecting a column in the table format, the column comprising a plurality of the first one or more values.

In some cases, the displayed one or more field label-value pairs include the field label-value pair.

In some cases, the automatically determining the extraction rule comprises automatically generating the extraction rule from the selected first one or more values.

In some cases, based on the user selecting the option in the graphical interface, the second one or more values are caused to be assigned to a field of the one or more events.

In some cases, based on the selection by the user of the first one or more values of the one or more events displayed in the graphical interface, the determined extraction rule is caused to be saved to a configuration file for a future field extraction that is used to apply a late binding schema to a set of events.

In some cases, the determined extraction rule comprises a regular expression.

In some cases, the automatically determining the extraction rule comprises detecting a first text portion as being separated by one or more designated demarcating characters from a second text portion in the selected first one or more values.

In some cases, the automatically determining the extraction rule comprises detecting one or more designated demarcating characters in the selected first one or more values.

In some cases, the selected first one or more values comprise a selected portion of a textual representation of a value of the one or more events.

In some cases, the second one or more values of one or more field label-value pairs are extracted from the one or more events using the extraction rule as part of a command that automatically extracts all identified field label-value pairs in a set of data items of the one or more event, each field label-value pair comprising a field label and a value, wherein one of the field label-value pairs is identified for each first text portion separated by one or more designated demarcating characters from a second text portion in the set of data items, the first text portion matching the field label and the second text portion being used as the value.

In some cases, a late binding schema is applied to the one or more events using a plurality of extraction rules that comprise the determined extraction rule based on the user selecting the option in the graphical interface.

In some cases, the determined extraction rule comprises instructions defining identification and extraction of a data item of a field and a field label corresponding to the data item from data, the defined field label matching a field label of the field label-value pair.

In some cases, the causing display of the second one or more values of the one or more field label-value pairs extracted from the one or more events using the extraction rule causes the second one or more values to be displayed with the one or more events in a table format.

As can be understood, implementations of the present disclosure provide for various approaches to information analysis and management especially for machine data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method comprising:
causing display of a table of search results representing a set of events matching a search query, each event corresponding to a portion of raw machine data associated with a timestamp, the table of search results comprising:
  a plurality of columns, each column comprising data items of an event attribute, the data items being of the set of events, wherein each column is selectable by a user; and
  a plurality of rows forming cells with the plurality of columns, each cell comprising one or more of the data items of the event attribute of a corresponding column; and
based on a first user selection, from the table of search results, of one or more of the columns of the plurality of columns in the table of search results, causing display of a list of options corresponding to the selected one or more columns; and
based on a second user selection of an option from the list of options, configuring the search query to modify the table of search results by causing one or more commands that are based on the option and the event attribute corresponding to the selected one or more columns to be added to the search query, the one or more commands including a command of a plurality of predetermined commands of a search language, the command including a command identifier and at least one argument of the command added to the search query, the command identifier being independent of which of the plurality of columns was selected to cause the display of the list of options, and the at least one argument composed based on which of the plurality of columns was selected to cause the display of the list of options.

2. The computer-implemented method of claim 1, further comprising causing the selected option to be included in the displayed list of options based on a determination that at least one of the selected one or more of the columns represents data items comprising statistical values generated by one or more statistical functions performed on values of data items of at least some of the set of events.

3. The computer-implemented method of claim 1, further comprising causing the selected option to be included in the displayed list of options based on detection of at least one field label-value pair in the selected one or more columns.

4. The computer-implemented method of claim 1, wherein the data items of the event attribute of at least one of the selected one or more columns comprise values of a field extracted from the set of events using a common extraction rule.

5. The computer-implemented method of claim 1, further comprising causing the selected option to be generated at least partially based on detection of at least one field label-value pair in the selected one or more columns.

6. The computer-implemented method of claim 1, wherein one or more command elements of the one or more commands include at least one value of the data items for each of the selected one or more columns.

7. The computer-implemented method of claim 1, further comprising, based at least on the user selecting the one or more of the columns of the plurality of columns in the table of search results:
causing the event attribute for each of the data items of each of the selected one or more columns to be included as one or more command elements of the one or more commands, wherein at least two event attributes are included in the one or more command elements.

8. The computer-implemented method of claim 1, furthering comprising, based on the second user selection:
causing the search query comprising the added one or more commands to be automatically executed; and
causing the set of events displayed in the table of search results to be updated to correspond to updated search results of the executed search query comprising the added one or more commands.

9. The computer-implemented method of claim 1, wherein the one or more commands cause extraction of one or more field label-values pairs from at least the data items of each of the selected one or more columns and cause the one or more field label-value pairs to be associated with at least one event of the set of events.

10. The computer-implemented method of claim 1, further comprising:
causing display of the option as a form in the displayed list of options, the form comprising at least one form element operable to enter one or more command elements into the one or more commands to be added to the search query; and
after adding the one or more commands to the search query using the form, causing display of a reproduction of the form, the reproduction comprising the one or more command elements and being user operable to modify the one or more commands that were added to the search query.

11. The computer-implemented method of claim 1, further comprising, based at least on the user selecting the one or more of the columns of the plurality of columns in the table of search results, causing a command entry that represents the one or more commands to be automatically added to a displayed list of command entries in a search interface, each of the command entries respectively representing one or more commands of a plurality of commands of the search query, the displayed list of command entries being displayed in a sequence corresponding to the plurality of commands in the search query.

12. The computer-implemented method of claim 1, wherein the one or more commands are of a pipelined search language in which a particular command of the search query produces an output from an input of the particular command, and the input is an output of a prior command of the search query.

13. The computer-implemented method of claim 1, wherein the display of the set of events in the table of search results is in a search screen, and the causing of the one or more commands to be added to the search query causes the table of search results in the displayed search screen to be automatically updated to add a new column that represents a new field extracted from the events by the one or more commands added to the search query.

14. A computer-implemented system for searching data, comprising:
one or more data processors; and
one or more computer-readable storage media containing instructions which when executed on the one or more data processors, cause the one or more processors to perform operations including:
causing display of a table of search results representing a set of events matching a search query, each event corresponding to a portion of raw machine data associated with a timestamp, the table of search results comprising:
a plurality of columns, each column comprising data items of an event attribute, the data items being of the set of events, wherein each column is selectable by a user; and
a plurality of rows forming cells with the plurality of columns, each cell comprising one or more of the data items of the event attribute of a corresponding column; and
based on a first user selection, from the table of search results, of one or more of the columns of the plurality of columns in the table of search results, causing display of a list of options corresponding to the selected one or more columns; and
based on a second user selection of an option from the list of options, configuring the search query to modify the table of search results by causing one or more commands that are based on the option and the event attribute corresponding to the selected one or more columns to be added to the search query, the one or more commands including a command of a plurality of predetermined commands of a search language the command including a command identifier and at least one argument of the command added to the search query, the command identifier being independent of which of the plurality of columns was selected to cause the display of the list of options, and the at least one argument composed based on which of the plurality of columns was selected to cause the display of the list of options.

15. The computer-implemented system of claim 14, wherein the data items of the event attribute of at least one of the selected one or more columns comprise values of a field extracted from the set of events using a common extraction rule.

16. The computer-implemented system of claim 14, wherein the operations comprise causing the selected option to be generated at least partially based on detection of at least one field label-value pair in the selected one or more columns.

17. The computer-implemented system of claim 14, wherein the operations further comprise, based at least on the user selecting the one or more of the columns of the plurality of columns in the table of search results:
  causing the search query comprising the added one or more commands to be automatically executed; and
  causing the set of events displayed in the table of search results to be updated to correspond to updated search results of the executed search query comprising the added one or more commands.

18. The computer-implemented system of claim 14, wherein the operations further comprise, based at least on the user selecting the one or more of the columns of the plurality of columns in the table of search results, causing a command entry that represents the one or more commands to be automatically added to a displayed list of command entries in a search interface, each of the command entries respectively representing one or more commands of a plurality of commands of the search query, the displayed list of command entries being displayed in a sequence corresponding to the plurality of commands in the search query.

19. The computer-implemented system of claim 14, wherein the one or more commands are of a pipelined search language in which a particular command of the search query produces an output from an input of the particular command, and the input is an output of a prior command of the search query.

20. The computer-implemented system of claim 14, wherein the display of the set of events in the table of search results is in a search screen, and the causing of the one or more commands to be added to the search query causes the table of search results in the displayed search screen to be automatically updated to add a new column that represents a new field extracted from the events by the one or more commands added to the search query.

21. One or more non-transitory computer-storage media storing computer-useable instructions that, when executed by at least one computing device, cause the at least one computing device to perform a method, the method comprising:
  causing display of a table of search results representing a set of events matching a search query, each event corresponding to a portion of raw machine data associated with a timestamp, the table of search results comprising:
    a plurality of columns, each column comprising data items of an event attribute, the data items being of the set of events, wherein each column is selectable by a user; and
    a plurality of rows forming cells with the plurality of columns, each cell comprising one or more of the data items of the event attribute of a corresponding column; and
  based on a first user selection, from the table of search results, of one or more of the columns of the plurality of columns in the table of search results, causing display of a list of options corresponding to the selected one or more columns; and
  based on a second user selection of an option from the list of options, configuring the search query to modify the table of search results by causing one or more commands that are based on the option and the event attribute corresponding to the selected one or more columns to be added to the search query, the one or more commands including a command of a plurality of predetermined commands of a search language, the command including a command identifier and at least one argument of the command added to the search query, the command identifier being independent of which of the plurality of columns was selected to cause the display of the list of options, and the at least one argument composed based on which of the plurality of columns was selected to cause the display of the list of options.

22. The one or more non-transitory computer-storage media of claim 21, wherein the data items of the event attribute of at least one of the selected one or more columns comprise values of a field extracted from the set of events using a common extraction rule.

23. The one or more non-transitory computer-storage media of claim 21, wherein the method comprises causing the selected option to be generated at least partially based on detection of at least one field label-value pair in the selected one or more columns.

24. The one or more non-transitory computer-storage media of claim 21, wherein the method further comprises, based at least on the user selecting the one or more of the columns of the plurality of columns in the table of search results:
  causing the search query comprising the added one or more commands to be automatically executed; and
  causing the set of events displayed in the table of search results to be updated to correspond to updated search results of the executed search query comprising the added one or more commands.

25. The one or more non-transitory computer-storage media of claim 21, wherein the method further comprises, based at least on the user selecting the one or more of the columns of the plurality of columns in the table of search results, causing a command entry that represents the one or more commands to be automatically added to a displayed list of command entries in a search interface, each of the command entries respectively representing one or more commands of a plurality of commands of the search query, the displayed list of command entries being displayed in a sequence corresponding to the plurality of commands in the search query.

26. The one or more non-transitory computer-storage media of claim 21, wherein the one or more commands are of a pipelined search language in which a particular command of the search query produces an output from an input of the particular command, and the input is an output of a prior command of the search query.

27. The one or more non-transitory computer-storage media of claim 21, wherein the display of the set of events in the table of search results is in a search screen, and the causing of the one or more commands to be added to the search query causes the table of search results in the displayed search screen to be automatically updated to add a new column that represents a new field extracted from the events by the one or more commands added to the search query.

* * * * *